US011188305B2

(12) United States Patent
Makino et al.

(10) Patent No.: US 11,188,305 B2
(45) Date of Patent: Nov. 30, 2021

(54) COMPUTATION DEVICE HAVING A MULTIPLEXER AND SEVERAL MULTIPLIERS AND COMPUTATION SYSTEM

(71) Applicants: Preferred Networks, Inc., Tokyo (JP); RIKEN, Wako (JP)

(72) Inventors: Junichiro Makino, Wako (JP); Takayuki Muranushi, Wako (JP); Miyuki Tsubouchi, Wako (JP); Ken Namura, Tokyo (JP)

(73) Assignees: Preferred Networks, Inc., Tokyo (JP); Riken, Wako (JP)

(*) Notice: Subject to any disclaimer, the term of this patent is extended or adjusted under 35 U.S.C. 154(b) by 195 days.

(21) Appl. No.: 16/611,971

(22) PCT Filed: May 11, 2018

(86) PCT No.: PCT/JP2018/018400
§ 371 (c)(1),
(2) Date: Nov. 8, 2019

(87) PCT Pub. No.: WO2018/207926
PCT Pub. Date: Nov. 15, 2018

(65) Prior Publication Data
US 2020/0364031 A1    Nov. 19, 2020

(30) Foreign Application Priority Data
May 12, 2017    (JP) .............................. JP2017-095803

(51) Int. Cl.
*G06F 7/544* (2006.01)
(52) U.S. Cl.
CPC ................................. *G06F 7/5443* (2013.01)

(58) Field of Classification Search
CPC .................................................... G06F 7/5443
See application file for complete search history.

(56) References Cited

U.S. PATENT DOCUMENTS 5,515,520 A    5/1996 Hatta et al.
5,590,365 A    12/1996 Ide et al.
(Continued)

FOREIGN PATENT DOCUMENTS

JP    H03-282926 A    12/1991
JP    H04-084219 A    3/1992
(Continued)

OTHER PUBLICATIONS

International Search Report issued in International Patent Application No. PCT/JP2018/018400 dated Jul. 17, 2018.
(Continued)

*Primary Examiner* — Michael D. Yaary
(74) *Attorney, Agent, or Firm* — Baker Botts L.L.P.; Michael A. Sartori

(57) ABSTRACT

A computation device includes: a data multiplexer configured to output first high-order data as first output data and fifth output data, output first low-order data as third output data and seventh output data, output second high-order data as second output data, output second low-order data as fourth output data, output third high-order data, which is high-order data having a second bit number out of third input data, as sixth output data, and output third low-order data, which is low-order data having the second bit number out of the third input data, as eighth output data when a mode signal indicates a second computation mode; and first to fourth multipliers each of which multiplies two output data.

14 Claims, 18 Drawing Sheets

(56) References Cited

U.S. PATENT DOCUMENTS

| | | | |
|---|---|---|---|
| 5,742,840 A | 4/1998 | Hansen et al. | |
| 6,247,036 B1* | 6/2001 | Landers | G06F 9/30003 |
| | | | 708/603 |
| 6,295,599 B1 | 9/2001 | Hansen et al. | |
| 6,725,356 B2 | 4/2004 | Hansen et al. | |
| 6,751,644 B1* | 6/2004 | Chng | G06F 7/4876 |
| | | | 708/501 |
| 8,051,123 B1 | 11/2011 | Oberman et al. | |
| 2005/0144216 A1* | 6/2005 | Simkins | G06F 7/509 |
| | | | 708/620 |

FOREIGN PATENT DOCUMENTS

| | | |
|---|---|---|
| JP | 2002-528786 A | 9/2002 |
| WO | 00/023875 A1 | 4/2000 |

OTHER PUBLICATIONS

International Preliminary Report on Patentability issued in International Patent Application No. PCT/JP2018/018400 dated Nov. 21, 2019.

Junichiro Makino, "132. Matrix Multiplication Dedicated Processor", http://jun-makino.sakura.ne.jp/articles/future_sc/note133.html, May 1, 2016.

Junichiro Makino, "131. Dedicated processor for matrix multiplication", http://jun-makino.sakura.ne.jp/articles/future_sc/note132.html, Apr. 30, 2016.

Junichiro Makino, "Dedicated circuit for matrix multiplication", Twitter, https://twitter.com/jun_makino/status/726608816020705284, 20:06—Apr. 30, 2016.

Junichiro Makino, "Twitter, 20:06—Apr. 30, 2016", Twitter,https://twitter.com/jun_makino/status/726608823151022082.20:06—Apr. 30, 2016.

* cited by examiner

COMPUTATION DEVICE HAVING A MULTIPLEXER AND SEVERAL MULTIPLIERS AND COMPUTATION SYSTEM

TECHNICAL FIELD

The present disclosure relates to a computation device and a computation system.

BACKGROUND ART

Conventionally, single instruction multiple data (SIMD) computers capable of concurrently performing the same operation on a plurality of data have been known. For example, when a floating point operation unit is used for each operation unit constituting the SIMD computer, parallel floating point operations are realized by one core of a processor. In such an operation unit, the number of bits of data that can be supplied is constant, and thus, it is possible to switch between a first operation with double precision and a second operation with single precision by supplying four single-precision data instead of two double-precision data, for example (see, for example, Patent Literature 1).

CITATION LIST

Patent Literature

Patent Literature 1: Japanese Unexamined Patent Publication No. 2002-528786

SUMMARY OF INVENTION

Technical Problem

A circuit scale of an operation unit used for one computation of double-precision data is about four times a circuit scale of an operation unit used for one computation of single-precision data. However, when the operation unit used for one computation using two double-precision data is used for two computations using four single-precision data, a ratio of circuit elements used for the operation decreases. In this manner, when one computation using two data having the predetermined number of bits is switched to two computations using four data having half the number of bits, about half of the circuit elements are not used. In this technical field, it is desired to further improve computation performance of a computation device without increasing a circuit scale of the computation device.

The present disclosure describes a computation device and a computation system that can improve computation performance without increasing a circuit scale.

Solution to Problem

A computation device according to one aspect of the present disclosure includes: a multiplexer configured to receive first to third input data each having a first bit number and output first to eighth output data each having a second bit number that is half the first bit number in response to a mode signal indicating a computation mode; a first multiplier configured to multiply the first output data and the second output data; a second multiplier configured to multiply the third output data and the fourth output data; a third multiplier configured to multiply the fifth output data and the sixth output data; and a fourth multiplier configured to multiply the seventh output data and the eighth output data. When the mode signal indicates a first computation mode using data having the first bit number, the multiplexer outputs first high-order data, which is high-order data having the second bit number out of the first input data, as the first output data and the fifth output data, outputs first low-order data, which is low-order data having the second bit number out of the first input data, as the third output data and the seventh output data, outputs second high-order data, which is high-order data having the second bit number out of the second input data, as the second output data and the fourth output data, and outputs second low-order data, which is low-order data having the second bit number out of the second input data, as the sixth output data and the eighth output data. When the mode signal indicates a second computation mode using data having the second bit number, the multiplexer outputs the first high-order data as the first output data and the fifth output data, outputs the first low-order data as the third output data and the seventh output data, outputs the second high-order data as the second output data, outputs the second low-order data as the fourth output data, outputs third high-order data, which is high-order data having the second bit number out of the third input data, as the sixth output data, and outputs third low-order data, which is low-order data having the second bit number out of the third input data, as the eighth output data.

In this computation device, when the mode signal indicates the second computation mode, the first high-order data and the second high-order data are supplied to the first multiplier, and the first multiplier multiplies these data. In addition, the first low-order data and the second low-order data are supplied to the second multiplier, and the second multiplier multiplies these data. In addition, the first high-order data and the third high-order data are supplied to the third multiplier, and the third multiplier multiplies these data. In addition, the first low-order data and the third low-order data are supplied to the fourth multiplier, and the fourth multiplier multiplies these data. In this manner, all the multipliers of the first to fourth multipliers perform operations not only in the first computation mode but also in the second computation mode. As a result, it is possible to improve the computation performance of the computation device without increasing the circuit scale of the computation device.

The computation device may further include: a first adder configured to ad a first multiplication result that is a multiplication result of the first multiplier and a second multiplication result that is a multiplication result of the second multiplier; a second adder configured to ad a third multiplication result that is a multiplication result of the third multiplier and a fourth multiplication result that is a multiplication result of the fourth multiplier; and a partial adder configured to ad the first multiplication result, the second multiplication result, the third multiplication result, and the fourth multiplication result. In this case, the first adder obtains a vector product of the first high-order data and the first low-order data, and the second high-order data and the second low-order data, and the second adder obtains a vector product of the first high-order data and the first low-order data, and the third high-order data and the third low-order data. In addition, the partial adder obtains a multiplication result of the first input data and the second input data.

The first multiplier may output a first intermediate result and a second intermediate result, which are results obtained during the multiplication by the first multiplier, as the first multiplication result. The second multiplier may output a third intermediate result and a fourth intermediate result, which are results obtained during the multiplication by the second multiplier, as the second multiplication result. The third multiplier may output a fifth intermediate result and a sixth intermediate result, which are results obtained during the multiplication by the third multiplier, as the third multiplication result. The fourth multiplier may output a seventh intermediate result and an eighth intermediate result, which are results obtained during the multiplication by the fourth multiplier, as the fourth multiplication result. In this case, it is possible to suppress a delay caused by, for example, a carry in the arithmetic processing of the first multiplier by using the first intermediate result and the second intermediate result as the multiplication results of the first multiplier. As a result, the computation speed of the first multiplier can be improved. Similarly, it is possible to improve the computation speed of the second multiplier, the third multiplier, and the fourth multiplier.

The computation device may further include: a plurality of computation units each including the multiplexer, the first multiplier, the second multiplier, the third multiplier, the fourth multiplier, and the partial adder; a third adder configured to ad addition results of the partial adders of the plurality of computation units; and a selector configured to output any of a first addition result that is an addition result of the first adder and a second addition result that is an addition result of the second adder, and a third addition result that is an addition result of the third adder, in response to the mode signal. The first adder may ad the first multiplication results and the second multiplication results of the plurality of computation units, and the second adder may ad the third multiplication results and the fourth multiplication results of the plurality of computation units. The selector may output the third addition result when the mode signal indicates the first computation mode and output the first addition result and the second addition result when the mode signal indicates the second computation mode. In this case, the first adder and the second adder obtain two matrix operation results with data having the second bit number, and the third adder obtains one matrix operation result with data having the first bit number. Then, the selector outputs one matrix operation result with data having the first bit number when the mode signal indicates the first computation mode, and outputs two matrix operation results with data having the second bit number when the mode signal indicates the second computation mode. In this manner, it is possible to perform the matrix operation in response to the computation mode.

The computation device may further include a shift amount arithmetic circuit configured to compute a first shift amount of the first multiplication result, a second shift amount of the second multiplication result, a third shift amount of the third multiplication result, and a fourth shift amount of the fourth multiplication result. Each of the plurality of computation units may further include a first alignment unit configured to perform a shift process on the first multiplication result based on the first shift amount; a second alignment unit configured to perform a shift process on the second multiplication result based on the second shift amount; a third alignment unit configured to perform a shift process on the third multiplication result based on the third shift amount; and a fourth alignment unit configured to perform a shift process on the fourth multiplication result based on the fourth shift amount. When the first multiplication result and the second multiplication result are floating point data, it is necessary to align exponent parts thereof in order to ad the first multiplication result and the second multiplication result. Thus, the first adder can perform addition by shifting the first multiplication result based on the first shift amount and shifting the second multiplication result based on the second shift amount. Similarly, the second adder can perform addition by shifting the third multiplication result based on the third shift amount and shifting the fourth multiplication result based on the fourth shift amount.

The shift amount arithmetic circuit may include: a maximum value arithmetic circuit configured to compute a maximum exponent, which is a maximum exponent part among exponent parts of a plurality of target data to be added; and a subtraction circuit configured to compute a difference between each of the plurality of target data and the maximum exponent as a shift amount. When the target data is floating point data, it is necessary to align the respective exponent parts in order to ad the plurality of target data. Thus, it is possible to align the exponent parts of the plurality of target data by using the difference between the maximum exponent of the plurality of target data and each exponent part thereof as the shift amount.

The maximum value arithmetic circuit may compute the maximum exponent by performing comparison in order from a most significant bit to a least significant bit of the plurality of target data. In this case, the number of bits to be compared can be reduced since the plurality of target data are compared in order from the most significant bit, and the computation of the maximum exponent can be speeded up.

The first computation mode may be a double-precision computation mode, and the second computation mode may be a single-precision computation mode. In this case, the computations in the double-precision computation mode and the single-precision computation mode are possible. Even in such a computation device, it is possible to improve the computation performance of the computation device without increasing the circuit scale of the computation device.

The first computation mode may be a single-precision computation mode, and the second computation mode may be a half-precision computation mode. In this case, the computations in the single-precision computation mode and the half-precision computation mode are possible. Even in such a computation device, it is possible to improve the computation performance of the computation device without increasing the circuit scale of the computation device.

A computation system according to another aspect of the present disclosure includes: an arithmetic unit including a plurality of computation devices each of which is the computation device described above; and a plurality of processors sharing the arithmetic unit. Since the arithmetic unit includes the plurality of computation devices in this computation system, computation performance of the arithmetic unit can be improved without increasing a circuit scale of the arithmetic unit.

The plurality of processors may operate as a single processor when performing a matrix operation, and may operate as individual processors when performing an operation other than the matrix operation. In this case, since the matrix operation can be processed in parallel by the plurality of processors, the operation speed of the matrix operation can be improved.

The plurality of processors may perform a SIMD operation that operates with one instruction. In this case, since the plurality of processors operate in parallel, the processing speed can be increased.

The computation system may include a memory space accessible by a memory address including a processor ID that can uniquely identify each of the plurality of processors.

Each of the plurality of processors may be capable of accessing a memory area indicated by the memory address including the processor ID of the processor. In this case, the memory space can be expanded, and it is possible to increase a data size that can be handled by the computation system.

The plurality of processors may be ring-coupled, and each of the plurality of processors may sequentially transfer data having been received from the arithmetic unit to the other processors via the ring coupling. In this case, each of the plurality of processors can sequentially perform transfer (cyclic shift) of the data received from the arithmetic unit to the other element processors via the ring coupling. As a result, each of the plurality of processors can execute access (unaligned access) to a memory area that is not accessible directly by the processor.

Advantageous Effects of Invention

According to the present disclosure, it is possible to improve the computation performance of the computation device without increasing the circuit scale of the computation device.

DESCRIPTION OF EMBODIMENTS

Hereinafter, embodiments of the present disclosure will be described in detail with reference to the accompanying drawings. In the description of the drawings, the same or equivalent elements will be denoted using the same reference signs, and redundant descriptions thereof will be omitted.

Figure 1:
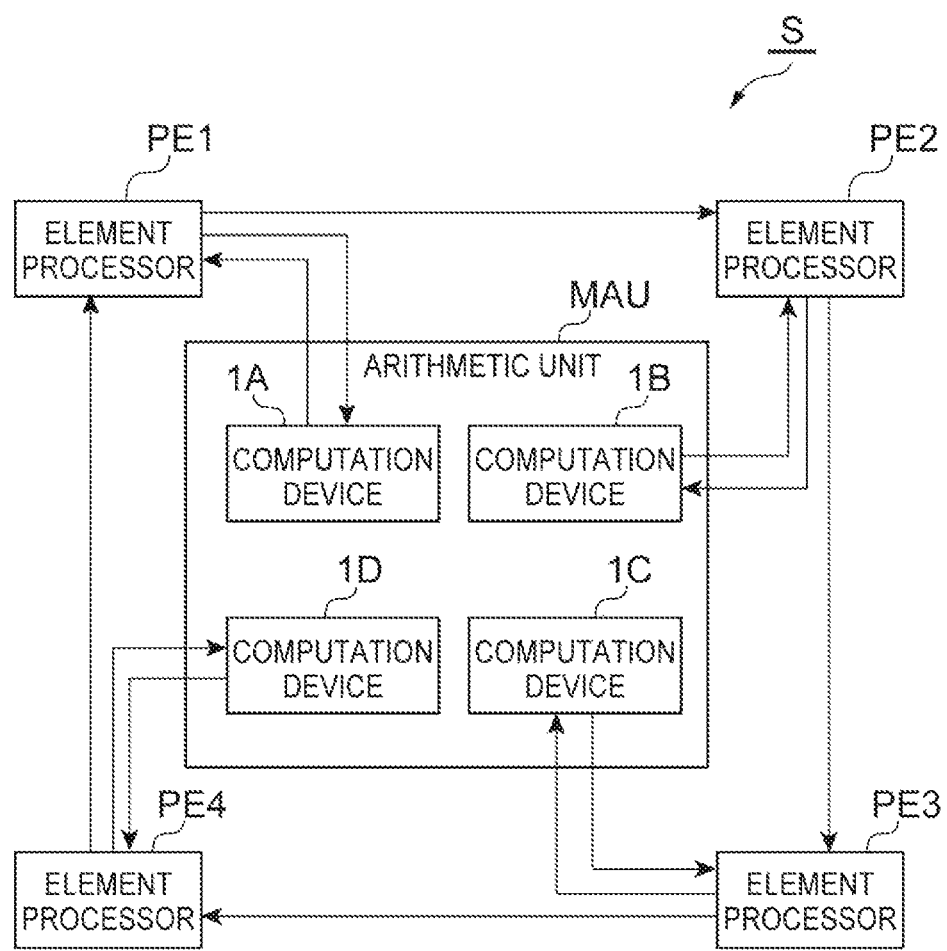
FIG. 1 is a diagram schematically illustrating a configuration of a computation system including a computation device according to an embodiment.

FIG. 1 is a diagram schematically illustrating a configuration of a computation system including a computation device according to an embodiment. A computation system S illustrated in FIG. 1 is a system configured to perform a matrix operation and other operations. The computation system S includes a plurality of element processors (here, four element processors PE1 to PE4) and an arithmetic unit MAU.

The element processors PE1 to PE4 share the single arithmetic unit MAU. The element processors PE1 to PE4 operate as one processor when performing the matrix operation, and the element processors PE1 to PE4 operate as individual processors when performing operations other than the matrix operation. The element processors PE1 to PE4 may operate as one processor even when performing operations other than the matrix operation. When the element processors PE1 to PE4 operate as one processor, the element processors PE1 to PE4 operate with one instruction, and thus, it is possible to regard that the element processors PE1 to PE4 perform a SIMD operation.

The element processors PE1 to PE4 are ring-coupled. Specifically, the element processor PE1 and the element processor PE2, the element processor PE2 and the element processor PE3, the element processor PE3 and the element processor PE4, and the element processor PE4 and the element processor PE1 are connected by data buses, respectively. In the element processors PE1 to PE4, processor IDs (00, 01, 10, and 11) that can uniquely identify the element processors are set in advance.

A memory space is set in the computation system S. A memory address of the memory space includes the processor ID. Since the computation system S includes the four element processors in the present embodiment, for example, low-order two bits of the memory address correspond to the processor ID. For example, the memory space corresponding to a 10-bit address is allocated to each of the element processors PE1 to PE4. Thus, the memory space of the computation system S is expanded to 12 bits. In other words, the memory space of the computation system S is divided into four equal spaces, and a memory area indicated by each memory address is accessed by an element processor indicated by a processor ID included in the memory address.

Each of the element processors PE1 to PE4 can execute access (align access) to a memory area indicated by a memory address including a processor ID of the corresponding element processor (assigned area), but is not capable of executing access (unaligned access) to a memory area indicated by a memory address including a processor ID different from the processor ID of the element processor (unassigned area). Each of the element processors PE1 to PE4 sequentially performs the data transfer to the other element processors via ring coupling (cyclic shift). As a result, each of the element processors PE1 to PE4 can execute access to the unassigned area. Each of the element processors PE1 to PE4 holds input data that is a computation target of the arithmetic unit MAU and output data that is a computation result of the arithmetic unit MAU in an area indicated by a memory address.

The arithmetic unit MAU performs, for example, a plurality of floating point operations in parallel. The arithmetic unit MAU can be applied to, for example, a processor for a deep neural network (DNN) and a convolutional neural network (CNN). The arithmetic unit MAU includes a plurality of computation devices (here, computation devices 1A to 1D). Each of the computation devices 1A to 1D is a device that performs a partial computation of the arithmetic unit MAU. The element processor PE1 can access registers of the computation device 1A. The element processor PE2c an access registers of the computation device 1B. The element processor PE3 can access registers of the computation device 1C. The element processor PE4 can access registers of the computation device 1D.

First Embodiment

Figure 2:
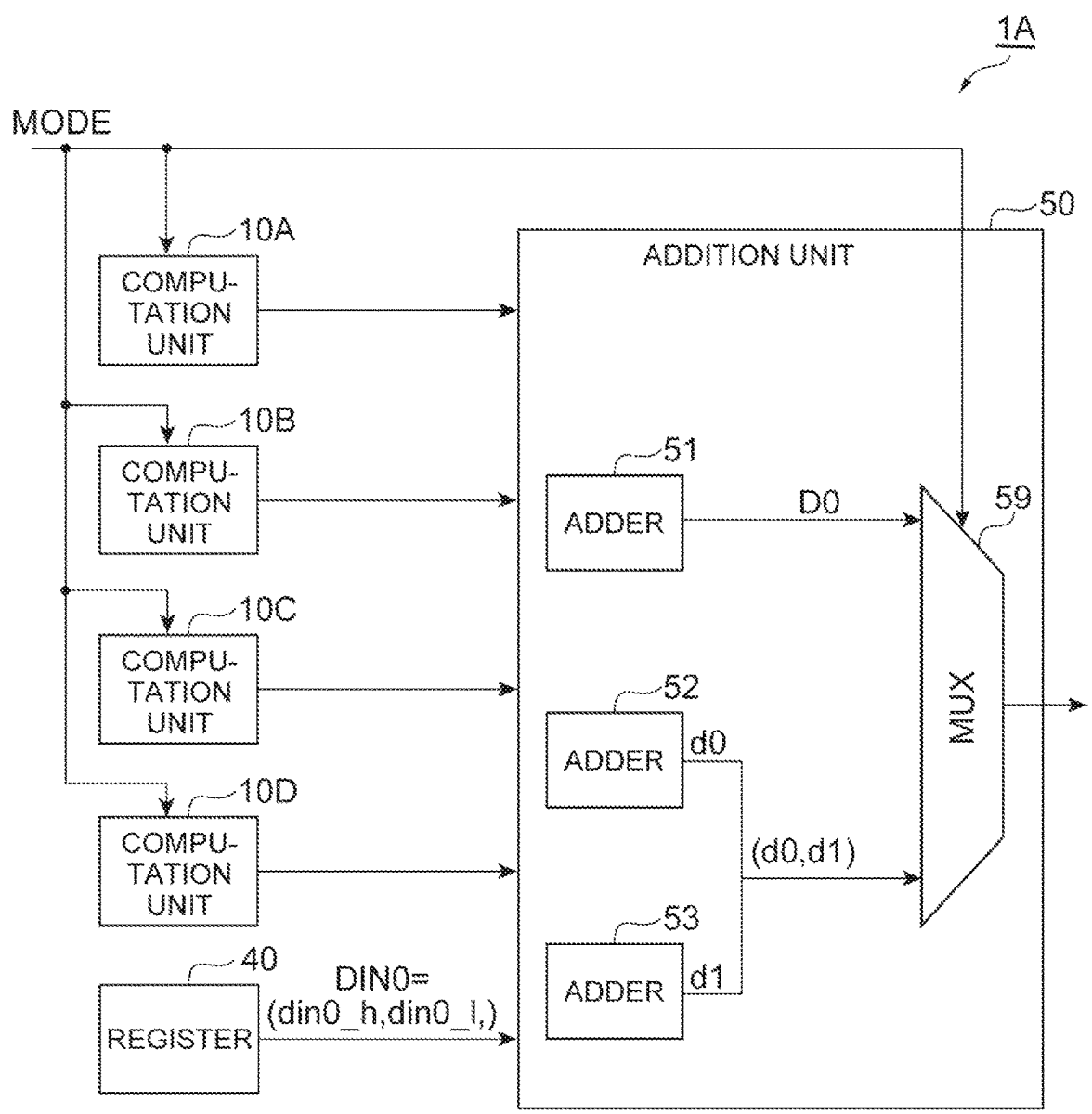
FIG. 2 is a diagram schematically illustrating a configuration of a computation device according to a first embodiment.

FIG. 2 is a diagram schematically illustrating a configuration of a computation device according to a first embodiment. The computation device 1A illustrated in FIG. 2 is a SIMD computer that can concurrently perform the same computation on a plurality of data. Incidentally, the computation devices 1A to 1D have the same configuration, and thus, the computation device 1A will be described herein.

The computation device 1A switches a computation mode of the computation device 1A to either a first computation mode or a second computation mode according to a MODE signal (mode signal). The first computation mode is a mode for performing a computation using data having a first bit number. The second computation mode is a mode for performing a computation using data having a second bit number. The second bit number is half the first bit number. The MODE signal is supplied from a device outside the computation device 1A (in the present embodiment, an element processor). The MODE signal is a signal indicating the computation mode of the computation device 1A. The MODE signal is a 1-bit signal, for example, and indicates either the first computation mode or the second computation mode.

Examples of the computation mode that can be executed by the computation device 1A include a double-precision computation mode, a single-precision computation mode, and a half-precision computation mode. The double-precision computation mode is a mode in which computation is performed using data having the number of bits twice the number of bits of data with single precision (hereinafter, referred to as "single-precision data"). The single-precision computation mode is a mode in which computation is performed using data having the number of bits half the number of bits of data with double precision (hereinafter referred to as "double-precision data"). The half-precision computation mode is a mode in which computation is performed using data having the number of bits which is a quarter of the number of bits of the double-precision data and half the number of bits of the single-precision data. In 32-bit architecture in which one word has 32 bits, the number of bits of the double-precision data is 64 bits, the number of bits of the single-precision data is 32 bits, and the number of bits of data with half precision (hereinafter referred to as "half-precision data") is 16 bits. That is, when the first computation mode is the double-precision computation mode, the second computation mode is the single-precision computation mode. In addition, when the first computation mode is the single-precision computation mode, the second computation mode is the half-precision computation mode.

The computation device 1A includes a plurality of computation units (the computation units 10A to 10D in the present embodiment), a register 40, and an addition unit 50. Each of the plurality of computation units 10A to 10D is a circuit that performs a partial computation of the computation device 1A.

Figure 3:
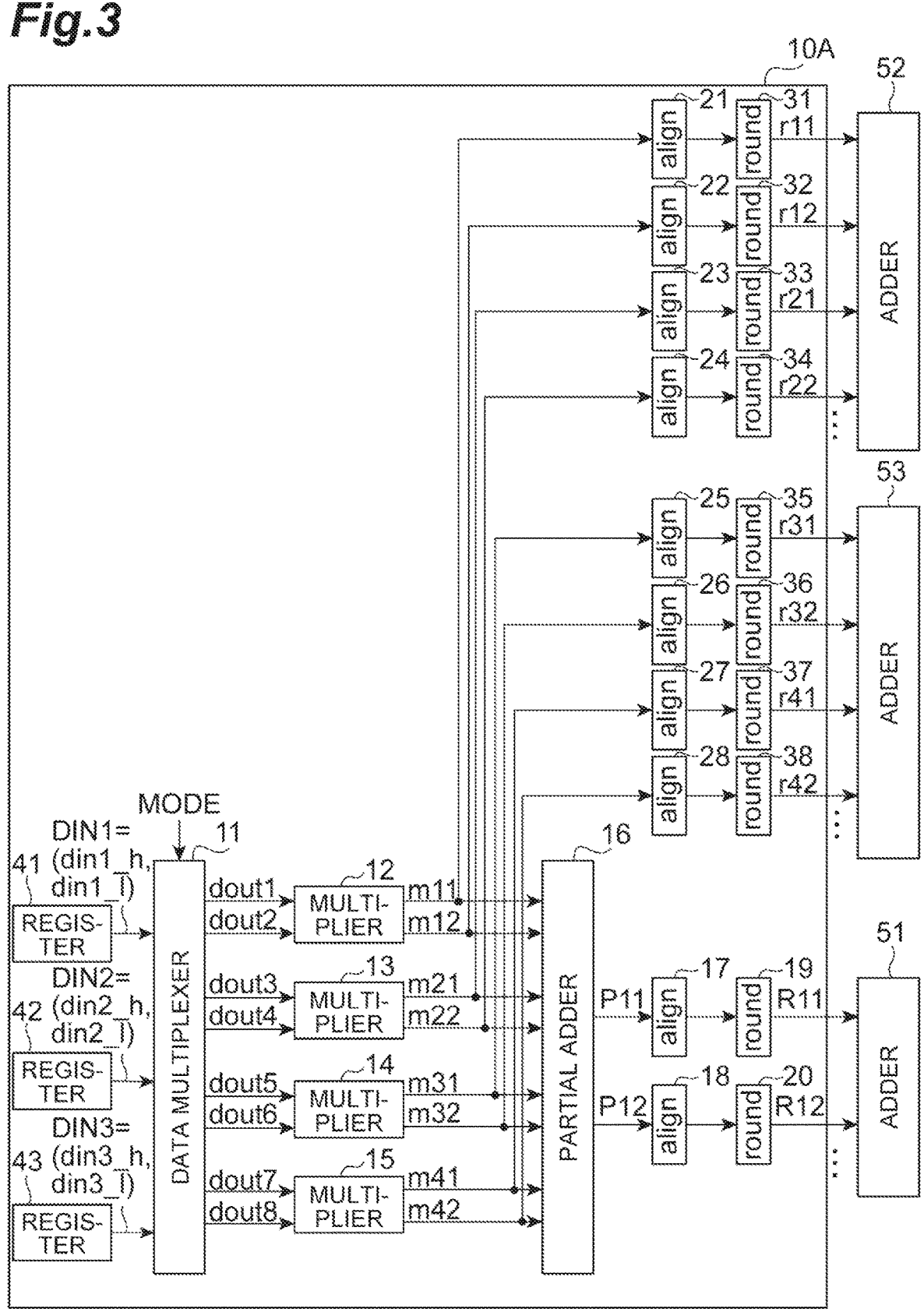
FIG. 3 is a diagram schematically illustrating a configuration of a computation unit included in the computation device of FIG. 2.

FIG. 3 is a diagram schematically illustrating a configuration of the computation unit included in the computation device of FIG. 2. Incidentally, the computation units 10A to 10D have the same configuration, and thus the computation unit 10A will be described herein. As illustrated in FIG. 3, the computation unit 10A includes a data multiplexer 11 (multiplexer), a multiplier 12 (first multiplier), a multiplier 13 (second multiplier), a multiplier 14 (third multiplier), a multiplier 15 (fourth multiplier), a register 41, a register 42, and a register 43. Two circuit elements that transmit and receive data are connected by a data bus having a bus width corresponding to the number of bits of data to be transmitted and received.

Each of the registers 41 to 43 is a circuit that stores and holds input data DIN1 to DIN3 (first to third input data), which are bit strings having the first bit number serving as computation targets. The first bit number corresponds to the number of bits of data used in the first computation mode, and is, for example, 64 bits. The input data DIN1 to DIN3 are set in the registers 41 to 43 from a device (element processor in the present embodiment) outside the computation device 1A. The input data DIN1 (first input data) includes high-order data din1_$h$ (first high-order data) and low-order data din1_1 (first low-order data). The high-order data din1_$h$ is an upper half bit string including the most significant bit (MSB) in the bit string of the input data DIN1. The low-order data din1_1 is a lower half bit string including the least significant bit (LSB) in the bit string of the input data DIN1.

The input data DIN2 (second input data) includes high-order data din2_$h$ (second high-order data) and low-order data din2_1 (second low-order data). The high-order data din2_$h$ is an upper half bit string including the MSB in the bit string of the input data DIN2. The low-order data din2_1 is a lower half bit string including the LSB in the bit string of the input data DIN2. The input data DIN3 (third input data) includes high-order data din3_$h$ (third high-order data) and low-order data din3_1 (third low-order data). The high-order data din3_$h$ is an upper half bit string including the MSB in the bit string of the input data DIN3. The low-order data din3_1 is a lower half bit string including the LSB in the bit string of the input data DIN3.

The high-order data din1_$h$, the low-order data droll, the high-order data dint h, the low-order data din2__1, the high-order data din3_$h$, and the low-order data din3_1 are bit strings having the second bit number. The second bit number corresponds to the number of bits of data used in the second computation mode, and is, for example, 32 bits.

The data multiplexer 11 is a circuit which receives the input data DIN1 to DIN3 output from the registers 41 to 43, and outputs a plurality of (eight in this case) output data dout1 to dout8 (first to eighth output data) in response to the MODE signal. Each of the plurality of output data dout1 to dout8 is a bit string having the second bit number.

When the MODE signal indicates the first computation mode, the data multiplexer 11 outputs the high-order data din2_h as the output data dout1 (first output data) and the output data dout5 (fifth output data) and outputs the low-order data din1_1 as the output data dout3 (third output data) and the output data dout7 (seventh output data). In addition, when the MODE signal indicates the first computation mode, the data multiplexer 11 outputs the high-order data din2_h as the output data dout2 (second output data) and the output data dout4 (fourth output data) and outputs the low-order data din1_1 as the output data dout6 (sixth output data) and the output data dout8 (eighth output data). The data multiplexer 11 does not receive the input data DIN3 when the MODE signal indicates the first computation mode.

When the MODE signal indicates the second computation mode, the data multiplexer 11 outputs the high-order data din1_h as the output data dout1 and the output data dout5, and outputs the low-order data din1_1 as the output data dout3 and the output data dout7. In addition, when the MODE signal indicates the second computation mode, the data multiplexer 11 outputs the high-order data din2_h as the output data dout2, and outputs the low-order data din2_1 as the output data dout4. In addition, when the MODE signal indicates the second computation mode, the data multiplexer 11 outputs the high-order data din3_h as the output data dout6, and outputs the low-order data din3_1 as the output data dout8.

The multipliers 12 to 15 are circuits that perform multiplication of two bit strings having the second bit number. The multiplier 12 multiplies the output data dout1 and the output data dout2. The multiplier 12 multiplies the two bit strings using, for example, a Wallace Tree circuit, and outputs an intermediate result m11 (first intermediate result) and an intermediate result m12 (second intermediate result), which are results obtained during the multiplication by the multiplier 12, as multiplication results (first multiplication results). The intermediate result m11 and the intermediate result m12 are bit strings having the second bit number. The intermediate result m11 and the intermediate result m12 are values that do not cause a computation delay of the multiplier 12, and are, for example, partial total values that do not cause a carry. The multiplier 12 outputs the intermediate result m11 to an alignment unit 21, outputs the intermediate result m12 to an alignment unit 22, and outputs the intermediate result m11 and the intermediate result m12 to a partial adder 16.

The multiplier 13 multiplies the output data dout3 and the output data dout4. The multiplier 13 multiplies the two bit strings using, for example, a Wallace Tree circuit, and outputs an intermediate result m21 (third intermediate result) and an intermediate result m22 (fourth intermediate result), which are results obtained during the multiplication by the multiplier 13, as multiplication results (second multiplication results). The intermediate result m21 and the intermediate result m22 are bit strings having the second bit number. The intermediate result m21 and the intermediate result m22 are values that do not cause a computation delay of the multiplier 13, and are, for example, partial total values that do not cause a carry. The multiplier 13 outputs the intermediate result m21 to an alignment unit 23, outputs the intermediate result m22 to an alignment unit 24, and outputs the intermediate result m21 and the intermediate result m22 to the partial adder 16.

The multiplier 14 multiplies the output data dout5 and the output data dout6. The multiplier 14 multiplies the two bit strings using, for example, a Wallace Tree circuit, and outputs an intermediate result m31 (fifth intermediate result) and an intermediate result m32 (sixth intermediate result), which are results obtained during the multiplication by the multiplier 14, as multiplication results (third multiplication results). The intermediate result m31 and the intermediate result m32 are bit strings having the second bit number. The intermediate result m31 and the intermediate result m32 are values that do not cause a computation delay of the multiplier 14, and are, for example, partial total values that do not cause a carry. The multiplier 14 outputs the intermediate result m31 to an alignment unit 25, outputs the intermediate result m32 to an alignment unit 26, and outputs the intermediate result m31 and the intermediate result m32 to the partial adder 16.

The multiplier 15 multiplies the output data dout7 and the output data dout8. The multiplier 15 multiplies the two bit strings using, for example, a Wallace Tree circuit, and outputs an intermediate result m41 (seventh intermediate result) and an intermediate result m42 (eighth intermediate result), which are results obtained during the multiplication by the multiplier 15, as multiplication results (fourth multiplication results). The intermediate result m41 and the intermediate result m42 are bit strings having the second bit number. The intermediate result m41 and the intermediate result m42 are values that do not cause a computation delay of the multiplier 15, and are, for example, partial total values that do not cause a carry. The multiplier 15 outputs the intermediate result m41 to an alignment unit 27, outputs the intermediate result m42 to an alignment unit 28, and outputs the intermediate result m41 and the intermediate result m42 to the partial adder 16.

The computation unit 10A further includes the partial adder 16, an alignment unit 17, an alignment unit 18, a rounding unit 19, and a rounding unit 20 in order for the computation in the first computation mode.

The partial adder 16 is a circuit that generates a multiplication result in the first computation mode. Specifically, the partial adder 16 ads the multiplication results of the multipliers 12 to 15. In the present embodiment, the partial adder 16 ads the intermediate result m11, the intermediate result m12, the intermediate result m21, the intermediate result m22, the intermediate result m31, the intermediate result m32, the intermediate result m41, and the intermediate result m42. The partial adder 16 outputs an intermediate result P11 and an intermediate result P12, which are results obtained during the addition by the partial adder 16, as addition results. The intermediate result P11 and the intermediate result P12 are bit strings having the first bit number. The intermediate result P11 and the intermediate result P12 are values that do not cause a computation delay of the partial adder 16, and are, for example, partial total values that do not cause a carry.

The alignment unit 17 is a circuit that performs a shift process (right bit shift) on a mantissa part of the intermediate result P11 in order to align exponent parts of the bit strings to be added by an adder 51 (third adder) to be described later. The alignment unit 17 outputs a processing result of the alignment unit 17 to the rounding unit 19. The alignment unit 18 is a circuit that performs a shift process (right bit shift) on a mantissa part of the intermediate result P12 in order to align exponent parts of the bit strings to be added by the adder 51. The alignment unit 18 outputs a processing result of the alignment unit 18 to the rounding unit 20.

The rounding unit 19 is a circuit that performs a rounding process on the intermediate result P11 on which has been performed the shift process by the alignment unit 17. The rounding unit 19 outputs a computation result R11 of the rounding unit 19 to the addition unit 50 (adder 51). The computation result R11 is a bit string having the first bit number. The rounding unit 20 is a circuit that performs a rounding process on the intermediate result P12 on which has been performed the shift process by the alignment unit 18. The rounding unit 20 outputs a computation result R12 of the rounding unit 20 to the addition unit 50 (adder 51). The computation result R12 is a bit string having the first bit number.

The computation unit 10A further includes alignment units 21 to 28 and rounding units 31 to 38 in order for the computation in the second computation mode.

The alignment unit 21 is a circuit that performs a shift process (right bit shift) on a mantissa part of the intermediate result m11 in order to align exponent parts of the bit strings to be added by an adder 52 (first adder) to be described later. The alignment unit 21 outputs a processing result of the alignment unit 21 to the rounding unit 31. The alignment unit 22 is a circuit that performs a shift process (right bit shift) on a mantissa part of the intermediate result m12 in order to align exponent parts of the bit strings to be added by the adder 52. The alignment unit 22 outputs a processing result of the alignment unit 22 to the rounding unit 32. The alignment unit 23 is a circuit that performs a shift process (right bit shift) on a mantissa part of the intermediate result m21 in order to align exponent parts of the bit strings to be added by the adder 52. The alignment unit 23 outputs a processing result of the alignment unit 23 to the rounding unit 33. The alignment unit 24 is a circuit that performs a shift process (right bit shift) on a mantissa part of the intermediate result m22 in order to align exponent parts of the bit strings to be added by the adder 52. The alignment unit 24 outputs a processing result of the alignment unit 24 to the rounding unit 34.

The alignment unit 25 is a circuit that performs a shift process (right bit shift) on a mantissa part of the intermediate result m31 in order to align exponent parts of the bit strings to be added by an adder 53 (second adder) to be described later. The alignment unit 25 outputs a processing result of the alignment unit 25 to the rounding unit 35. The alignment unit 26 is a circuit that performs a shift process (right bit shift) on a mantissa part of the intermediate result m32 in order to align exponent parts of the bit strings to be added by the adder 53. The alignment unit 26 outputs a processing result of the alignment unit 26 to the rounding unit 36. The alignment unit 27 is a circuit that performs a shift process (right bit shift) on a mantissa part of the intermediate result m41 in order to align exponent parts of the bit strings to be added by the adder 53. The alignment unit 27 outputs a processing result of the alignment unit 27 to the rounding unit 37. The alignment unit 28 is a circuit that performs a shift process (right bit shift) on a mantissa part of the intermediate result m42 in order to align exponent parts of the bit strings to be added by the adder 53. The alignment unit 28 outputs a processing result of the alignment unit 28 to the rounding unit 38.

The rounding unit 31 is a circuit that performs a rounding process on the intermediate result m1 l on which has been performed the shift process by the alignment unit 21. The rounding unit 31 outputs a computation result r11 of the rounding unit 31 to the addition unit 50 (adder 52). The rounding unit 32 is a circuit that performs a rounding process on the intermediate result m12 on which has been performed the shift process by the alignment unit 22. The rounding unit 32 outputs a computation result r12 of the rounding unit 32 to the addition unit 50 (adder 52). The rounding unit 33 is a circuit that performs a rounding process on the intermediate result m21 on which has been performed the shift process by the alignment unit 23. The rounding unit 33 outputs a computation result r21 of the rounding unit 33 to the addition unit 50 (adder 52). The rounding unit 34 is a circuit that performs a rounding process on the intermediate result m22 on which has been performed the shift process by the alignment unit 24. The rounding unit 34 outputs a computation result r22 of the rounding unit 34 to the addition unit 50 (adder 52). Each of the computation results r11, r12, r21, and r22 is a bit string having the second bit number.

The rounding unit 35 is a circuit that performs a rounding process on the intermediate result m31 on which has been performed the shift process by the alignment unit 25. The rounding unit 35 outputs a computation result r31 of the rounding unit 35 to the addition unit 50 (adder 53). The rounding unit 36 is a circuit that performs a rounding process on the intermediate result m32 on which has been performed the shift process by the alignment unit 26. The rounding unit 36 outputs a computation result r32 of the rounding unit 36 to the addition unit 50 (adder 53). The rounding unit 37 is a circuit that performs a rounding process on the intermediate result m41 on which has been performed the shift process by the alignment unit 27. The rounding unit 37 outputs a computation result r41 of the rounding unit 37 to the addition unit 50 (adder 53). The rounding unit 38 is a circuit that performs a rounding process on the intermediate result m42 on which has been performed the shift process by the alignment unit 28. The rounding unit 38 outputs a computation result r42 of the rounding unit 38 to the addition unit 50 (adder 53). Each of the computation results r31, r32, r41, and r42 is a bit string having the second bit number.

Returning to FIG. 2, the description of the computation device 1A will be continued. The addition unit 50 includes the adder (final adder) 51, the adder (final adder) 52, the adder (final adder) 53, and a multiplexer 59 (selector). The register 40 is a circuit that stores and holds input data DIN0 that is a bit string having the first bit number serving as a computation target. The input data DIN0 is set in the register 40 from a device outside the computation device 1A (element processor in the present embodiment). The input data DIN0 includes high-order data din0_$h$ and low-order data din0_1. The high-order data din0_$h$ and the low-order data din0_1 are bit strings having the second bit number. The register 40 outputs the high-order data din0_$h$ to the adder 52, outputs the low-order data din0_1 to the adder 53, and outputs the input data DIN0 to the adder 51.

The adder 51 is a circuit that generates a computation result D0 (third addition result) in the first computation mode. Specifically, addition results of the partial adders 16 of the computation units 10A to 10D are added to the input data DIN0. In the present embodiment, the adder 51 ads the computation results R11 of the computation units 10A to 10D, the computation results R12 of the computation units 10A to 10D, and the input data DIN0. The adder 51 outputs an addition result of the adder 51 to the multiplexer 59 as the computation result D0. The computation result D0 is a bit string having the first bit number.

The adder 52 is a circuit that generates a computation result d0 (first addition result) in the second computation mode. Specifically, the adder 52 ads a multiplication result of the multiplier 12 and a multiplication result of the multiplier 13 of each of the computation units 10A to 10D and the high-order data din0_$h$. In the present embodiment, the adder 52 ads the computation results r11, r12, r21, and r22 of the computation units 10A to 10D and the high-order data din0_$h$. The adder 52 outputs an addition result of the adder 52 to the multiplexer 59 as the computation result d0. The computation result d0 is a bit string having the second bit number.

The adder 53 is a circuit that generates a computation result d1 (second addition result) in the second computation mode. Specifically, the adder 53 ads a multiplication result of the multiplier 14 and a multiplication result of the multiplier 15 of each of the computation units 10A to 10D and the low-order data din0_1. In the present embodiment, the adder 53 ads the computation results r31, r32, r41, and r42 of the computation units 10A to 10D and the low-order data din0_1. The adder 53 outputs an addition result of the adder 53 to the multiplexer 59 as the computation result d1. The computation result d1 is a bit string having the second bit number. Incidentally, a computation result (d0, d1) is generated by combining the computation result d0 and the computation result d1. The computation result (d0, d1) is a bit string having the computation result d0 as a high-order bit and the computation result d1 as a low-order bit. That is, the computation result (d0, d1) is the bit string having the first bit number.

The multiplexer 59 is a circuit that receives the computation result D0 and the computation result (d0, d1) and outputs either the computation result D0 or the computation result (d0, d1) in response to the MODE signal. The multiplexer 59 outputs the computation result D0 when the MODE signal indicates the first computation mode. The multiplexer 59 outputs the computation result (d0, d1) when the MODE signal indicates the second computation mode.

Figure 4:
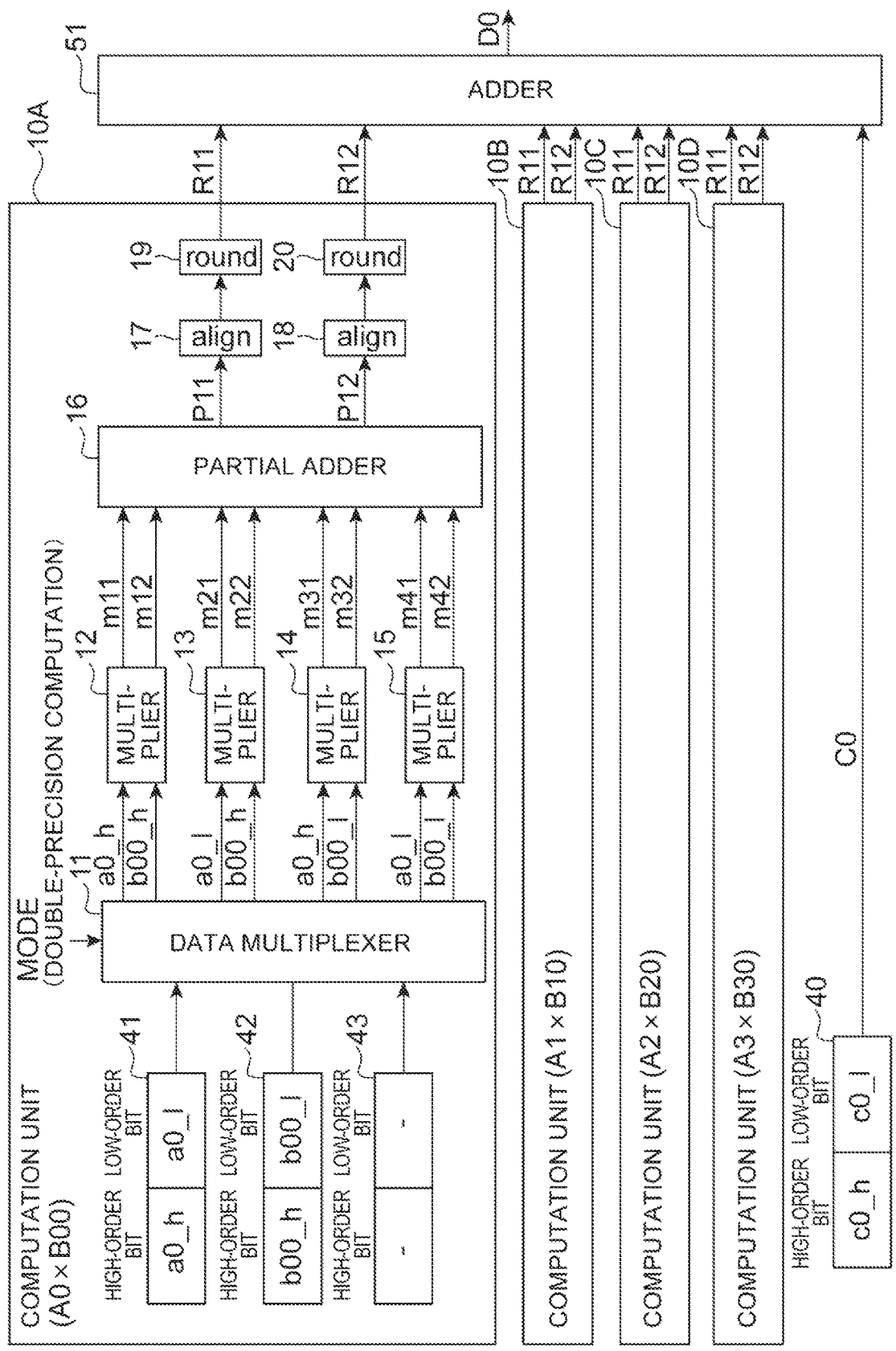
FIG. 4 is a diagram for describing an operation in a first computation mode of the computation device of FIG. 2.

Next, operations of the computation devices 1A to 1D in the first computation mode will be described with reference to FIGS. 2 to 4. FIG. 4 is a diagram for describing the operation in the first computation mode of the computation device of FIG. 2. Here, a description will be given regarding an example in which the double-precision computation mode is used as the first computation mode, and the arithmetic unit MAU performs a double-precision matrix operation shown in Formula (1). This matrix operation is an operation using double-precision data A0 to A3, double-precision data B00 to B03, B10 to B13, B20 to B23, and B30 to B33, and double-precision data C0 to C3.

[Formula 1]
$$(A0\ A1\ A2\ A3) \times \begin{pmatrix} B00 & B01 & B02 & B03 \\ B10 & B11 & B12 & B13 \\ B20 & B21 & B22 & B23 \\ B30 & B31 & B32 & B33 \end{pmatrix} + (C0\ C1\ C2\ C3) \quad (1)$$

The computation devices 1A to 1D perform matrix operations shown in Formulas (2) to (5), respectively.

[Formula 2]
$$D0 = (A0, A1, A2, A3) \times (B00, B10, B20, B30) + C0 \quad (2)$$
$$= A0 \times B00 + A1 \times B10 + A2 \times B20 + A3 \times B30 + C0$$

[Formula 3]
$$D1 = (A0, A1, A2, A3) \times (B01, B11, B21, B31) + C1 \quad (3)$$
$$= A0 \times B01 + A1 \times B11 + A2 \times B21 + A3 \times B31 + C1$$

[Formula 4]
$$D2 = (A0, A1, A2, A3) \times (B02, B12, B22, B32) + C2 \quad (4)$$
$$= A0 \times B02 + A1 \times B12 + A2 \times B22 + A3 \times B32 + C0$$

[Formula 5]
$$D3 = (A0, A1, A2, A3) \times (B03, B13, B23, B33) + C3 \quad (5)$$
$$= A0 \times B03 + A1 \times B13 + A2 \times B23 + A3 \times B33 + C3$$

The same operation is performed in the computation devices 1A to 1D although data serving as a computation target is different, and thus, the computation device 1A will be described herein. The computation unit 10A of the computation device 1A computes A0×B00. The computation unit 10B of the computation device 1A computes A1×B10. The computation unit 10C of the computation device 1A computes A2×B20. The computation unit 10D of the computation device 1A computes A3×B30. The same operation is performed in the respective computation units 10A to 10D although data serving as a computation target is different, and thus, the operation of the computation unit 10A will be mainly described.

The double-precision data A0 includes high-order data a0_h and low-order data a0_1. The high-order data a0_h is an upper half bit string including the MSB in a bit string of the double-precision data A0, and has the same number of bits as single-precision data. The low-order data a0_1 is a lower half bit string including the LSB in the bit string of the double-precision data A0, and has the same number of bits as single-precision data. The double-precision data B00 includes high-order data b00_h and low-order data b00_1. The high-order data b00_h is an upper half bit string including the MSB in a bit string of the double-precision data B00, and has the same number of bits as single-precision data. The low-order data a0_1 is a lower half bit string including the LSB in the bit string of the double-precision data B00, and has the same number of bits as single-precision data.

As shown in Formula (6), the computation unit 10A multiplies the double-precision data A0 and the double-precision data B00 by dividing each of the double-precision data A0 and the double-precision data B00 into two data having the number of bits of single-precision data.

[Formula 6]
$$A0 \times B00 = (a0\_h + a0\_l) \times (b00\_h + b00\_l) \quad (6)$$
$$= a0\_h \times b00\_h + a0\_l \times b00\_h + a0\_h \times b00\_l + a0\_l \times b00\_l$$

This will be described in detail hereinafter. The register 41 stores the double-precision data A0, and the double-precision data A0 is supplied from the register 41 to the data multiplexer 11 as the input data DIN1. The register 42 stores the double-precision data B00, and the double-precision data B00 is supplied from the register 42 to the data multiplexer 11 as the input data DIN2. The register 43 does not store valid data.

The MODE signal indicating the double-precision computation mode (first computation mode) is supplied to the data multiplexer 11. Therefore, the data multiplexer 11 outputs the high-order data a0_h as the output data dout1 and the output data dout5, and outputs the low-order data a0_1 as the output data dout3 and the output data dout7. In addition, the data multiplexer 11 outputs the high-order data b00_h as the output data dout2 and the output data dout4, and outputs the low-order data b00_l as the output data dout6 and the output data dout8.

Then, the multiplier 12 multiplies the high-order data a0_h and the high-order data b00_h, and outputs the intermediate result m11 and the intermediate result m12. Similarly, the multiplier 13 multiplies the low-order data a0_l and the high-order data b00_h, and outputs the intermediate result m21 and the intermediate result m22. Similarly, the multiplier 14 multiplies the high-order data a0_h and the low-order data b00_l, and outputs the intermediate result m31 and the intermediate result m32. Similarly, the multiplier 15 multiplies the low-order data a0_l and the low-order data b00_l, and outputs the intermediate result m41 and the intermediate result m42.

Then, the partial adder 16 ads the intermediate result m11, the intermediate result m12, the intermediate result m21, the intermediate result m22, the intermediate result m31, the intermediate result m32, the intermediate result m41, and the intermediate result m42, and outputs the intermediate result P11 and the intermediate result P12. Then, the alignment unit 17 performs a shift process on a mantissa part of the intermediate result P11 and outputs a processing result of the alignment unit 17 to the rounding unit 19. Similarly, the alignment unit 18 performs a shift process on a mantissa part of the intermediate result P12 and outputs a processing result of the alignment unit 18 to the rounding unit 20.

Then, the rounding unit 19 performs a rounding process on the intermediate result P11, on which has been performed the shift process by the alignment unit 17, and outputs the computation result R11 to the adder 51. Similarly, the rounding unit 20 performs a rounding process on the intermediate result P12, on which has been performed the shift process by the alignment unit 18, and outputs the computation result R12 to the adder 51.

The same computation is performed even in the computation unit 10B, the computation unit 10C, and the computation unit 10D, and each of the computation units 10A to 10D outputs the computation result R11 and the computation result R12 to the adder 51. In addition, the register 40 stores the double-precision data C0, and the double-precision data C0 is supplied from the register 40 to the adder 51.

Then, the adder 51 ads the computation results R11 and the computation results R12 of the computation units 10A to 10D and the double-precision data C0 supplied from the register 40, and outputs an addition result of the adder 51 to the multiplexer 59 as the computation result D0. At this time, the alignment units 21 to 28, the rounding units 31 to 38, the adder 52, and the adder 53 also perform computation, and the computation result (d0, d1) is output to the multiplexer 59. Since the MODE signal indicating the double-precision computation mode is supplied to the multiplexer 59, the multiplexer 59 outputs the computation result D0. In this manner, the double-precision matrix operation is performed.

Figure 5:
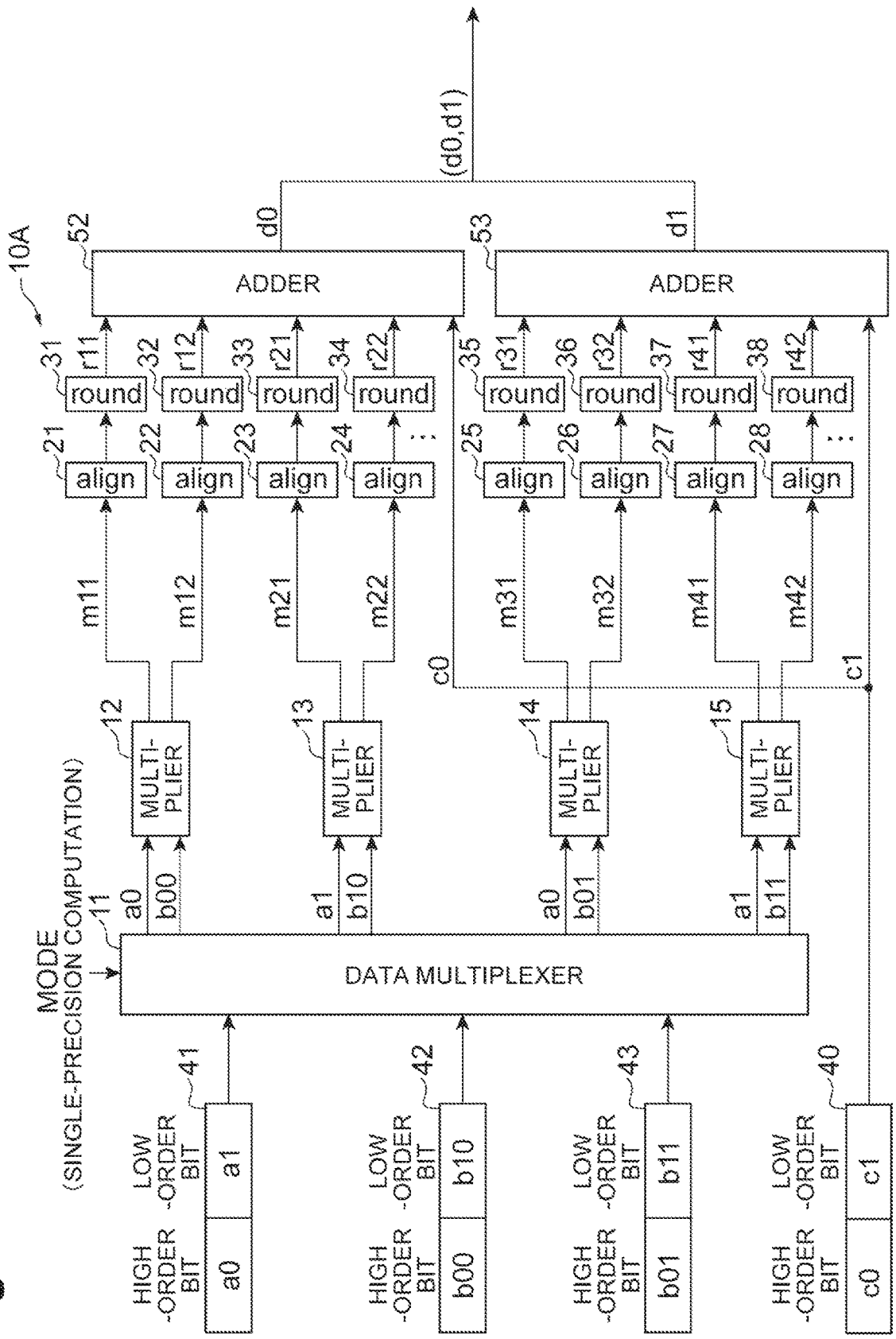
FIG. 5 is a diagram for describing an operation in a second computation mode of the computation device of FIG. 2.

Next, operations of the computation devices 1A to 1D in the second computation mode will be described with reference to FIGS. 2, 3, and 5. FIG. 5 is a diagram for describing the operation in the second computation mode of the computation device of FIG. 2. Here, a description will be given regarding an example in which the single-precision computation mode is used as the second computation mode, and the arithmetic unit MAU performs a single-precision matrix operation shown in Formula (7). The matrix operation shown in Formula (7) is an operation using single-precision data a0 to a7, single-precision data b00 to b07, b10 to b17, b20 to b27, b30 to b37, b40 to b47, b50 to b57, b60 to b67, and b70 to b77, and single-precision data c0 to c7.

[Formula 7]

$$(a0\ a1\ \cdots\ a7) \times \begin{pmatrix} b00 & b01 & \cdots & b07 \\ b10 & b11 & \cdots & b17 \\ \vdots & \vdots & \ddots & \vdots \\ b70 & b71 & \cdots & b77 \end{pmatrix} + (c0\ c1\ \cdots\ c7) \quad (7)$$

The computation device 1A performs matrix operations shown in Formulas (8) and (9).

[Formula 8]

$$d0=(a0, a1, a2, a3, a4, a5, a6, a7) \times (b00, b10, b20, b30, b40, b50, b60, b70)+c0 \quad (8)$$

[Formula 9]

$$d1=(a0, a1, a2, a3, a4, a5, a6, a7) \times (b01, b11, b21, b31, b41, b51, b61, b71)+c1 \quad (9)$$

The computation device 1B performs matrix operations shown in Formulas (10) and (11).

[Formula 10]

$$d2=(a0, a1, a2, a3, a4, a5, a6, a7) \times (b02, b12, b22, b32, b42, b52, b62, b72)+c2 \quad (10)$$

[Formula 11]

$$d3=(a0, a1, a2, a3, a4, a5, a6, a7) \times (b03, b13, b23, b33, b43, b53, b63, b73)+c3 \quad (11)$$

The computation device 1C performs matrix operations shown in Formulas (12) and (13).

[Formula 12]

$$d4=(a0, a1, a2, a3, a4, a5, a6, a7) \times (b04, b14, b24, b34, b44, b54, b64, b74)+c4 \quad (12)$$

[Formula 13]

$$d5=(a0, a1, a2, a3, a4, a5, a6, a7) \times (b05, b15, b25, b35, b45, b55, b65, b75)+c5 \quad (13)$$

The computation device 1D performs matrix operations shown in Formulas (14) and (15).

[Formula 14]

$$d6=(a0, a1, a2, a3, a4, a5, a6, a7) \times (b06, b16, b26, b36, b46, b56, b66, b76)+c6 \quad (14)$$

[Formula 15]

$$d7=(a0, a1, a2, a3, a4, a5, a6, a7) \times (b07, b17, b27, b37, b47, b57, b67, b77)+c7 \quad (15)$$

The same operation is performed in the computation devices 1A to 1D although data serving as a computation target is different, and thus, the computation device 1A will be described herein. The computation unit 10A of the computation device 1A computes a0×b00+a1×b10 and computes a0×b01+a1×b11. The computation unit 10B of the computation device 1A computes a2×b20+a3×b30 and computes a2×b21+a3×b31. The computation unit 10C of the computation device 1A computes a4×b40+a5×b50 and computes a4×b41+a5×b51. The computation unit 10D of the computation device 1A computes a6×b60+a7×b70 and computes a6×b61+a7×b71. The same operation is performed in the respective computation units 10A to 10D although data serving as a computation target is different, and thus, the operation of the computation unit 10A will be mainly described.

The single-precision data a0 is stored in high-order bits of the register 41, and the single-precision data a1 is stored in low-order bits of the register 41. The single-precision data a0 and the single-precision data a1 are supplied from the register 41 to the data multiplexer 11 as the input data DNI1. The single-precision data b00 is stored in high-order bits of the register 42, and the single-precision data b10 is stored in low-order bits of the register 42. The single-precision data b00 and the single-precision data b10 are supplied from the register 42 to the data multiplexer 11 as the input data DIN2. The single-precision data b01 is stored in high-order bits of the register 43, and the single-precision data b11 is stored in low-order bits of the register 43. The single-precision data b01 and the single-precision data b11 are supplied from the register 43 to the data multiplexer 11 as the input data DIN3.

The MODE signal indicating the single-precision computation mode is supplied to the data multiplexer 11. Thus, the data multiplexer 11 outputs the single-precision data a0 as the output data dout1 and the output data dout5, and outputs the single-precision data a1 as the output data dout3 and the output data dout7. In addition, the data multiplexer 11 outputs the single-precision data b00 as the output data dout2, and outputs the single-precision data b10 as the output data dout4. In addition, the data multiplexer 11 outputs the single-precision data b01 as the output data dout6 and outputs the single-precision data b11 as the output data dout8.

Then, the multiplier 12 multiplies the single-precision data a0 and the single-precision data b00, and outputs the intermediate result m11 and the intermediate result m12. Similarly, the multiplier 13 multiplies the single-precision data a1 and the single-precision data b10, and outputs the intermediate result m21 and the intermediate result m22. Similarly, the multiplier 14 multiplies the single-precision data a0 and the single-precision data b01, and outputs the intermediate result m31 and the intermediate result m32. Similarly, the multiplier 15 multiplies the single-precision data a1 and the single-precision data b11, and outputs the intermediate result m41 and the intermediate result m42.

Then, the alignment units 21 to 28 perform shift processes on mantissa parts of the intermediate results m11, m12, m21, m22, m31, m32, m41, and m42, and output processing results of the alignment units 21 to 28 to the rounding units 31 to 38. Then, the rounding units 31 to 34 perform rounding processes on the intermediate results m11, m12, m21, and m22, on which have been performed the shift processes by the alignment units 21 to 24, and output the computation results r12, r21, and r22 to the adder 52. Similarly, the rounding units 35 to 38 perform rounding processes on the intermediate results m31, m32, m41, and m42, on which have been performed the shift processes by the alignment units 25 to 28, and output the computation results r31, r32, r41, and r42 to the adder 53.

The same computation is performed even in the computation unit 10B, the computation unit 10C, and the computation unit 10D, and each of the computation units 10A to 10D outputs the computation results r11, r12, r21, and r22 to the adder 52, and outputs the computation results r31, r32, r41, and r42 to the adder 53. In addition, the single-precision data c0 is stored in high-order bits of the register 40, and the single-precision data c1 is stored in low-order bits of the register 40. Then, the single-precision data c0 is supplied from the register 40 to the adder 52, and the single-precision data c1 is supplied to the adder 53.

Then, the adder 52 ads the computation results r11, r12, r21, and r22 of the computation units 10A to 10D and the single-precision data c0 supplied from the register 40, and outputs an addition result of the adder 52 as the computation result d0. In addition, the adder 53 ads the computation results r31, r32, r41, and r42 of the computation units 10A to 10D and the single-precision data c1 supplied from the register 40, and outputs an addition result of the adder 53 as the computation result d1. Then, the computation result (d0, d1) is generated by combining the computation result d0 and the computation result d1 and is supplied to the multiplexer 59. At this time, the partial adder 16, the alignment units 17 and 18, the rounding units 19 and 20, and the adder 51 also perform computation, and the computation result D0 is output to the multiplexer 59. Since the MODE signal indicating the single-precision computation mode is supplied to the multiplexer 59, the multiplexer 59 outputs the computation result (d0, d1). In this manner, the two single-precision matrix operations are performed.

Figure 6:
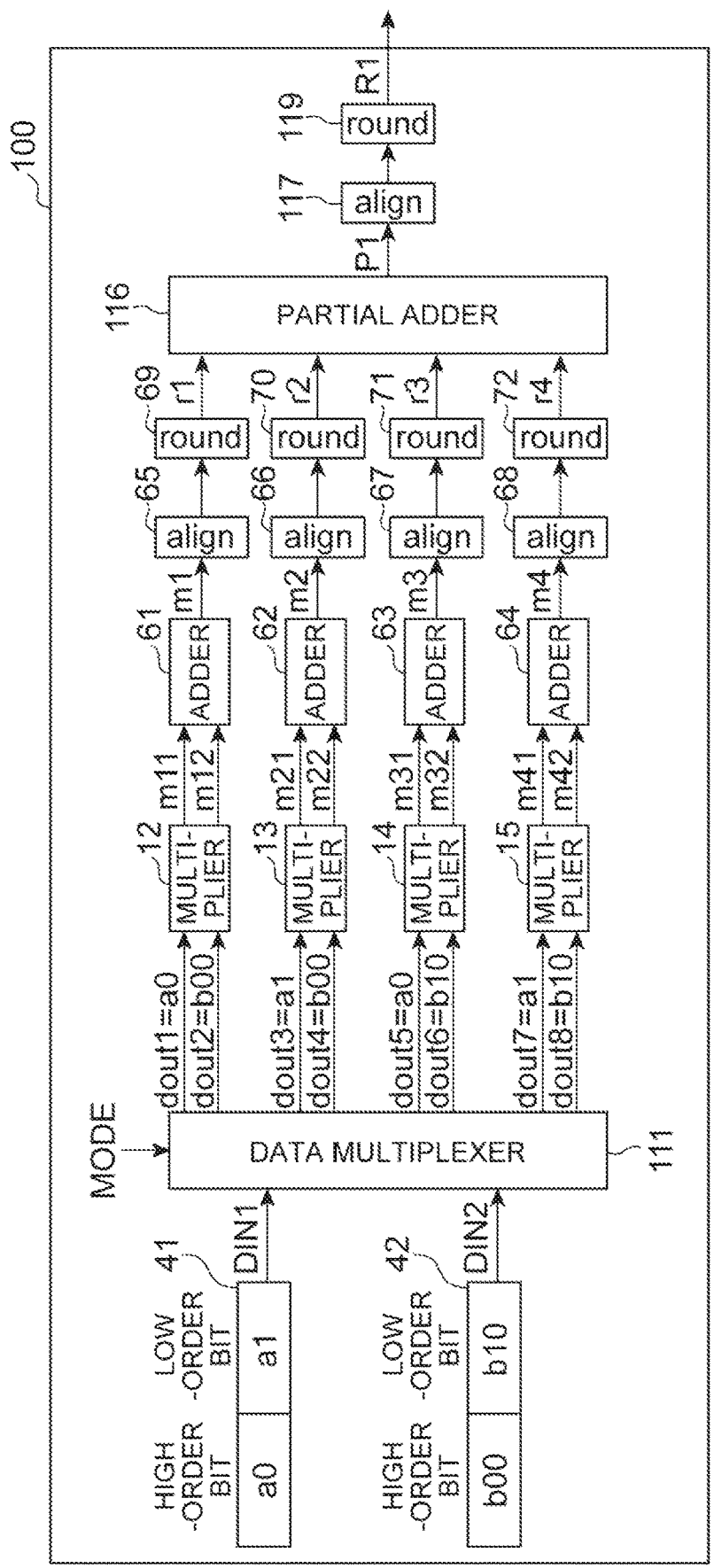
FIG. 6 is a diagram schematically illustrating a configuration of a computation unit included in a computation device according to a comparative example.

Next, functions and effects of the computation devices 1A to 1D will be described in comparison with a computation device according to a comparative example. FIG. 6 is a diagram schematically illustrating a configuration of a computation unit included in the computation device according to the comparative example. A computation unit 100 illustrated in FIG. 6 is mainly different from the computation units 10A to 10D in terms that the register 43 is not included, that a data multiplexer 111 is included instead of the data multiplexer 11, that adders 61 to 64, alignment units 65 to 68, and rounding units 69 to 72 are included instead of the alignment units 21 to 28 and the rounding units 31 to 38, that a partial adder 116 is included instead of the partial adder 16, and that an alignment unit 117 and a rounding unit 119 are included instead of the alignment units 17 and 18 and the rounding units 19 and 20.

A MODE signal is not supplied to the data multiplexer 111. Thus, the data multiplexer 111 outputs high-order data din1_h as output data dout1 and output data dout5, and outputs low-order data din1_1 as output data dout3 and output data dout7 regardless of a computation mode. In addition, the data multiplexer 111 outputs high-order data din2_h as output data dout2 and output data dout4, and outputs low-order data din2_1 as output data dout6 and output data dout8.

The adder 61 is a circuit that generates a multiplication result m1 of a multiplier 12b y adding an intermediate result m11 and an intermediate result m12. The adder 61 outputs the multiplication result m1 to the alignment unit 65. The adder 62 is a circuit that generates a multiplication result m2 of a multiplier 13 by adding an intermediate result m21 and an intermediate result m22. The adder 62 outputs the multiplication result m2 to the alignment unit 66. The adder 63 is a circuit that generates a multiplication result m3 of a multiplier 14 by adding an intermediate result m31 and an intermediate result m32. The adder 63 outputs the multiplication result m3 to the alignment unit 67. The adder 64 is a circuit that generates a multiplication result m4 of a multiplier 15 by adding an intermediate result m41 and an intermediate result m42. The adder 64 outputs the multiplication result m4 to the alignment unit 68. Each of the multiplication results m1 to m4 is a bit string having a second bit number.

The alignment unit 65 is a circuit that performs a shift process (right bit shift) on a mantissa part of the multiplication result m1 in order to align exponent parts of bit strings to be added by the partial adder 116. The alignment unit 65 outputs a processing result of the alignment unit 65 to the rounding unit 69. The alignment unit 66 is a circuit that performs a shift process (right bit shift) on a mantissa part of the multiplication result m2 in order to align exponent parts of bit strings to be added by the partial adder 116. The alignment unit 66 outputs a processing result of the alignment unit 66 to the rounding unit 70. The alignment unit 67 is a circuit that performs a shift process (right bit shift) on a mantissa part of the multiplication result m3 in order to align exponent parts of bit strings to be added by the partial adder 116. The alignment unit 67 outputs a processing result of the alignment unit 67 to the rounding unit 71. The alignment unit 68 is a circuit that performs a shift process (right bit shift) on a mantissa part of the multiplication result m4 in order to align exponent parts of bit strings to be added by the partial adder 116. The alignment unit 68 outputs a processing result of the alignment unit 68 to the rounding unit 72.

The rounding unit 69 is a circuit that performs a rounding process on the multiplication result m1 on which has been performed the shift process by the alignment unit 65. The rounding unit 69 outputs a computation result r1 of the rounding unit 69 to the partial adder 116. The rounding unit 70 is a circuit that performs a rounding process on the multiplication result m2 on which has been performed the shift process by the alignment unit 66. The rounding unit 70 outputs a computation result r2 of the rounding unit 70 to the partial adder 116. The rounding unit 71 is a circuit that performs a rounding process on the multiplication result m3 on which has been performed the shift process by the alignment unit 67. The rounding unit 71 outputs a computation result r3 of the rounding unit 71 to the partial adder 116. The rounding unit 72 is a circuit that performs a rounding process on the multiplication result m4 on which has been performed the shift process by the alignment unit 68. The rounding unit 72 outputs a computation result r4 of the rounding unit 72 to the partial adder 116. Each of the computation results r1 to r4 is a bit string having a second bit number.

The partial adder 116 ads the computation results r1 to r4 and outputs an addition result P1 that is a bit string having the first bit number. The alignment unit 117 is a circuit that performs a shift process (right bit shift) on a mantissa part of the addition result P1 in order to align exponent parts of the bit strings to be added by a subsequent adder (not illustrated). The alignment unit 117 outputs a processing result of the alignment unit 117 to the rounding unit 119. The rounding unit 119 is a circuit that performs a rounding process on the addition result P1 on which has been performed the shift process by the alignment unit 117. The rounding unit 119 outputs a computation result R1 of the rounding unit 119 to the subsequent adder.

In a first computation mode, the computation unit 100 multiplies two data having the first bit number by dividing each of the two data having the first bit number into two data having the second bit number, which is similar to the computation units 10A to 10D. A description will be given regarding a case in which a double-precision computation mode is used as the first computation mode and A0×B00 is computed using double-precision data A0 and double-precision data B00. A register 41 stores the double-precision data A0, and the double-precision data A0 is supplied from the register 41 to the data multiplexer 111 as input data DIN1 similarly to FIG. 4. A register 42 stores the double-precision data B00, and the double-precision data B00 is supplied from the register 42 to the data multiplexer 111 as input data DIN2. Since operations of the data multiplexer 111 and the multipliers 12 to 15 are the same as those of the data multiplexer 11 and the multipliers 12 to 15 of the computation units 10A to 10D in the first computation mode, the description thereof will be omitted.

Then, the adder 61 generates the multiplication result m1 of the multiplier 12b y adding the intermediate result m11 and the intermediate result m12, and outputs the multiplication result m1 to the alignment unit 65. Similarly, the adder 62 generates the multiplication result m2 of the multiplier 13 by adding the intermediate result m21 and the intermediate result m22, and outputs the multiplication result m2 to the alignment unit 66. Similarly, the adder 63 generates the multiplication result m3 of the multiplier 14 by adding the intermediate result m31 and the intermediate result m32, and outputs the multiplication result m3 to the alignment unit 67. Similarly, the adder 64 generates the multiplication result m4 of the multiplier 14 by adding the intermediate result m41 and the intermediate result m42, and outputs the multiplication result m4 to the alignment unit 68.

Then, the alignment units 65 to 68 perform shift processes on mantissa parts of the multiplication results m1 to m4, and output processing results of the alignment units 65 to 68 to the rounding units 69 to 72. Then, the rounding units 69 to 72 perform rounding processes on the multiplication results m1 to m4, on which have been performed the shift processes by the alignment units 65 to 68, and output computation results r1 to r4 to the partial adder 116.

Then, the partial adder 116 ads the computation results r1 to r4 and outputs the addition result P1. Then, the alignment unit 117 performs a shift process on a mantissa part of the addition result P1, and outputs a processing result of the alignment unit 117 to the rounding unit 119. Then, the rounding unit 119 performs a rounding process on the addition result P1, on which has been performed the shift process by the alignment unit 117, and outputs the computation result RI to the subsequent adder. In this manner, the computation result R1 of A0×B00 is obtained.

On the other hand, in a second computation mode, the computation unit 100 performs two multiplications using four data having the second bit number. A description will be given regarding a case where a computation of a0×b00 using single-precision data a0 and single-precision data b00 and a computation of a1×b10 using single-precision data a1 and single-precision data b10 are performed using a single-precision computation mode as the second computation mode. The single-precision data a0 is stored in high-order bits of the register 41, and the single-precision data a1 is stored in low-order bits of the register 41. The single-precision data a0 and the single-precision data a1 are supplied from the register 41 to the data multiplexer 11 as the input data DIN1. The single-precision data b00 is stored in high-order bits of the register 42, and the single-precision data b10 is stored in low-order bits of the register 42. The single-precision data b00 and the single-precision data b10 are supplied from the register 42 to the data multiplexer 11 as the input data DIN2.

The data multiplexer 111 outputs the single-precision data a0 as the output data dout1 and the output data dout5, and outputs the single-precision data a1 as the output data dout3 and the output data dout7. In addition, the data multiplexer 111 outputs the single-precision data b00 as the output data dout2 and the output data dout4, and outputs the single-precision data b10 as the output data dout6 and the output data dout8.

Then, the multiplier 12 multiplies the single-precision data a0 and the single-precision data b00, and outputs the intermediate result m11 and the intermediate result m12. Similarly, the multiplier 13 multiplies the single-precision data a1 and the single-precision data b00, and outputs the intermediate result m21 and the intermediate result m22. Similarly, the multiplier 14 multiplies the single-precision data a0 and the single-precision data b10, and outputs the intermediate result m31 and the intermediate result m32. Similarly, the multiplier 15 multiplies the single-precision data a1 and the single-precision data b10, and outputs the intermediate result m41 and the intermediate result m42. Since operations of the adders 61 to 64, the alignment units 65 to 68, and the rounding units 69 to 72 are the same as those in the first computation mode, the description thereof will be omitted.

However, multiplication results of the multiplier 13 and the multiplier 14 are not used for obtaining a computation result of a0×b00 and a computation result of a1×b10. That is, it can be said that the multiplier 13 and the multiplier 14 do not perform valid computations in the computation unit 100.

Meanwhile, when the MODE signal indicates the first computation mode in the computation devices 1A to 1D, the high-order data din1_h of the input data DIN1 and the high-order data din2_h of the input data DIN2 are supplied to the multiplier 12, and the multiplier 12 multiplies these data. In addition, the low-order data din1_1 of the input data DIN1 and the high-order data din2_h of the input data DIN2 are supplied to the multiplier 13, and the multiplier 13 multiplies these data. In addition, the high-order data din1_h of the input data DIN1 and the low-order data din2_1 of the input data DIN2 are supplied to the multiplier 14, and the multiplier 14 multiplies these data. In addition, the low-order data din1_1 of the input data DIN1 and the low-order data din2_1 of the input data DIN2 are supplied to the multiplier 15, and the multiplier 15 multiplies these data. That is, the multiplication is performed by dividing one data having the first bit number into two data having the second bit number.

On the other hand, when the MODE signal indicates the second computation mode in the computation devices 1A to 1D, the high-order data din1_h of the input data DIN1 and the high-order data din2_h of the input data DIN2 are supplied to the multiplier 12, and the multiplier 12 multiplies these data. In addition, the low-order data din1_1 of the input data DIN1 and the low-order data din2_1 of the input data DIN2 are supplied to the multiplier 13, and the multiplier 13 multiplies these data. In addition, the high-order data din1_h of the input data DIN1 and the high-order data din3_h of the input data DIN3 are supplied to the multiplier 14, and the multiplier 14 multiplies these data. In addition, the low-order data din1_1 of the input data DIN1 and the low-order data din3_1 of the input data DIN3 are supplied to the multiplier 15, and the multiplier 15 multiplies these data. In this manner, all the multipliers 12 to 15 perform the valid computations not only in the first computation mode but also in the second computation mode. As a result, it is possible to improve the computation performance of the computation devices 1A to 1D without increasing the circuit scale of the computation devices 1A to 1D. That is, it is possible to improve the computation performance per price.

In addition, in the second computation mode, two multipliers perform the valid computations among the multipliers 12 to 15 of the computation unit 100 in the computation device according to the comparative example, whereas all the multipliers of the multipliers 12 to 15 of the computation units 10A to 10D perform the valid computations in the computation devices 1A to 1D. Thus, it is possible to improve the computation performance per power. In other words, the utilization efficiency of circuit elements such as transistors constituting the computation devices 1A to 1D is improved in the computation devices 1A to 1D as compared with the computation device according to the comparative example, and thus, it is possible to provide the same computation performance with low cost and low power consumption.

The adder 52 obtains a vector product of the high-order data din1_h and low-order data din1_1 of the input data DIN1, and the high-order data din2_h and low-order data din2_1 of the input data DIN2, and the adder 53 obtains a vector product of the high-order data din1_h and low-order data din1_1 of the input data DIN1, and the high-order data din3_h and low-order data din3_1 of the input data DIN3. In addition, the partial adder 16 obtains a multiplication result of the input data DIN1 and the input data DIN2 (a multiplication result of two bit strings having the first bit number).

The multiplier 12 outputs the intermediate results m11 and m12, which are results obtained during the multiplication by the multiplier 12, as multiplication results. The intermediate results m11 and m12 are results obtained during the multiplication by the multiplier 12 that do not cause a computation delay of the multiplier 12. Thus, since the intermediate results m11 and m12 are output as the multiplication results of the multiplier 12, it is possible to suppress a delay caused by, for example, a carry or the like in the computation processing of the multiplier 12. As a result, the computation speed of the multiplier 12 can be improved. Similarly, the computation speed of the multipliers 13 to 15 can be improved. In addition, a process of aligning exponent parts of bit strings to be added for the addition in the subsequent partial adder 16 can be omitted by using the intermediate result of the multiplication, and thus, it is possible to improve the computation speed of the computation devices 1A to 1D.

In addition, the adder 52 and the adder 53 obtain two matrix operation results with data having the second bit number, and the adder 51 obtains one matrix operation result with data having the first bit number. Then, the multiplexer 59 outputs one matrix operation result with data having the first bit number when the MODE signal indicates the first computation mode, and outputs two matrix operation results with data having the second bit number when the MODE signal indicates the second computation mode. In this manner, it is possible to perform the matrix operations in the computation devices 1A to 1D in response to the two computation modes. Therefore, when the computation devices 1A to 1D are applied to a DNN and a CNN that require parallel computations, it is possible to realize the high computation performance for a required matrix product. In addition, since the computation devices 1A to 1D are configured to perform the matrix operation, the number of data to be supplied to the data multiplexer 11 can be reduced, and it is possible to reduce a bandwidth of a data bus configured to supply data serving as a computation target.

When the first computation mode is the double-precision computation mode and the second computation mode is the single-precision computation mode, each of the computation units 10A to 10D can be reconfigured as one double-precision multiplier and four single-precision multipliers. As a result, the computation devices 1A to 1D can perform the computations in the double-precision computation mode and the single-precision computation mode. Even with the computation devices 1A to 1D, it is possible to improve the computation performance without increasing the circuit scale of the computation devices 1A to 1D.

When the first computation mode is the single-precision computation mode and the second computation mode is the half-precision computation mode, each of the computation units 10A to 10D can be reconfigured as one single-precision multiplier and four half-precision multipliers. As a result, the computation devices 1A to 1D can perform the computations in the single-precision computation mode and the half-precision computation mode. Even with the computation devices 1A to 1D, it is possible to improve the computation performance without increasing the circuit scale of the computation devices 1A to 1D.

Further, since the arithmetic unit MAU includes the four computation devices 1A to 1D in the computation system S, it is possible to perform the matrix operation (a 4×4 matrix vector product) of double-precision data as shown in Formula (1). The arithmetic unit MAU can perform an 8×8 matrix vector product as shown in Formula (7) in the single-precision computation mode. According to this configuration, it is possible to realize the computation performance equivalent to a circuit having 16 parallel multipliers (circuits that perform one multiplication in one cycle) each of which performs a multiplication of a mantissa of 52 bits in the double-precision computation mode. In the single-precision computation mode, it is possible to realize the computation performance equivalent to a circuit having 64 parallel multipliers each of which performs a multiplication of a mantissa of 23 bits.

In addition, when the matrix operation is performed, the element processors PE1 to PE4 operate as a single processor, and thus, the matrix operation can be processed in parallel by the element processors PE1 to PE4. As a result, the computation speed of the matrix operation can be improved.

In addition, the element processors PE1 to PE4 perform the SIMD operation that operates with one instruction, and thus, the element processors PE1 to PE4 operate in parallel. As a result, the processing speed can be increased.

The memory space accessible by the memory address including the processor ID is set in the computation system S. Each of the element processors PE1 to PE4 can access the memory area indicated by the memory address including the corresponding processor ID. Thus, the memory space can be expanded, and it is possible to increase a data size that can be handled by the computation system S.

Each of the element processors PE1 to PE4 can sequentially perform transfer of the data received from the arithmetic unit MAU to the other element processors via the ring coupling (cyclic shift). As a result, each of the element processors PE1 to PE4 can execute access to the unassigned area.

Figure 7:
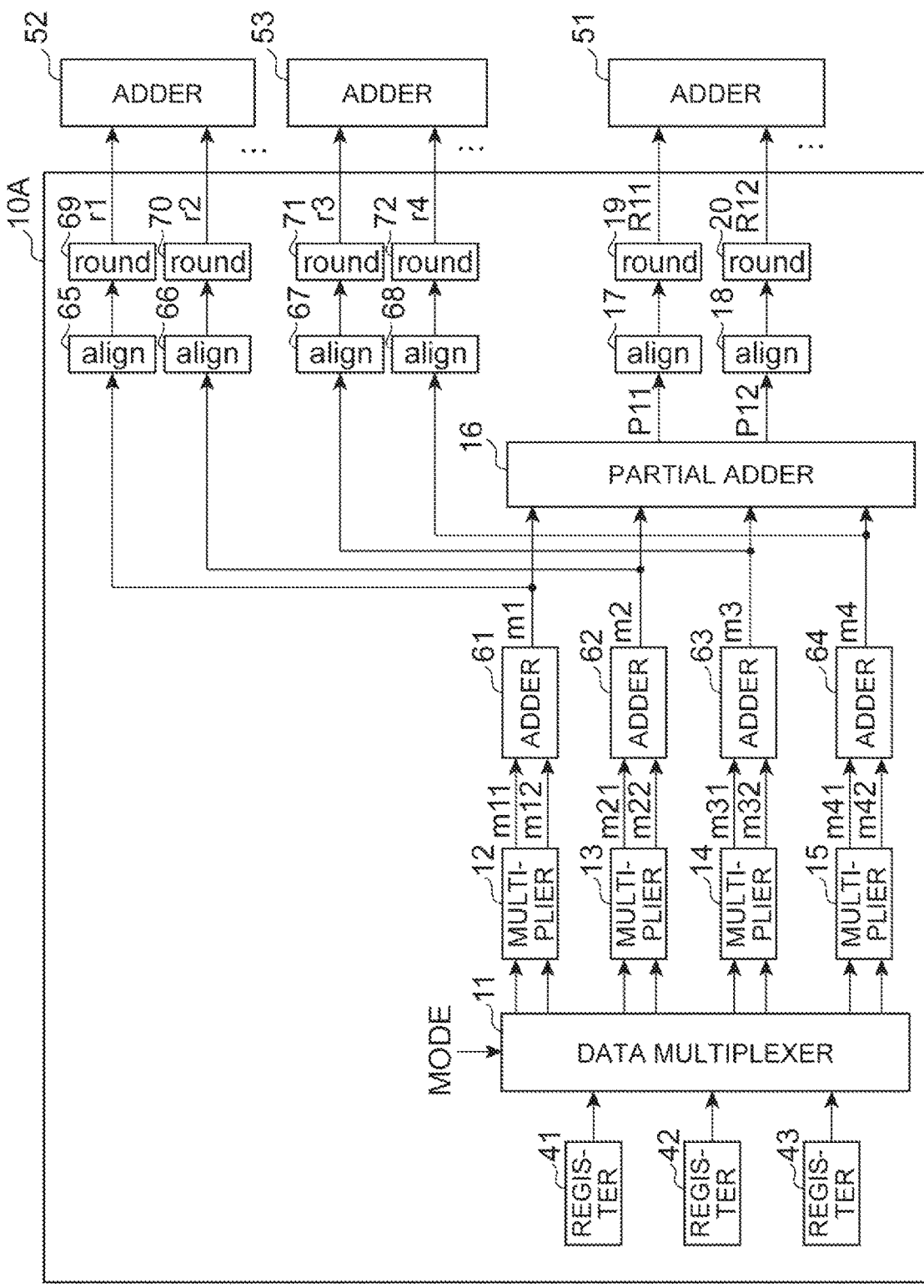
FIG. 7 is a diagram illustrating a modification of the computation unit of FIG. 3.

In the above embodiment, each of the computation units 10A to 10D is configured as a dedicated circuit for the matrix operation. That is, the addition is performed using the intermediate result of the multiplications of the multipliers 12 to 15, and thus, it is difficult to obtain multiplication results of the multipliers 12 to 15. As illustrated in FIG. 7, a computation unit 10A according to a modification is mainly different from the computation unit 10A according to the above embodiment in terms that adders 61 to 64, alignment units 65 to 68, and rounding units 69 to 72 are included instead of the alignment units 21 to 28 and the rounding units 31 to 38.

The adders 61 to 64 are different from the adders 61 to 64 of the computation unit 100 according to the comparative example in terms that multiplication results m1 to m4 are output also to the partial adder 16, and the remaining processing is the same. Since the alignment units 65 to 68 are the same as the alignment units 65 to 68 of the computation unit 100 according to the comparative example, the description thereof will be omitted. The rounding units 69 to 72 are different from the rounding units 69 to 72 of the computation unit 100 according to the comparative example in terms of an output destination of a computation result. Specifically, the rounding unit 69 outputs the computation result r1 to the adder 52. The rounding unit 70 outputs the computation result r2 to the adder 52. The rounding unit 71 outputs the computation result r3 to the adder 53. The rounding unit 72 outputs the computation result r4 to the adder 53.

According to the computation unit 10A according to the modification, the adders 61 to 64 obtain the multiplication results m1 to m4 in the second computation mode. Thus, the computation unit 10A can be used for an operation other than the matrix operation.

Second Embodiment

Figure 8:
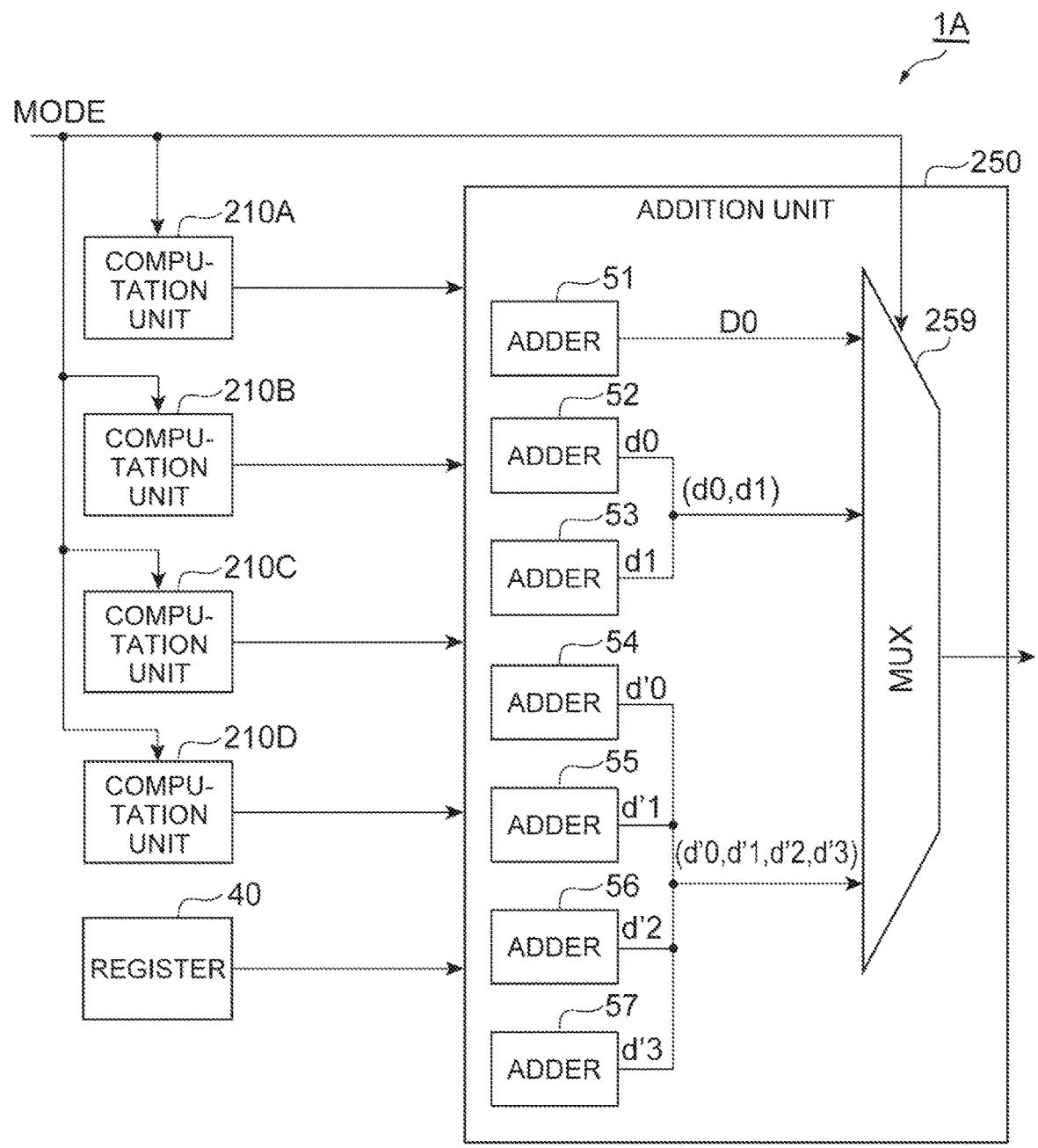
FIG. 8 is a diagram schematically illustrating a configuration of a computation device according to a second embodiment.

FIG. 8 is a diagram schematically illustrating a configuration of a computation device according to a second embodiment. A computation device 1A illustrated in FIG. 8 is mainly different from the computation device 1A according to the first embodiment in terms of the number of computation modes that can be switched and providing computation units 210A to 210D and an addition unit 250 instead of the computation units 10A to 10D and the addition unit 50.

The computation device 1A according to the second embodiment switches a computation mode of the computation device 1A to any one of a first computation mode, a second computation mode, and a third computation mode in response to a MODE signal. The third computation mode is a mode for performing a computation using data having a third bit number. The third bit number is a bit number that is a quarter of a first bit number and is half a second bit number. The MODE signal is a 2-bit signal, for example, and indicates any one of the first computation mode, the second computation mode, and the third computation mode. Examples of the computation mode that can be executed by the computation device 1A include a double-precision computation mode, a single-precision computation mode, and a half-precision computation mode. That is, when the first computation mode is a double-precision computation mode, the second computation mode is a single-precision computation mode, and the third computation mode is a half-precision computation mode.

Figure 9:
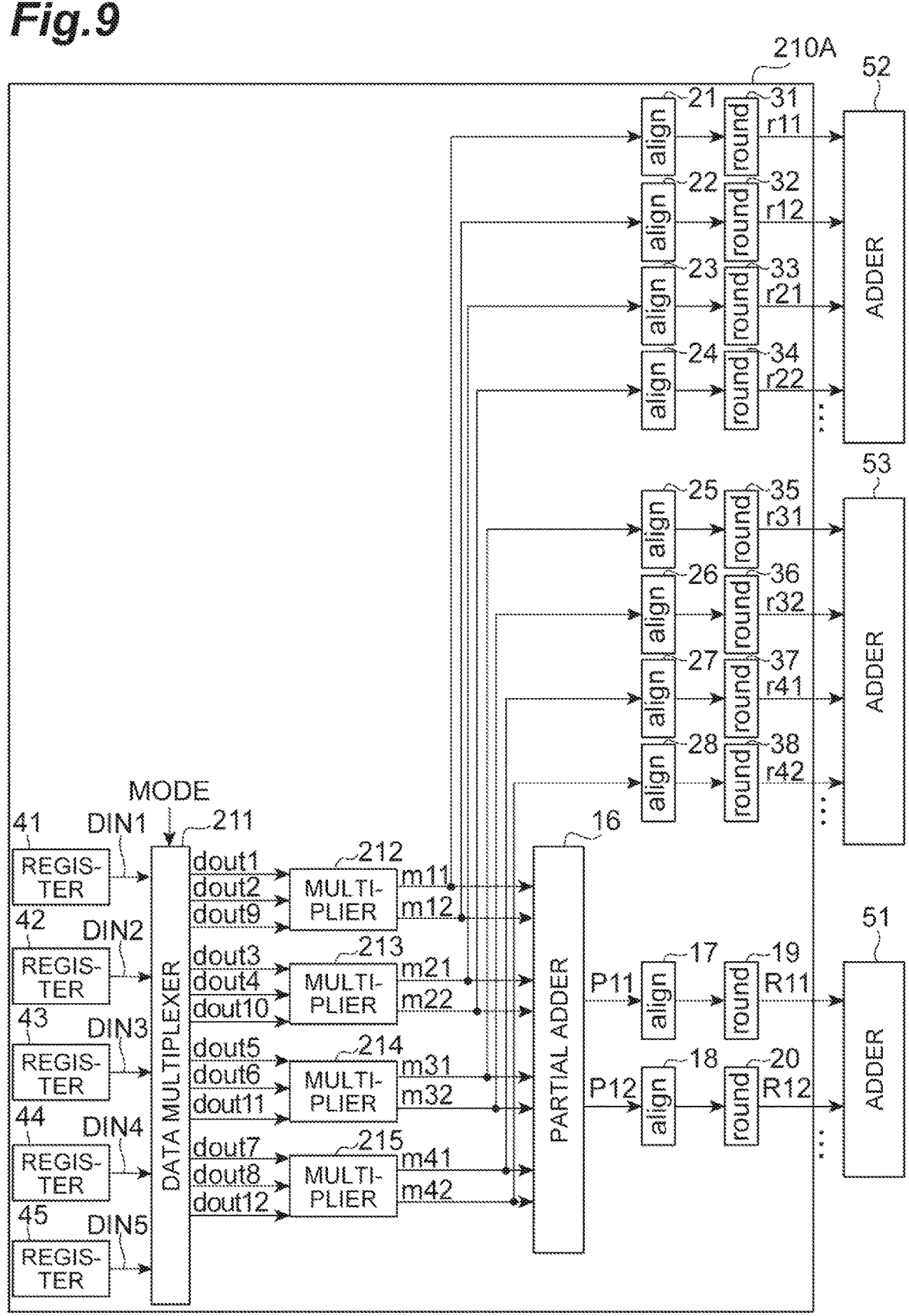
FIG. 9 is a diagram schematically illustrating a configuration of a computation unit included in the computation device of FIG. 8.

FIG. 9 is a diagram schematically illustrating a configuration of the computation unit included in the computation device of FIG. 8. Since the computation units 210A to 210D have the same configuration, a configuration of the computation unit 210A will be described focusing on differences from the computation unit 10A herein. As illustrated in FIG. 9, the computation unit 210A is mainly different from the computation unit 10A in terms that a data multiplexer 211 and multipliers 212 to 215 are included instead of the data multiplexer 11 and multipliers 12 to 15 and that registers 44 and 45 are further included.

Each of the registers 41 to 45 stores and holds input data DIN1 to DIN5, which is a bit string having the first bit number serving as a computation target. The input data DIN1 to DIN5 are set in the registers 41 to 45 from a device outside the computation device 1A (element processor in the present embodiment). The input data DIN1 includes high-order data $din1\_h$ and low-order data $din1\_l$ as described above. The high-order data $din1\_h$ includes data $din'1\_1$ and data $din'1\_2$, and the low-order data $din1\_l$ includes data din'1_3 and data din'1_4. The data din'1_1 to din'1_4 are sequentially arrayed in order from the MSB of a bit string of the input data DIN1. The same description also applies to the input data DIN2 to DIN3. The data din'1_1 to din'1_4, data din'2_1 to din'2_4, data din'3_1 to din'3_4, data din'4_1 to din'4_4, and data din'5_1 to din'5_4 are bit strings having the third bit number. The third bit number corresponds to the number of bits of data used in the third computation mode, and is, for example, 16 bits.

The data multiplexer 211 is a circuit which receives the input data DIN1 to DIN3 output from the registers 41 to 45, and outputs a plurality of output data dout1 to dout12 in response to the MODE signal. Each of the output data dout1 to dout12 is a bit string having the second bit number.

An operation of the data multiplexer 211 is the same as that of the data multiplexer 11 when the MODE signal indicates the first computation mode and when the MODE signal indicates the second computation mode. When the MODE signal indicates the third computation mode, the data multiplexer 211 outputs the high-order data din2_$h$ as the output data dout1 and the output data dout5, and outputs the low-order data din1_1 as the output data dout3 and the output data dout7. In addition, when the MODE signal indicates the third computation mode, the data multiplexer 211 outputs the high-order data din2_$h$ as the output data dout2, and outputs the low-order data din2_1 as the output data dout4.

In addition, when the MODE signal indicates the third computation mode, the data multiplexer 211 outputs high-order data din3_$h$ as the output data dout9, and outputs low-order data din3_1 as the output data dout10. In addition, when the MODE signal indicates the third computation mode, the data multiplexer 211 outputs high-order data din4_$h$ as the output data dout6, and outputs low-order data din4_1 as the output data dout8. In addition, when the MODE signal indicates the third computation mode, the data multiplexer 211 outputs the high-order data din5_$h$ as the output data dout11, and outputs the low-order data din5_1 as the output data dout12.

Figure 10:
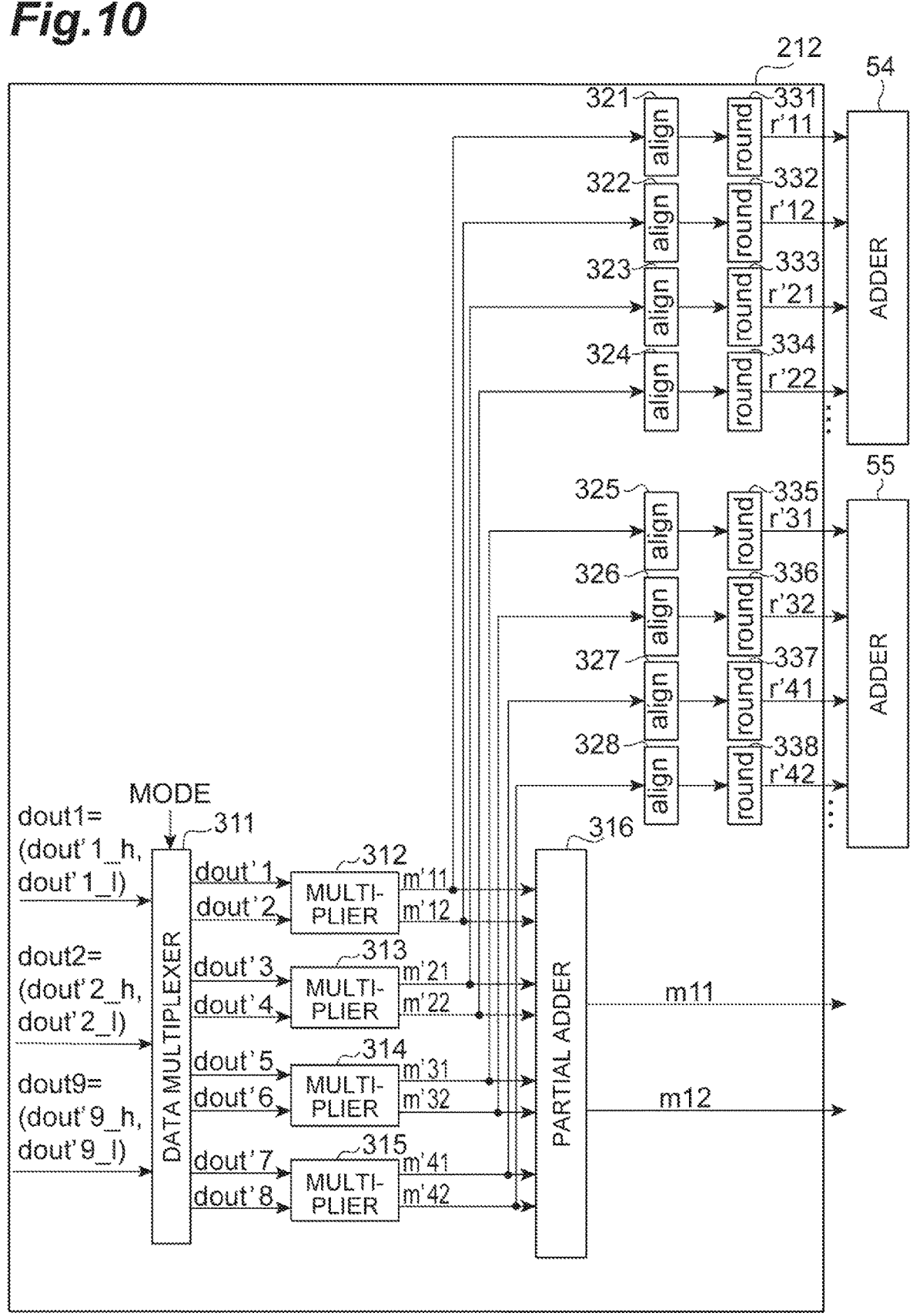
FIG. 10 is a diagram schematically illustrating a configuration of a multiplier of FIG. 9.

The multipliers 212 to 215 are circuits that perform multiplication of two bit strings having the second bit number. Since the multipliers 212 to 215 have the same configuration, the configuration of the multiplier 212 will be described herein. FIG. 10 is a diagram schematically illustrating the configuration of the multiplier of FIG. 9. As illustrated in FIG. 10, the multiplier 212 includes a data multiplexer 311, multipliers 312 to 315, and a partial adder 316.

The data multiplexer 311 is a circuit which receives the output data dout1, dout2, and dout9, and outputs a plurality (eight in this case) of output data dout'1 to dout'8 in response to the MODE signal. Each of the plurality of output data dout'1 to dout'8 is a bit string having the third bit number. The output data dout1 includes data dout1_$h$ and data dout'1i. The data dout'1 h and the data dout'1_1 are sequentially arrayed in order from the MSB of a bit string of the output data dout1. The same description also applies to the output data dout2 to dout12. The data dout'1_$h$ to dout'12_$h$, and dout'1_1 to dout'12_1 are bit strings having the third bit number.

When the MODE signal indicates the first computation mode or the second computation mode, the data multiplexer 311 outputs the data dout'1_$h$ as the output data dout'1 and the output data dout'5, and outputs the data din'1_1 as the output data dout'3 and the output data dout'7. In addition, when the MODE signal indicates the first computation mode or the second computation mode, the data multiplexer 311 outputs the data dout'2_$h$ as the output data dout'2 and the output data dout'4, and outputs the data dout'2_1 as the output data dout'6 and the output data dout'8. The data multiplexer 311 does not receive the output data dout9 when the MODE signal indicates the first computation mode or the second computation mode. That is, the operations of the data multiplexer 311 in the first computation mode and the second computation mode are the same as the operation of the data multiplexer 11 in the first computation mode.

When the MODE signal indicates the third computation mode, the data multiplexer 311 outputs the data dout'1_$h$ as the output data dout'1 and the output data dout'5, and outputs the data din'1_1 as the output data dout'3 and the output data dout'7. In addition, when the MODE signal indicates the third computation mode, the data multiplexer 311 outputs the data dout'2_$h$ as the output data dout'2, and outputs the data dout'2_1 as the output data dout'4. In addition, when the MODE signal indicates the third computation mode, the data multiplexer 311 outputs the data dout'9_$h$ as the output data dout'6, and outputs the data dout'9_1 as the output data dout'8. That is, the operation of the data multiplexer 311 in the third computation mode is the same as the operation of the data multiplexer 11 in the second computation mode.

The multipliers 312 to 315 are circuits that perform multiplication of two bit strings having the third bit number. The multiplier 312 multiplies the output data dout'1 and the output data dout'2. The multiplier 312 multiplies two bit strings using, for example, a Wallace tree circuit, and outputs an intermediate result m'11 and an intermediate result m'12, which are results obtained during the multiplication by the multiplier 312, as multiplication results. The intermediate result m'11 and the intermediate result m'12 are bit strings having the third bit number. The intermediate result m'11 and the intermediate result m'12 are values that do not cause a computation delay of the multiplier 312 and are, for example, partial total values that do not cause a carry. The multiplier 312 outputs the intermediate result m'11 to an alignment unit 321, outputs the intermediate result m'12 to an alignment unit 322, and outputs the intermediate result a11 and the intermediate result m'12 to the partial adder 316.

The multiplier 313 multiplies the output data dout'3 and the output data dout'4. The multiplier 313 multiplies two bit strings using, for example, a Wallace tree circuit, and outputs an intermediate result m'21 and an intermediate result m'22, which are results obtained during the multiplication by the multiplier 313, as multiplication results. The intermediate result m'21 and the intermediate result m'22 are bit strings having the third bit number. The intermediate result m'21 and the intermediate result m'22 are values that do not cause a computation delay of the multiplier 313 and are, for example, partial total values that do not cause a carry. The multiplier 313 outputs the intermediate result m'21 to an alignment unit 323, outputs the intermediate result m'22 to an alignment unit 324, and outputs the intermediate result m'21 and the intermediate result m'22 to the partial adder 316.

The multiplier 314 multiplies the output data douf5 and the output data dout'6. The multiplier 314 multiplies two bit strings using, for example, a Wallace tree circuit, and outputs an intermediate result m'31 and an intermediate result m'32, which are results obtained during the multiplication by the multiplier 314, as multiplication results. The intermediate result m'31 and the intermediate result m'32 are bit strings having the third bit number. The intermediate result m'31 and the intermediate result m'32 are values that do not cause a computation delay of the multiplier 314, and are, for example, partial total values that do not cause a carry. The multiplier 314 outputs the intermediate result m'31 to an alignment unit 325, outputs the intermediate result m'32 to an alignment unit 326, and outputs the intermediate result m'31 and the intermediate result m'32 to the partial adder 316.

The multiplier 315 multiplies the output data dout'7 and the output data dout'8. The multiplier 315 multiplies two bit strings using, for example, a Wallace tree circuit, and outputs an intermediate result m'41 and an intermediate result m'42, which are results obtained during the multiplication by the multiplier 315, as multiplication results. The intermediate result m'41 and the intermediate result m'42 are bit strings having the third bit number. The intermediate result m'41 and the intermediate result m'42 are values that do not cause a computation delay of the multiplier 315, and are, for example, partial total values that do not cause a carry. The multiplier 315 outputs the intermediate result m'41 to an alignment unit 327, outputs the intermediate result m'42 to an alignment unit 328, and outputs the intermediate result m'41 and the intermediate result m'42 to the partial adder 316.

The partial adder 316 is a circuit that generates a multiplication result with bit strings having the second bit number. Specifically, the partial adder 316 ads the multiplication results of the multipliers 312 to 315. In the present embodiment, the partial adder 316 ads the intermediate result all, the intermediate result m'12, the intermediate result m'21, the intermediate result m'22, the intermediate result m'31, the intermediate result m'32, the intermediate result m'41, and the intermediate result m'42. The partial adder 316 outputs an intermediate result m11 and an intermediate result m12, which are results obtained during the addition by the partial adder 316, as addition results. The intermediate result m11 and the intermediate result m12 are bit strings having the second bit number. The intermediate result m11 and the intermediate result m12 are values that do not cause a computation delay of the partial adder 316, and are, for example, partial total values that do not cause a carry.

The alignment unit 321 is a circuit that performs a shift process (right bit shift) on a mantissa part of the intermediate result m'11 in order to align exponent parts of the bit strings to be added by an adder 54 to be described later. The alignment unit 321 outputs a processing result of the alignment unit 321 to the rounding unit 331. The alignment unit 322 is a circuit that performs a shift process (right bit shift) on a mantissa part of the intermediate result m'12 in order to align exponent parts of the bit strings to be added by the adder 54. The alignment unit 322 outputs a processing result of the alignment unit 322 to the rounding unit 332. The alignment unit 323 is a circuit that performs a shift process (right bit shift) on a mantissa part of the intermediate result m'21 in order to align exponent parts of the bit strings to be added by the adder 54. The alignment unit 323 outputs a processing result of the alignment unit 323 to the rounding unit 333. The alignment unit 324 is a circuit that performs a shift process (right bit shift) on a mantissa part of the intermediate result m'22 in order to align exponent parts of the bit strings to be added by the adder 54. The alignment unit 324 outputs a processing result of the alignment unit 324 to the rounding unit 334.

The alignment unit 325 is a circuit that performs a shift process (right bit shift) on a mantissa part of the intermediate result m'31 in order to align exponent parts of the bit strings to be added by an adder 55 to be described later. The alignment unit 325 outputs a processing result of the alignment unit 325 to the rounding unit 335. The alignment unit 326 is a circuit that performs a shift process (right bit shift) on a mantissa part of the intermediate result m'32 in order to align exponent parts of the bit strings to be added by the adder 55. The alignment unit 326 outputs a processing result of the alignment unit 326 to the rounding unit 336. The alignment unit 327 is a circuit that performs a shift process (right bit shift) on a mantissa part of the intermediate result m'41 in order to align exponent parts of the bit strings to be added by the adder 55. The alignment unit 327 outputs a processing result of the alignment unit 327 to the rounding unit 337. The alignment unit 328 is a circuit that performs a shift process (right bit shift) on a mantissa part of the intermediate result m'42 in order to align exponent parts of the bit strings to be added by the adder 55. The alignment unit 328 outputs a processing result of the alignment unit 328 to the rounding unit 338.

The rounding unit 331 is a circuit that performs a rounding process on the intermediate result m'11 on which has been performed the shift process by the alignment unit 321. The rounding unit 331 outputs a computation result r'11 of the rounding unit 331 to the addition unit 50 (adder 54). The rounding unit 332 is a circuit that performs a rounding process on the intermediate result m'12 on which has been performed the shift process by the alignment unit 322. The rounding unit 332 outputs a computation result r'12 of the rounding unit 332 to the addition unit 50 (adder 54). The rounding unit 333 is a circuit that performs a rounding process on the intermediate result m'21 on which has been performed the shift process by the alignment unit 323. The rounding unit 333 outputs a computation result r'21 of the rounding unit 333 to the addition unit 50 (adder 54). The rounding unit 334 is a circuit that performs a rounding process on the intermediate result m'22 on which has been performed the shift process by the alignment unit 324. The rounding unit 334 outputs a computation result r'22 of the rounding unit 334 to the addition unit 50 (adder 54). Each of the computation results r'11, r'12, r'21, and r'22 is a bit string having the third bit number.

The rounding unit 335 is a circuit that performs a rounding process on the intermediate result m'31 on which has been performed the shift process by the alignment unit 325. The rounding unit 335 outputs a computation result r'31 of the rounding unit 335 to the addition unit 50 (adder 55). The rounding unit 336 is a circuit that performs a rounding process on the intermediate result m'32 on which has been performed the shift process by the alignment unit 326. The rounding unit 336 outputs a computation result r'32 of the rounding unit 336 to the addition unit 50 (adder 55). The rounding unit 337 is a circuit that performs a rounding process on the intermediate result m'41 on which has been performed the shift process by the alignment unit 327. The rounding unit 337 outputs a computation result r'41 of the rounding unit 337 to the addition unit 50 (adder 55). The rounding unit 338 is a circuit that performs a rounding process on the intermediate result m'42 on which has been performed the shift process by the alignment unit 328. The rounding unit 338 outputs a computation result r'42 of the rounding unit 338 to the addition unit 50 (adder 55). Each of the computation results r'31, r'41, and r'42 is a bit string having the third bit number.

In this manner, the multipliers 212 to 215 have the same configurations as the data multiplexer 11, the multipliers 12 to 15, the partial adder 16, the alignment units 21 to 28, and the rounding units 31 to 38 of the computation unit 10A. Incidentally, the data multiplexer 211 and the data multiplexer 311 of each of the multipliers 212 to 215 may be replaced with one data multiplexer.

Returning to FIG. 8, the description of the computation device 1A will be continued. The addition unit 250 is mainly different from the addition unit 50 in terms that a multiplexer 259 is included instead of the multiplexer 59 and that adders 54 to 57 are further included. Hereinafter, differences from the addition unit 50 will be described.

Input data DIN0 held in a register 40 includes data din0_1 to din0_4 which are bit strings having the third bit number. The register 40 outputs the data din0_1 to the adder 54, outputs the data din0_2 to the adder 55, outputs the data din0_3 to the adder 56, and outputs the data din0_4 to the adder 57.

The adder 54 generates a computation result d'0 in the third computation mode. In the present embodiment, the adder 54 ads the computation results r'11, r'12, r'21, and r'22 of the multipliers 212 to 215 of the computation units 210A and 210B and the data din'0_1 to generate the computation result d'0. The adder 54 outputs the computation result d'0 to the multiplexer 259.

The adder 55 generates a computation result d'1 in the third computation mode. In the present embodiment, the adder 55 ads the computation results r'31, r'32, r'41, and r'42 of the multipliers 212 to 215 of the computation units 210A and 210B and the data din0_2 to generate the computation result d'1. The adder 55 outputs the computation result d'1 to the multiplexer 259.

The adder 56 generates a computation result d'2 in the third computation mode. In the present embodiment, the adder 56 ads the computation results r'11, r'12, r'21, and r'22 of the multipliers 212 to 215 of the computation units 210C and 210D and the data din0_3 to generate the computation result d'2. The adder 56 outputs the computation result d'2 to the multiplexer 259.

The adder 57 generates a computation result d'3 in the third computation mode. In the present embodiment, the adder 57 ads the computation results r'31, r'32, r'41, and r'42 of the multipliers 212 to 215 of the computation units 210C and 210D and the data din0_4 to generate the computation result d'3. The adder 57 outputs the computation result d'3 to the multiplexer 259. Incidentally, a computation result (d'0, d'1, d'2, d'3) is generated by combining the computation results d'0 to d'3. The computation result (d'0, d'1, d'2, d'3) is a bit string in which the computation results d'0 to d'3 are sequentially arrayed in order from a high-order bit. That is, the computation result (d'0, d'1, d'2, d'3) is the bit string having the first bit number.

The multiplexer 259 is a circuit that receives the computation result D0, the computation result (d0, d1), and the computation result (d'0, d'1, d'2, d'3), and outputs any one of the computation result D0, the computation result (d0, d1), and the computation result (d'0, d'1, d'2, d'3) in response to the MODE signal. The multiplexer 259 outputs the computation result D0 when the MODE signal indicates the first computation mode. The multiplexer 259 outputs the computation result (d0, d1) when the MODE signal indicates the second computation mode. The multiplexer 259 outputs the computation result (d'0, d'1, d'2, d'3) when the MODE signal indicates the third computation mode.

Figure 11:
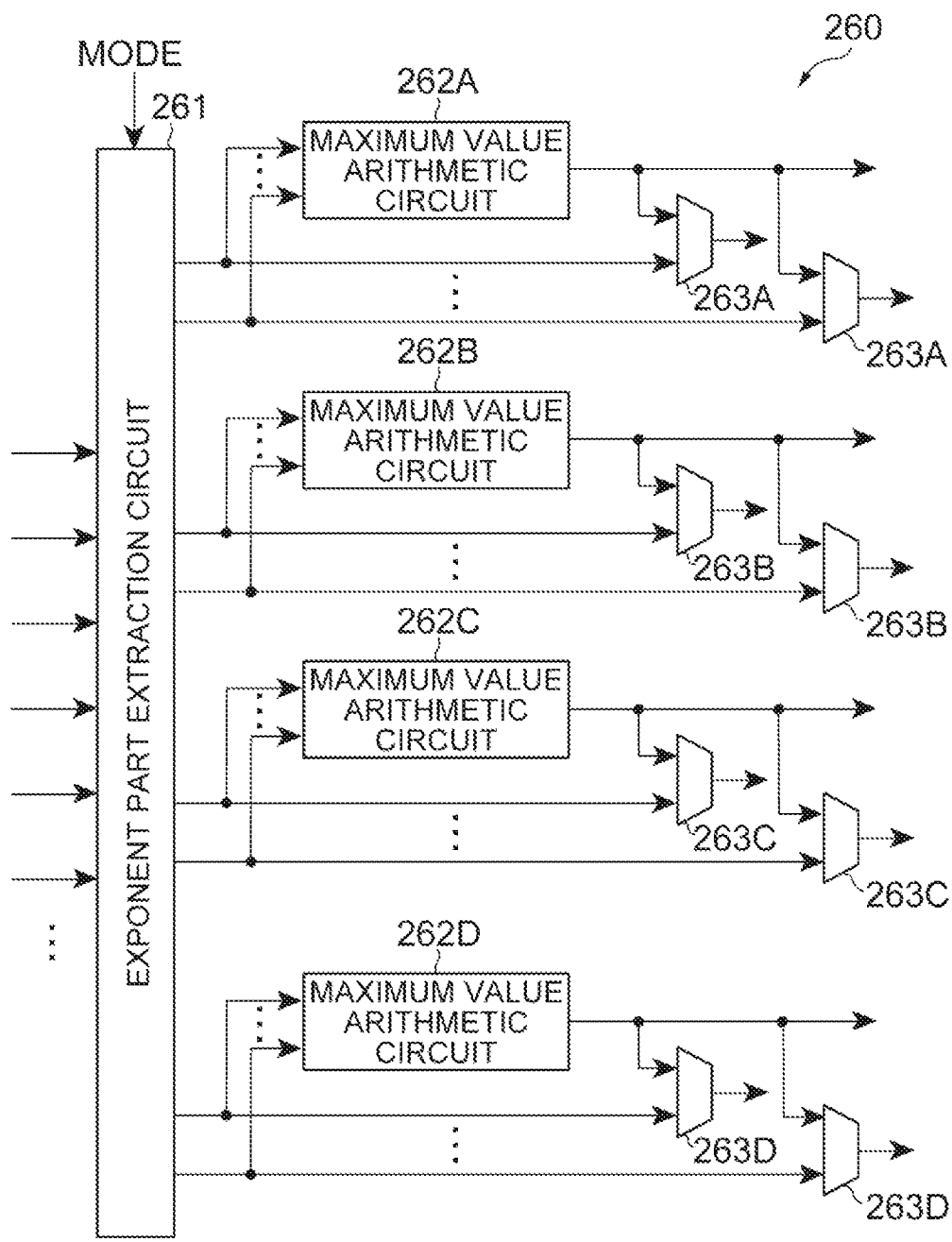
FIG. 11 is a diagram schematically illustrating a configuration of a shift amount arithmetic circuit.

The computation device 1A further includes a shift amount arithmetic circuit 260. FIG. 11 is a diagram schematically illustrating a configuration of the shift amount arithmetic circuit. The shift amount arithmetic circuit 260 illustrated in FIG. 11 is a circuit that computes a shift amount of a shift process in each alignment unit. The shift amount arithmetic circuit 260 includes an exponent part extraction circuit 261, maximum value arithmetic circuits 262A to 262D, and subtraction circuits 263A to 263 D.

The exponent part extraction circuit 261 is a circuit that extracts an exponent part from the input data DIN0 to DIN5. To the exponent part extraction circuit 261, the input data DIN0 is supplied from the register 40, and the input data DIN1 to DIN5 are supplied from the computation units 210A to 210D.

Figure 12:
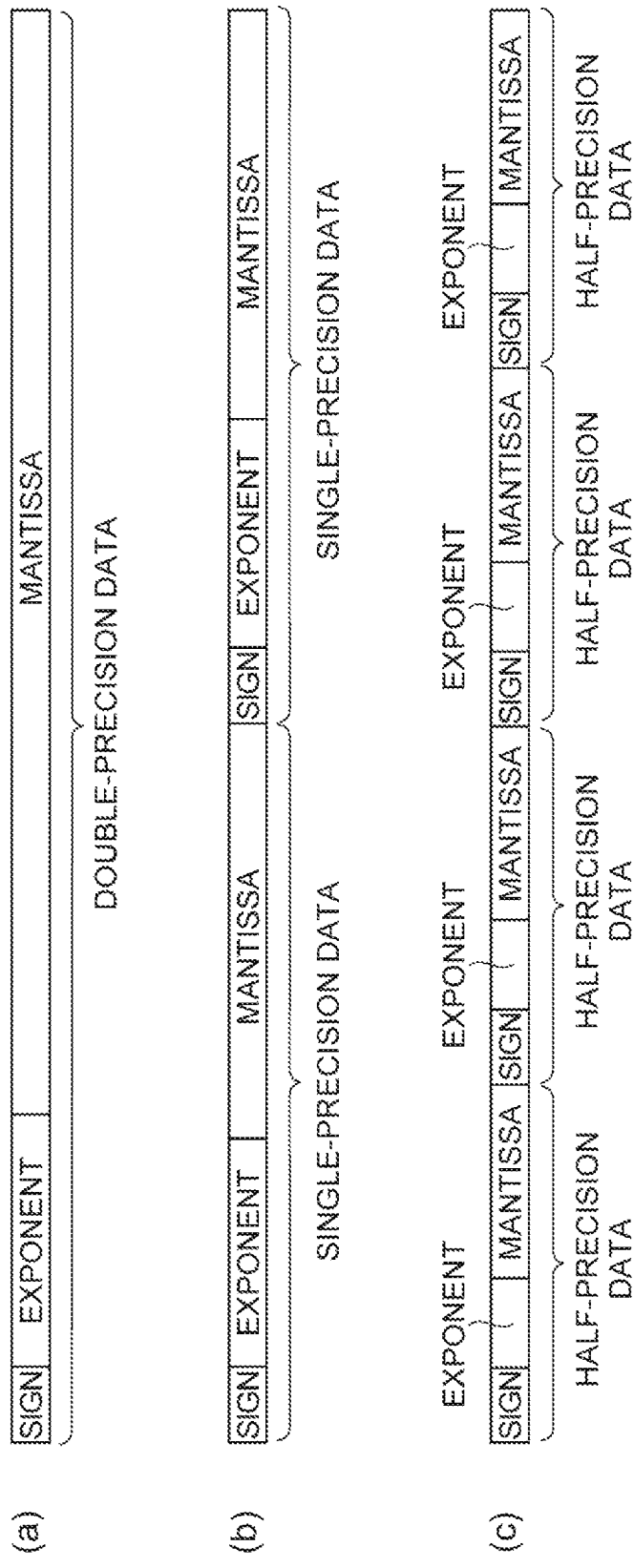
FIG. 12(a) is a view illustrating a configuration of double-precision data.
FIG. 12(b) is a view illustrating a configuration of single-precision data.
FIG. 12(c) is a view illustrating a configuration of half-precision data.

As illustrated in (a) to (c) of FIG. 12, the number and positions of exponent parts differ depending on whether each of the input data DIN0 to DIN3 has double-precision data, single-precision data or half-precision data. When the number of bits of double-precision data is 64 bits, the MSB indicates a sign, the following 11 bits correspond to an exponent part, and the remaining 52 bits correspond to a mantissa part in the double-precision data. When the number of bits of single-precision data is 32 bits, the MSB indicates a sign, the following 8 bits correspond to an exponent part, and the remaining 23 bits correspond to a mantissa part in the single-precision data. When the number of bits of half-precision data is 16 bits, the MSB indicates a sign, the following 5 bits correspond to an exponent part, and the remaining 10 bits correspond to a mantissa part in the half-precision data.

When the input data DIN0 to DIN5 are the double-precision data, each of the input data DIN0 to DIN3 has one exponent part. When the input data DIN0 to DIN3 are the single-precision data, each of the input data DIN0 to DIN5 has two exponent parts. When the input data DIN0 to DIN5 are the half-precision data, each of the input data DIN0 to DIN3 has four exponent parts. The exponent part extraction circuit 261 extracts the exponent part in response to the MODE signal, and outputs the exponent part serving as an addition target to the maximum value arithmetic circuits 262A to 262D and the subtraction circuits 263A to 263D based on the extracted exponent part.

The maximum value arithmetic circuits 262A to 262D are circuits that compute a maximum exponent that is a maximum exponent part among exponent parts of a plurality of target data to be added. The maximum value arithmetic circuits 262A to 262D set the maximum exponent part among a plurality of exponent parts supplied from the exponent part extraction circuit 261 as the maximum exponent. The maximum value arithmetic circuits 262A to 262D, for example, perform comparison in order from the MSB to the LSB of the plurality of target data to identify a bit string having a maximum value, and set a value of the identified bit string as the maximum exponent. The maximum value arithmetic circuits 262A to 262D output the maximum exponent to the subtraction circuits 263A to 263D. The subtraction circuits 263A to 263D subtract the exponent part supplied from the exponent part extraction circuit 261 from the maximum value computed by the maximum value arithmetic circuits 262A to 262D, and output a subtraction result to the alignment unit as a shift amount. A detailed operation of the shift amount arithmetic circuit 260 will be described later.

Figure 13:
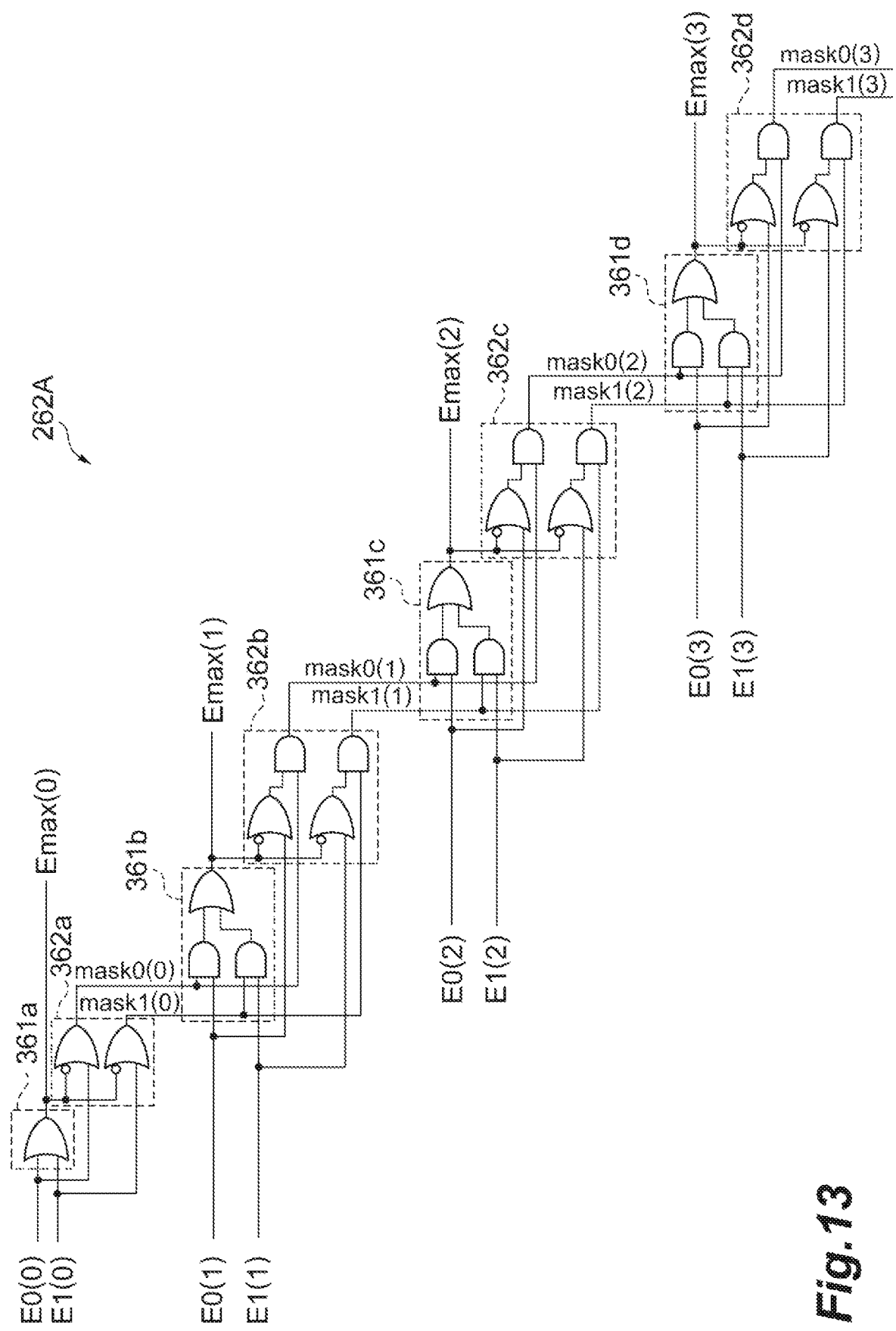
FIG. 13 is a circuit diagram illustrating a configuration example of a maximum value arithmetic circuit that computes a maximum value from two bit strings.
Figure 14:
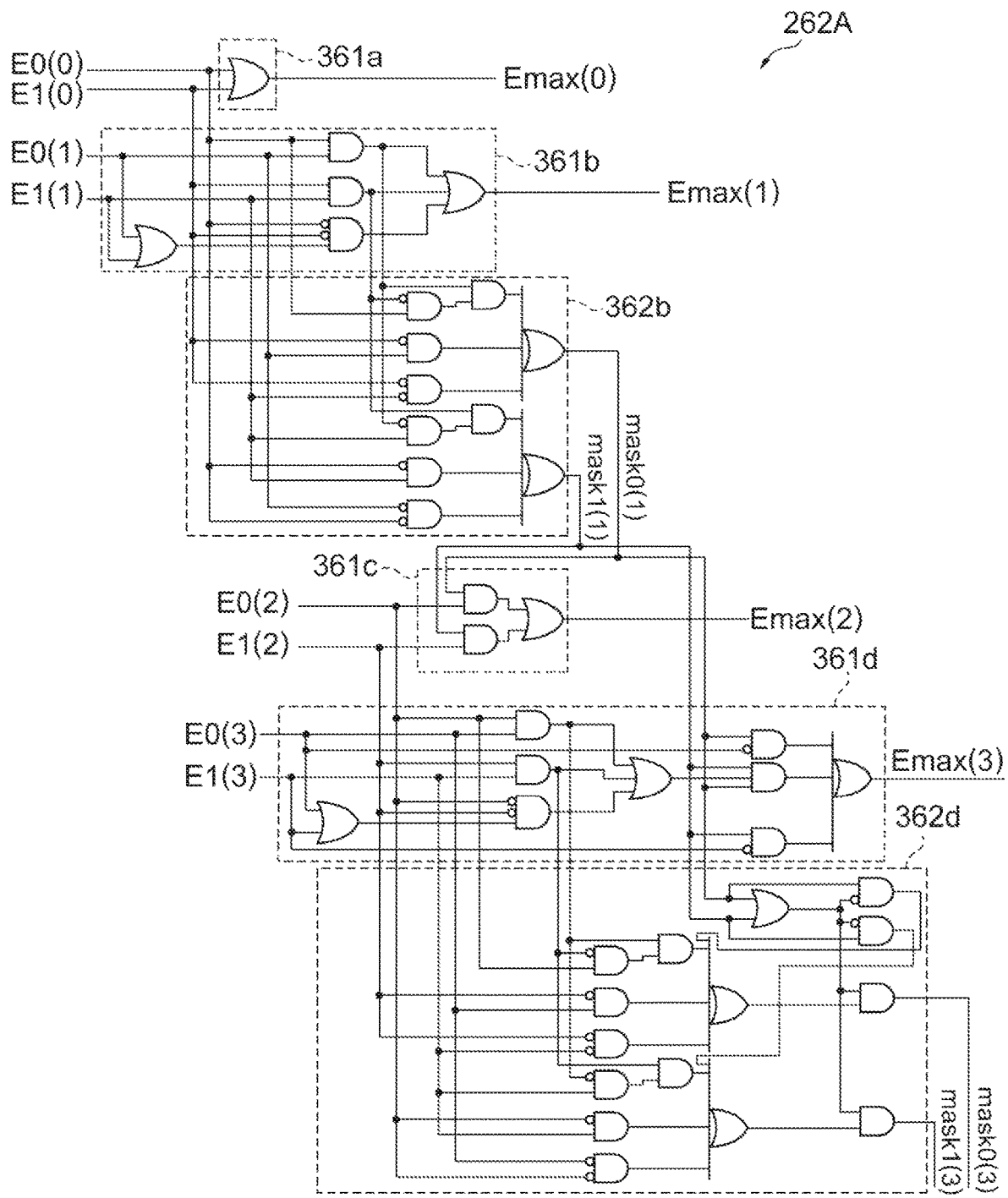
FIG. 14 is a circuit diagram illustrating another configuration example of the maximum value arithmetic circuit of FIG. 13.
Figure 15:
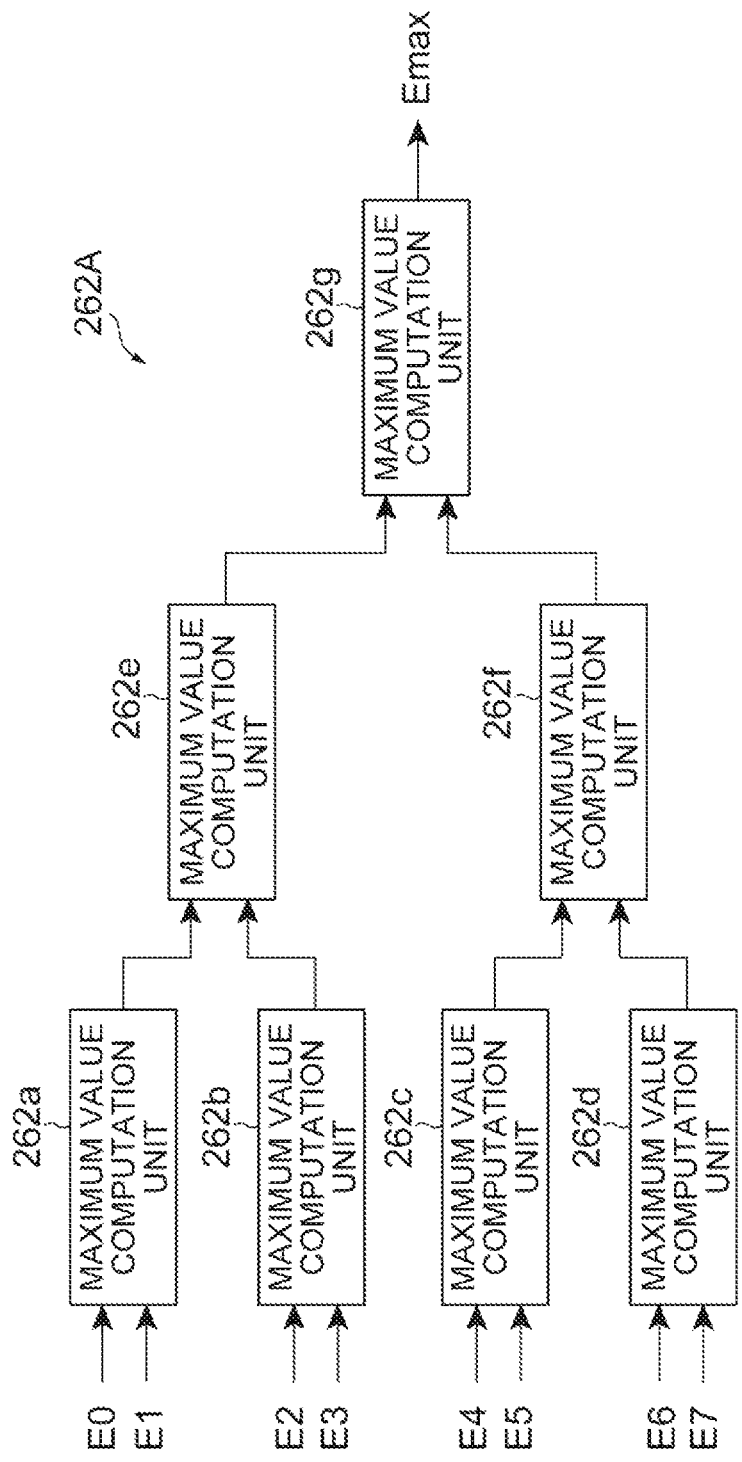
FIG. 15 is a diagram illustrating a configuration example of a maximum value arithmetic circuit that computes a maximum value from a plurality of bit strings.

Here, configuration examples of the maximum value arithmetic circuits 262A to 262D will be described with reference to FIGS. 13 to 15. FIG. 13 is a circuit diagram illustrating a configuration example of a maximum value arithmetic circuit that computes a maximum value from two bit strings. FIG. 14 is a circuit diagram illustrating another configuration example of the maximum value arithmetic circuit of FIG. 13. FIG. 15 is a diagram illustrating a configuration example of a maximum value arithmetic circuit that computes a maximum value from a plurality of bit strings. Since the maximum value arithmetic circuits 262A to 262D have the same configuration, the configuration of the maximum value arithmetic circuit 262A will be described herein.

The maximum value arithmetic circuit 262A illustrated in FIG. 13 is a circuit that calculates a maximum value out of two numerical values. In this example, bit strings E0 and E1 indicating the two numerical values are bit strings having 4 bits. The maximum value arithmetic circuit 262A outputs a bit string Emax having a maximum value out of the bit strings E0 and E1. The bit string E0 is a bit string in which bits E0(0), E0(1), E0(2), and E0(3) are arrayed in this order. The bit E0(0) is the MSB and the bit E0(3) is the LSB. Similarly, the bit string E1 is a bit string in which. bits E1(0), E1(1), E1(2), and E1(3) are arrayed in this order. The bit E1(0) is the MSB and the bit E1(3) is the LSB. Similarly, the bit string Emax is a bit string in which bits Emax(0), Emax(1), Emax(2), and Emax(3) are arrayed in this order. The bit Emax(0) is the MSB and the bit Emax(3) is the LSB.

The maximum value arithmetic circuit 262A includes bit generation units 361a to 361d and mask signal generation units 362a to 362d. The bit generation unit 361a generates the bit Emax(0). Specifically, the bit generation unit 361a is configured using an OR gate. The bit generation unit 361a performs an OR operation of the bits E0(0) and E1(0), and outputs a computation result as the bit Emax(0).

The bit generation unit 361b generates the bit Emax(1). Specifically, the bit generation unit 361b is configured using two AND gates and an OR gate. The bit generation unit 361b performs an AND operation of the bit E0(1) and a mask signal mask0(0) and an AND operation of the bit E1(1) and a mask signal mask1(0). Then, the bit generation unit 361b performs an OR operation of computation results of the two AND operations, and outputs a computation result as the bit Emax(1).

The bit generation unit 361c generates the bit Emax(2). Specifically, the bit generation unit 361c is configured using two AND gates and an OR gate. The bit generation unit 361c performs an AND operation of the bit E0(2) and a mask signal mask0(1) and an AND operation of the bit E1(2) and a mask signal mask1(1). Then, the bit generation unit 361c performs an OR operation of computation results of the two AND operations, and outputs a computation result as the bit Emax(2).

The bit generation unit 361d generates the bit Emax(3). Specifically, the bit generation unit 361d is configured using two AND gates and an OR gate. The bit generation unit 361d performs an AND operation of the bit E0(3) and a mask signal mask0(2) and an AND operation of the bit E 1(3) and a mask signal mask1(2). Then, the bit generation unit 361d performs an OR operation of computation results of the two AND operations, and outputs a computation result as the bit Emax(3).

The mask signal generation unit 362a generates the mask signals mask0(0) and mask1(0). Specifically, the mask signal generation unit 362a is configured using two OR gates. The mask signal generation unit 362a performs an OR operation of the bit E0(0) and an inverted bit Emax(0), and outputs a computation result as the mask signal mask0(0). The mask signal generation unit 362a performs an OR operation of the bit E1(0) and the inverted bit Emax(0), and outputs a computation result as the mask signal mask1(0).

The mask signal generation unit 362b generates the mask signals mask0(1) and mask1(1). Specifically, the mask signal generation unit 362b is configured using two OR gates and two AND gates. The mask signal generation unit 362b performs an OR operation of the bit E0(1) and an inverted bit Emax(1) and an AND operation of a computation result thereof and the mask signal mask0(0), and outputs a computation result thereof as the mask signal mask0(1). Similarly, the mask signal generation unit 362b performs an OR operation of the bit E1(1) and an inverted bit Emax(1) and an AND operation of a computation result thereof and the mask signal mask1(0), and outputs a computation result thereof as the mask signal mask1(1).

The mask signal generation unit 362c generates the mask signals mask0(2) and mask1(2). Specifically, the mask signal generation unit 362c is configured using two OR gates and two AND gates. The mask signal generation unit 362c performs an OR operation of the bit E0(2) and an inverted bit Emax(2) and an AND operation of a computation result thereof and the mask signal mask0(1), and outputs a computation result thereof as the mask signal mask0(2). Similarly, the mask signal generation unit 362c performs an OR operation of the bit E1(2) and the inverted bit Emax(2) and an AND operation of a computation result thereof and the mask signal mask1(1), and outputs a computation result thereof as the mask signal mask1(2).

The mask signal generation unit 362d generates mask signals mask0(3) and mask1(3). Specifically, the mask signal generation unit 362d is configured using two OR gates and two AND gates. The mask signal generation unit 362d performs an OR operation of the bit E0(3) and an inverted bit Emax(3) and an AND operation of a computation result thereof and the mask signal mask0(2), and outputs a computation result thereof as the mask signal mask0(3). Similarly, the mask signal generation unit 362d performs an OR operation of the bit E1(3) and the inverted bit Emax(3) and an AND operation of a computation result thereof and the mask signal mask1(2), and outputs a computation result thereof as the mask signal mask1(3).

In this manner, the bit string Emax is calculated one bit by one bit in order from the MSB in the maximum value arithmetic circuit 262A of FIG. 13. Since the mask signals mask0 and mask1 are propagated in order from the MSB to the LSB, a delay of the maximum value arithmetic circuit 262A is controlled in rate by the number of gates through which these mask signals mask0 and mask1 pass. Incidentally, the bit strings E0 and E1 serving as comparison targets are 4-bit bit strings, and thus, the mask signal generation unit 362d can be omitted. In addition, when bit strings serving as comparison targets are larger than 4 bits, the bit generation unit 361d and the mask signal generation unit 362d are further added in response to the number of bits.

The maximum value arithmetic circuit 262A illustrated in FIG. 14 is a circuit that calculates a maximum value out of two numerical values. In this example, bit strings E0 and E1 indicating the two numerical values are bit strings having 4 bits. The maximum value arithmetic circuit 262A is mainly different from the maximum value arithmetic circuit 262A illustrated in FIG. 13 in terms of not providing the mask signal generation units 362a and 362c, and configurations of the bit generation units 361b and 361d and the mask signal generation units 362b and 362d.

The bit generation unit 361b is configured using three AND gates and two OR gates. The bit generation unit 361b performs an AND operation of the bits E0(0) and E0(1) and an AND operation of the bits E1(0) and E1(1). The bit generation unit 361b performs an OR operation of the bits E0(1) and E1(1), and performs an AND operation of a computation result thereof, an inverted bit E0(0), and an inverted bit E1(0). Then, the bit generation unit 361b further performs an OR operation of computation results of the three AND operations, and outputs a computation result as the bit Emax(1).

The bit generation unit 361*d* is configured using six AND gates and three OR gates. The bit generation unit 361*d* performs an AND operation of the bits E0(2) and E0(3) and an AND operation of the bits E1(2) and E1(3). The bit generation unit 361*d* performs an OR operation of the bits E0(3) and E1(3), and performs an AND operation of a computation result thereof, an inverted bit E0(2), and an inverted bit E1(2). Then, the bit generation unit 361*d* further performs an OR operation of the computation results of the three AND operations. The bit generation unit 361*d* further performs an AND operation of a comparison result of the OR operation and the mask signals mask0(1) and mask1(1), an AND operation of the inverted bit E0(3) and the mask signal mask0(1), and an AND operation of the inverted bit E1(3) and the mask signal mask1(1), and performs an OR operation of computation results of the three AND operations to output a computation result as the bit Emax(3).

The mask signal generation unit 362*b* is configured using eight AND gates and two OR gates. The mask signal generation unit 362*b* performs an AND operation of an inverted result of the AND operation of the bits E1(0) and E1(1) and the bit E0(0), and further performs an AND operation of a computation result thereof and the result of the AND operation of the bits E0(0) and E0(1). Then, the mask signal generation unit 362*b* performs an AND operation of the inverted bit E1(0) and the bit E0(1), and performs an AND operation of the inverted bit E1(0) and an inverted bit E1(1). Then, the mask signal generation unit 362*b* performs an OR operation of the three AND operation results, and outputs a computation result as the mask signal mask0(1).

The mask signal generation unit 362*b* performs an AND operation of an inverted result of the AND operation of the bits E0(0) and E0(1) and the bit E1(1), and further performs an AND operation of a computation result thereof and the result of the AND operation of the bits E1(0) and 1 E1(4 Then, the mask signal generation unit 362*b* performs an AND operation of the inverted bit E0(0) and the bit E1(1), and performs an AND operation of the inverted bit E0(0) and an inverted bit E0(1). Then, the mask signal generation unit 362*b* performs an OR operation of the three AND operation results, and outputs a computation result as the mask signal mask1(1).

The mask signal generation unit 362*d* is configured using twelve AND gates and three OR gates. The mask signal generation unit 362*d* performs an OR operation of the mask signals mask0(1) and mask1(1), performs an AND operation of an inverted computation result thereof and the mask signal mask0(1). In addition, the mask signal generation unit 362*d* performs an AND operation of an inverted result of the AND operation of the bits E1(2) and E1(3) and the bit E0(2), and further performs an AND operation of a computation result thereof and the result of the AND operation of the bits E0(2) and E0(3). Then, the mask signal generation unit 362*d* performs an AND operation of the inverted bit E1(2) and the bit E0(3), and performs an AND operation of the inverted bit E1(2) and an inverted bit E1(3). Then, the mask signal generation unit 362*d* performs an OR operation of the four AND operation results, performs an AND operation of a computation result thereof and the result of the OR operation of the mask signals mask0(1) and mask1(1), and outputs the computation result as the mask signal mask0(3).

The mask signal generation unit 362*d* performs an AND operation of an inverted result of the OR operation of the mask signals mask0(1) and mask1(1) and the mask signal mask1(1). In addition, the mask signal generation unit 362*d* performs an AND operation of an inverted result of the AND operation of the bits E0(2) and E0(3) and the bit E1(3), and further performs an AND operation of a computation result thereof and the result of the AND operation of the bits E 1(2) and E1(3). Then, the mask signal generation unit 362*d* performs an AND operation of the inverted bit E0(2) and the bit E1(3), and performs an AND operation of the inverted bit E0(2) and an inverted bit E0(3). Then, the mask signal generation unit 362*d* performs an OR operation of the four AND operation results, performs an AND operation of a computation result thereof and the result of the OR operation of the mask signals mask0(1) and mask1(1), and outputs a computation result thereof as the mask signal mask1(3).

In this manner, the bit string Emax is calculated two bits by two bits in order from the MSB in the maximum value arithmetic circuit 262A of FIG. 14. Since a plurality of bits are collectively processed, the number of gates through which the mask signals mask( ) and mask1 pass can be reduced as compared with the maximum value arithmetic circuit 262A in FIG. 13. As a result, a delay of the maximum value arithmetic circuit 262A can be reduced, and it is possible to improve the processing efficiency of the maximum value arithmetic circuit 262A, as compared with the maximum value arithmetic circuit 262A of FIG. 13.

Incidentally, the bit strings E0 and E1 serving as comparison targets are 4-bit bit strings, and thus, the mask signal generation unit 362*d* can be omitted. In addition, when the bit strings E0 and E1 serving as the comparison targets are larger than 4 bits, the bit generation units 361*c* and 361*d* and the mask signal generation unit 362*d* are further added every two bits.

The maximum value arithmetic circuit 262A illustrated in FIG. 15 is a circuit that calculates a maximum value out of a plurality of numerical values. In this example, the maximum value arithmetic circuit 262A outputs a bit string having a maximum value out of eight bit strings E0 to E7. The maximum value arithmetic circuit 262A includes a plurality of maximum value computation units (here, the maximum value computation units 262*a* to 262*g*). Each of the maximum value computation units 262*a* to 262*g* is a circuit that calculates a maximum value out of two numerical values, and has the same configuration as the maximum value arithmetic circuit 262A illustrated in FIG. 13 or 14, for example.

The maximum value computation unit 262*a* outputs a bit string having a maximum value out of the bit strings E0 and E1. The maximum value computation unit 262*b* outputs a bit string having a maximum value out of the bit strings E2 and E3. The maximum value computation unit 262*c* outputs a bit string having a maximum value out of the bit strings E4 and E5. The maximum value computation unit 262*d* outputs a bit string having a maximum value out of the bit strings E6 and E7. The maximum value computation unit 262*e* outputs a bit string having a maximum value out of a bit string output from the maximum value computation unit 262*a* and a bit string output from the maximum value computation unit 262*b*. The maximum value computation unit 262*f* outputs a bit string having a maximum value out of a bit string output from the maximum value computation unit 262*c* and a bit string output from the maximum value computation unit 262*d*. The maximum value computation unit 262*g* outputs a bit string having a maximum value out of a bit string output from the maximum value computation unit 262*e* and a bit string output from the maximum value computation unit 262*f*.

In this manner, the plurality of maximum value computation units are connected in a tree shape in the maximum value arithmetic circuit 262A. As a result, the bit string having the maximum values out of the plurality of bit strings is output.

Figure 16:
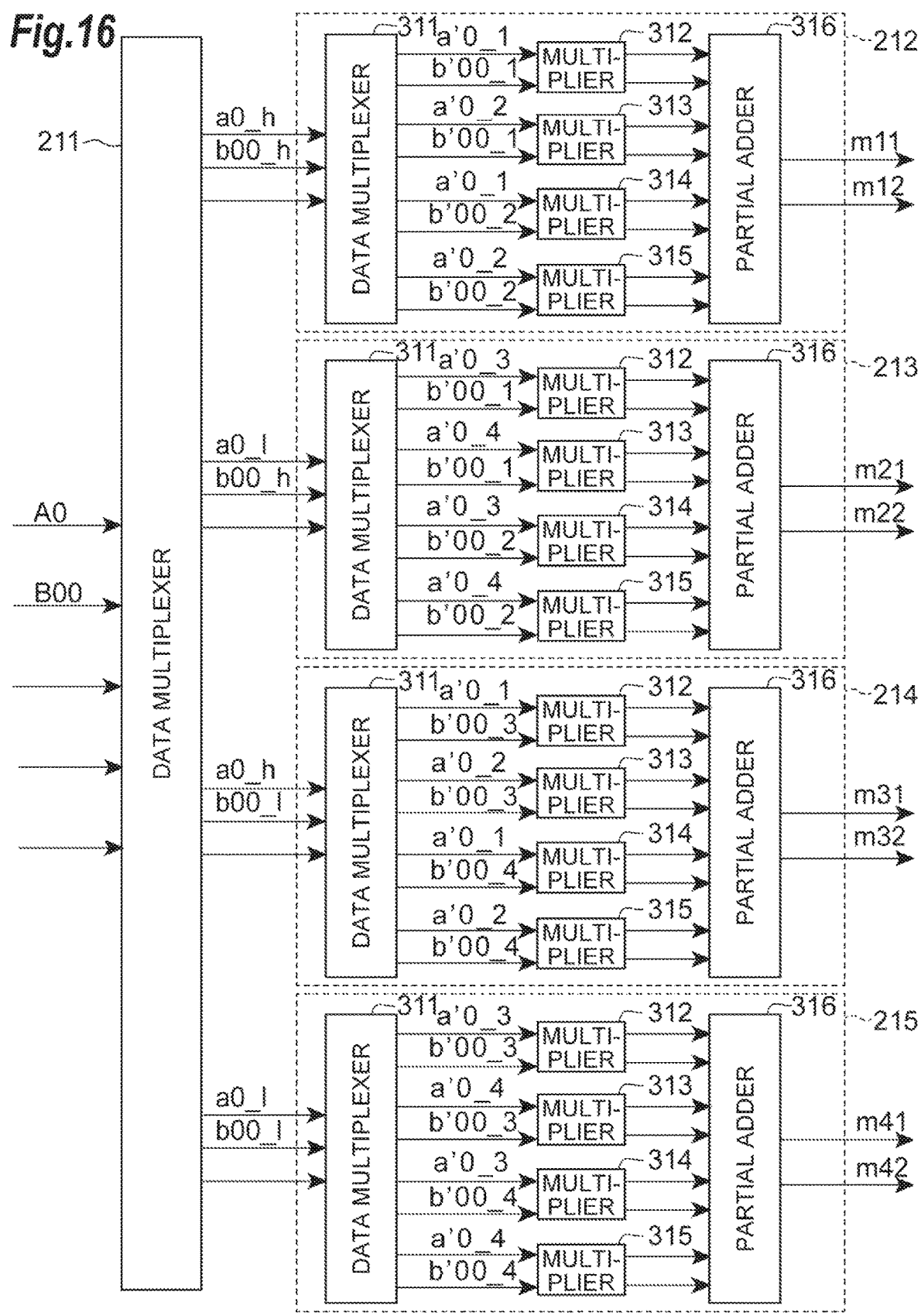
FIG. 16 is a diagram for describing an operation in a first computation mode of the computation device of FIG. 8.

Next, operations of the computation devices 1A to 1D in the first computation mode will be described with reference to FIG. 16. FIG. 16 is a diagram for describing the operation in the first computation mode of the computation device of FIG. 8. Here, a description will be given regarding an example in which the double-precision computation mode is used as the first computation mode, and the arithmetic unit MAU performs a double-precision matrix operation shown in Formula (1). The same operation is performed in the computation devices 1A to 1D although data serving as a computation target is different, and thus, the computation device 1A will be described herein. In addition, the same operation is performed in the computation units 210A to 210D although data serving as a computation target is different, and thus, the computation unit 210A will be described herein.

The computation unit 210A of the computation device 1A computes A0×B00. The double-precision data A0 includes high-order data a0_h and low-order data a0_l. The high-order data a0_h includes data a'0_1 and data a'02, and the low-order data a0_l includes data a'0_3 and data a'0_4. The data a'0_1 to a'0_4 are sequentially arrayed in order from the MSB of a bit string of the double-precision data A0. The double-precision data B00 includes high-order data b00_h and low-order data b00_l. The high-order data b00_h includes data b'00_1 and data b'00_2, and the low-order data b00_l includes data b'00_3 and data 13 '00_4. The data b'00_1 to b'00_4 are sequentially arrayed in order from the MSB of a bit string of the double-precision data B00. The data a'0_1 to a'0_4 and the data b'00_1 to b'00 4 have the same number of bits as the half-precision data.

As shown in Formula (16), the computation unit 210A multiplies the double-precision data A0 and the double-precision data B00 by dividing each of the double-precision data A0 and the double-precision data B00 into four data having the number of bits of half-precision data.

[Formula 16]

$$\begin{aligned}A0 \times B00 &= (a0\_h + a0\_l) \times (b00\_h + b00\_l) \\ &= a0\_h \times b00\_h + a0\_l \times b00\_h + a0\_h \times b00\_l + \\ & \quad a0\_l \times b00\_l \\ &= (a'0\_1 + a'0\_2) \times (b'00\_1 + b'00\_2) + \\ & \quad (a'0\_3 + a'0\_4) \times (b'00\_1 + b'00\_2) + \\ & \quad (a'0\_1 + a'0\_2) \times (b'00\_3 + b'00\_4) + \\ & \quad (a'0\_3 + a'0\_4) \times (b'00\_3 + b'00\_4) \\ &= a'0\_1 \times b'00\_1 + a'0\_1 \times b'00\_2 + \\ & \quad a'0\_1 \times b'00\_3 + a'0\_1 \times b'00\_4 + \\ & \quad a'0\_2 \times b'00\_1 + a'0\_2 \times b'00\_2 + \\ & \quad a'0\_2 \times b'00\_3 + a'0\_2 \times b'00\_4 + \\ & \quad a'0\_3 \times b'00\_1 + a'0\_3 \times b'00\_2 + \\ & \quad a'0\_3 \times b'00\_3 + a'0\_3 \times b'00\_4 + \\ & \quad a'0\_4 \times b'00\_1 + a'0\_4 \times b'00\_2 + \\ & \quad a'0\_4 \times b'00\_3 + a'0\_4 \times b'00\_4 \end{aligned} \quad (16)$$

This will be described in detail hereinafter. A register 41 stores the double-precision data A0, and the double-precision data A0 is supplied from the register 41 to the data multiplexer 211 as the input data DIN1. A register 42 stores the double-precision data B00, and the double-precision data B00 is supplied from the register 42 to the data multiplexer 211 as the input data DIN2. Registers 43 to 45 do not store valid data.

The MODE signal indicating the double-precision computation mode is supplied to the data multiplexer 211. Thus, the data multiplexer 211 outputs the high-order data a0_h and the high-order data b00_h to the multiplier 212. In addition, the data multiplexer 211 outputs the low-order data a0_l and the high-order data b00_h to the multiplier 213. In addition, the data multiplexer 211 outputs the high-order data a0_h and the low-order data b00_l to the multiplier 214. In addition, the data multiplexer 211 outputs the low-order data a0_l and the low-order data b00_l to the multiplier 215.

In the multiplier 212, the MODE signal indicating the double-precision computation mode is supplied to the data multiplexer 311. Thus, the data multiplexer 311 outputs the data a'0_1 and the data b'00_1 to the multiplier 312, outputs the data a'0_2 and the data b'00_1 to the multiplier 313, outputs the data a'0_1 and the data b'00_2 to the multiplier 314, and outputs the data a'0_2 and the data b'00_2 to the multiplier 315. Then, the multipliers 312 to 315 perform multiplications, and the partial adder 316 ads the intermediate results thereof m'11, m'12, m'21, m'22, m'31, m'32, m'41, and m'42 and outputs the intermediate result m11 and the intermediate result m12. That is, the multiplier 212 computes a0_h×b00_h using the half-precision data to output the intermediate result m11 and the intermediate result m12.

Similarly, the multiplier 313 computes a0_l×b00_h using the half-precision data to output an intermediate result m21 and an intermediate result m22. Similarly, the multiplier 314 computes a0_h×b00_l using the half-precision data to output an intermediate result m31 and an intermediate result m32. Similarly, the multiplier 315 computes a0_l×b00_l using the half-precision data to output an intermediate result m41 and an intermediate result m42. Since the operations of the multipliers 213 to 215 are the same as the operation of the multiplier 212, the description thereof will be omitted. Since the subsequent processing is the same as that of the computation unit 10A, the description thereof will be omitted.

Here, the operation of the shift amount arithmetic circuit 260 in the first computation mode will be described. Since the computation shown in Formula (2) is performed in the computation device 1A, it is necessary to align exponent parts of the respective terms in order for the adder 51 to ad the respective terms on the right side of Formula (2). The shift amount arithmetic circuit 260 computes a shift amount of each term. This will be described in detail hereinafter.

The MODE signal indicating the double-precision computation mode is supplied to the exponent part extraction circuit 261. Thus, the exponent part extraction circuit 261 extracts an exponent part from each of the input data DIN1 and DIN2 from the computation units 210A to 210D and the input data DIN0. Specifically, the exponent part extraction circuit 261 extracts exponent parts of double-precision data A0 to A3, double-precision data B00, B10, B20, B30, and double-precision data C0.

Then, the exponent part extraction circuit 261 calculates an exponent part of A0×B00 by computing the sum of the exponent part of the double-precision data A0 and the exponent part of the double-precision data B00. Similarly, the exponent part extraction circuit 261 calculates an exponent part of A1×B10 by computing the sum of the exponent part of the double-precision data A1 and the exponent part of the double-precision data B10. Similarly, the exponent part extraction circuit 261 calculates an exponent part of A2×B20 by computing the sum of the exponent part of the double-precision data A2 and the exponent part of the double-precision data B20. Similarly, the exponent part extraction circuit 261 calculates an exponent part of A3×B30 by computing the sum of the exponent part of the double-precision data A3 and the exponent part of the double-precision data B30. Then, the exponent part extraction circuit 261 outputs the exponent part of A0×B00, the exponent part of A1×B10, the exponent part of A2×B20, the exponent part of A3×B30, and the exponent part of double-precision data C0 to the maximum value arithmetic circuit 262A. In addition, the exponent part extraction circuit 261 outputs the exponent part of A0×B00, the exponent part of A1×B10, the exponent part of A2×B20, and the exponent part of A3×B30 to the subtraction circuits 263A different from each other.

The maximum value arithmetic circuit 262A calculates (identifies) a maximum exponent part out of the exponent part of A0×B00, the exponent part of A1×B10, the exponent part of A2×B20, the exponent part of A3×B3 0, and the exponent part of double-precision data C0 as a maximum exponent. Then, the maximum value arithmetic circuit 262A outputs the maximum exponent to each of the subtraction circuits 263A.

Then, each of the subtraction circuits 263A computes a difference between the maximum exponent and the exponent part of each multiplication result. Specifically, the subtraction circuit 263A to which the exponent part of A0×B00 is supplied subtracts the exponent part of A0×B00 from the maximum exponent and calculates a subtraction result thereof as a shift amount. Then, the subtraction circuit 263A outputs the calculated shift amount to the alignment units 17 and 18 of the computation unit 210A. Similarly, the subtraction circuit 263A to which the exponent part of A1×B10 is supplied subtracts the exponent part of A1×B10 from the maximum exponent and calculates a subtraction result thereof as a shift amount. Then, the subtraction circuit 263A outputs the calculated shift amount to the alignment units 17 and 18 of the computation unit 210B.

In addition, the subtraction circuit 263A to which the exponent part A2×B20 is supplied subtracts the exponent part of A2×B20 from the maximum exponent and calculates a subtraction result thereof as a shift amount. Then, the subtraction circuit 263A outputs the calculated shift amount to the alignment units 17 and 18 of the computation unit 210C. Similarly, the subtraction circuit 263A to which the exponent part of A3×B30 is supplied subtracts the exponent part of A3×B30 from the maximum exponent and calculates a subtraction result thereof as a shift amount. Then, the subtraction circuit 263A outputs the calculated shift amount to the alignment units 17 and 18 of the computation unit 210D.

Each of the alignment units 17 performs a shift process on a mantissa part of an intermediate result P11 based on the shift amount supplied from the shift amount arithmetic circuit 260. Similarly, each of the alignment units 18 performs a shift process on a mantissa part of an intermediate result P12 based on the shift amount supplied from the shift amount arithmetic circuit 260.

Figure 17:
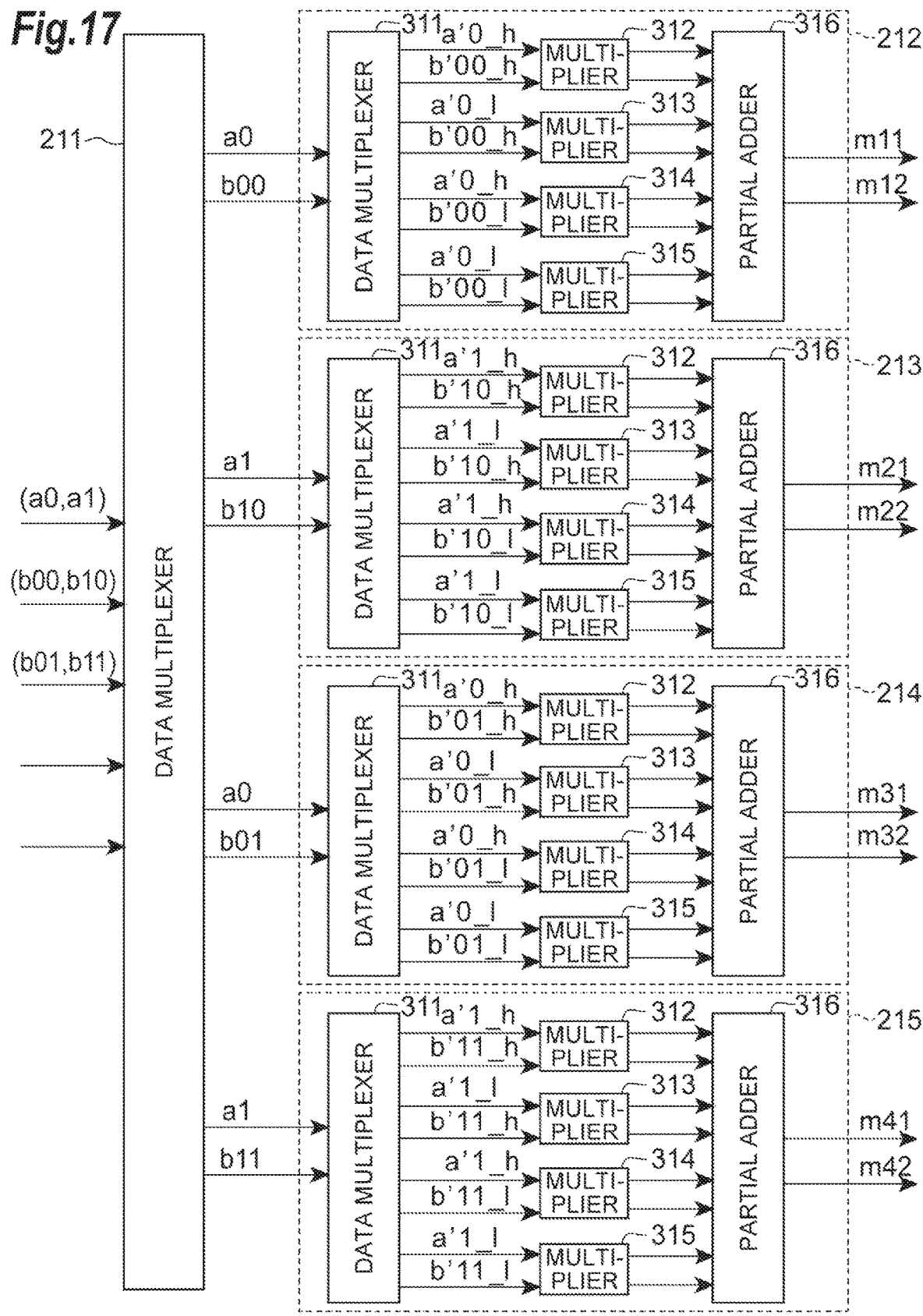
FIG. 17 is a diagram for describing an operation in a second computation mode of the computation device of FIG. 8.

Next, operations of the computation devices 1A to 1D in the second computation mode will be described using FIG. 17. FIG. 17 is a diagram for describing the operation in the second computation mode of the computation device of FIG. 8. Here, a description will be given regarding an example in which the single-precision computation mode is used as the second computation mode, and the arithmetic unit MAU performs a single-precision matrix operation shown in Formula (7). The same operation is performed in the computation devices 1A to 1D although data serving as a computation target is different, and thus, the computation device 1A will be described herein. In addition, the same operation is performed in the computation units 210A to 210D although data serving as a computation target is different, and thus, the computation unit 210A will be described herein.

The computation unit 210A of the computation device 1A computes a0×b00+a1×b10 and computes a0×b01+a1×b11. Single-precision data a0 includes data a'0_h that is an upper half bit string of the bit string of the single-precision data a0 and data a'0_l that is a lower half bit string of the bit string of the single-precision data a0. The same description also applies to single-precision data a1, b00, b10, b01, and b11. Data a'0_h, a'0_1, a'1_h, a'1_1, b'00_h, b'00_1, b'10_h, b'10_1, b'01_h, b'01_1, b'11_h, and b'11_1 have the same number of bits as the half-precision data.

The computation unit 210A performs a multiplication of the single-precision data a0 and the single-precision data b00 and a multiplication of the single-precision data a1 and the single-precision data b10 by dividing each of the single-precision data a0 and a1 and the single-precision data b00 and b10 into two data having the number of bits of the half-precision data as shown in Formula (17).

[Formula 17]

$$\begin{aligned} a0 \times b00 + a1 \times b10 &= (a'0\_h + a'0\_l) \times \\ & \quad (b'00\_h + b'00\_l) + \\ & \quad (a'1\_h + a'1\_l) \times (b'10\_h + b'10\_l) \\ &= a'0\_h \times b'00\_h + a'0\_h \times b'00\_l + \\ & \quad a'0\_l \times b'00\_h + a'0\_l \times b'00\_l + \\ & \quad a'1\_h \times b'10\_h + a'1\_h \times b'10\_l + \\ & \quad a'1\_l \times b'10\_h + a'1\_l \times b'10\_l \end{aligned} \quad (17)$$

Similarly, the computation unit 210A performs a multiplication of the single-precision data a0 and the single-precision data b01 and a multiplication of the single-precision data a1 and the single-precision data b11 by dividing each of the single-precision data a0 and a1 and the single-precision data b01 and b11 into two data having the number of bits of the half-precision data as shown in Formula (18).

[Formula 18]

$$\begin{aligned} a0 \times b01 + a1 \times b11 &= (a'0\_h + a'0\_l) \times \\ & \quad (b'01\_h + b'01\_l) + \\ & \quad (a'1\_h + a'1\_l) \times (b'11\_h + b'11\_l) \\ &= a'0\_h \times b'01\_h + a'0\_h \times b'01\_l + \\ & \quad a'0\_l \times b'01\_h + a'0\_l \times b'01\_l + \\ & \quad a'1\_h \times b'11\_h + a'1\_h \times b'11\_l + \\ & \quad a'1\_l \times b'11\_h + a'1\_l \times b'11\_l \end{aligned} \quad (18)$$

This will be described in detail hereinafter. The single-precision data a0 is stored in high-order bits of the register 41, and the single-precision data a1 is stored in low-order bits of the register 41. The single-precision data a0 and the single-precision data a1 are supplied from the register 41 to the data multiplexer 211 as the input data DIN1. The single-precision data b00 is stored in high-order bits of the register 42, and the single-precision data b10 is stored in low-order bits of the register 42. The single-precision data b00 and the single-precision data b10 are supplied from the register 42 to the data multiplexer 211 as the input data DIN2. The single-precision data b01 is stored in high-order bits of the register 43, and the single-precision data b11 is stored in low-order bits of the register 43. The single-precision data b01 and the single-precision data b11 are supplied from the register 43 to the data multiplexer 211 as the input data DIN3. The registers 44 and 45 do not store valid data.

The MODE signal indicating the single-precision computation mode is supplied to the data multiplexer 211. Thus, the data multiplexer 211 outputs the single-precision data a0 and the single-precision data b00 to the multiplier 212. In addition, the data multiplexer 211 outputs the single-precision data a1 and the single-precision data b10 to the multiplier 213. In addition, the data multiplexer 211 outputs the single-precision data a0 and the single-precision data b01 to the multiplier 214. In addition, the data multiplexer 211 outputs the single-precision data a1 and the single-precision data b11 to the multiplier 215.

In the multiplier 212, the MODE signal indicating the single-precision computation mode is supplied to the data multiplexer 311. Thus, the data multiplexer 311 outputs the data a'0_h and the data b'00_h to the multiplier 312, outputs the data a'0_1 and the data b'00_h to the multiplier 313, outputs the data a'0_h and the data b'00_1 to the multiplier 314, and outputs the data a'0_1 and the data b'00_1 to the multiplier 315. Then, the multipliers 312 to 315 perform multiplications, and the partial adder 316 ads the intermediate results m'11, m'12, m'21, m'22, m'31, m'32, m'41, and m'42 and outputs the intermediate result m11 and the intermediate result m12. That is, the multiplier 212 computes a0×b00 using the half-precision data to output the intermediate result m11 and the intermediate result m12.

Similarly, the multiplier 313 computes a1×b10 using the half-precision data, and outputs the intermediate result m21 and the intermediate result m22. Similarly, the multiplier 314 computes a0×b01 using the half-precision data, and outputs the intermediate result m31 and the intermediate result m32. Similarly, the multiplier 315 computes a1×b11 using the half-precision data, and outputs the intermediate result m41 and the intermediate result m42. Since the operations of the multipliers 213 to 215 are the same as the operation of the multiplier 212, the description thereof will be omitted. Since the subsequent processing is the same as that of the computation unit 10A, the description thereof will be omitted.

Here, the operation of the shift amount arithmetic circuit 260 in the second computation mode will be described. In the computation device 1A, the computations shown in Formulas (8) and (9) are performed. Thus, it is necessary to align exponent parts of the respective terms in order for the adder 52 to ad the respective terms on the right side of Formula (8). Similarly, it is necessary to align exponent parts of the respective terms in order for the adder 53 to ad the respective terms on the right side of Formula (9). The shift amount arithmetic circuit 260 computes a shift amount of each term. This will be described in detail hereinafter.

The MODE signal indicating the single-precision computation mode is supplied to the exponent part extraction circuit 261. Thus, the exponent part extraction circuit 261 extracts an exponent part from each of the input data DIN1 to DIN3 from the computation units 210A to 210D and the input data DIN0. Specifically, the exponent part extraction circuit 261 extracts exponent parts of single-precision data a0 to a7, single-precision data b00, b01, b10, b11, b20, b21, b30, b31, b40, b41, b50, b51, b60, b61, b70, and b71, and the single-precision data c0 and c1.

Then, the exponent part extraction circuit 261 calculates an exponent part of a0×b00 by computing the sum of the exponent part of the single-precision data a0 and the exponent part of the single-precision data b00. Similarly, the exponent part extraction circuit 261 calculates an exponent part of a1×b10 an exponent part of a2×b20, an exponent part of a3×b30, an exponent part of a4×b40, an exponent part of a5×b50, an exponent part of a6×b60, and an exponent part of a7×b70. Then, the exponent part extraction circuit 261 outputs the exponent part of each multiplication result and the exponent part of the single-precision data c0 to the maximum value arithmetic circuit 262A. In addition, the exponent part extraction circuit 261 outputs the exponent parts of the respective multiplication result to the subtraction circuits 263A different from each other.

Similarly, the exponent part extraction circuit 261 calculates an exponent part of each multiplication result on the right side shown in Formula (9), and outputs the exponent part of each multiplication result and the exponent part of the single-precision data c1 to the maximum value arithmetic circuit 262B. In addition, the exponent part extraction circuit 261 outputs the exponent parts of the respective multiplication results to the subtraction circuits 263B different from each other.

The maximum value arithmetic circuit 262A calculates (identifies) a maximum exponent part out of the exponent part of a0×b00, the exponent part of a1×b10, the exponent part of a2×b20, the exponent part of a3×b30, the exponent part of a4×b40, the exponent part of a5×b50, the exponent part of a6×b60, the exponent part of a7×b70, and the exponent part of the single-precision data c0 as a maximum exponent. Then, the maximum value arithmetic circuit 262A outputs the maximum exponent to each of the subtraction circuits 263 A.

Then, each of the subtraction circuits 263A computes a difference between the maximum exponent and the exponent part of each multiplication result. Specifically, the subtraction circuit 263A to which the exponent part of a0×b00 is supplied subtracts the exponent part of a0×b00 from the maximum exponent and calculates a subtraction result thereof as a shift amount. Then, the subtraction circuit 263A outputs the calculated shift amount to the alignment units 21 and 22 of the computation unit 210A. Similarly, the subtraction circuit 263A to which the exponent part of a1×b10 is supplied subtracts the exponent part of a1×b10 from the maximum exponent and calculates a subtraction result thereof as a shift amount. Then, the subtraction circuit 263A outputs the calculated shift amount to the alignment units 23 and 24 of the computation unit 210A.

In addition, the subtraction circuit 263A to which the exponent part of a2×b20 is supplied subtracts the exponent part of a2×b20 from the maximum exponent and calculates a subtraction result thereof as a shift amount. Then, the subtraction circuit 263A outputs the calculated shift amount to the alignment units 21 and 22 of the computation unit 210B. In this manner, each of the subtraction circuits 263A outputs the calculated shift amount to the alignment unit that performs the shift process on the supplied multiplication result (intermediate result). Since operations of the maximum value arithmetic circuit 262B and the subtraction circuit 263B are the same, the description thereof will be omitted.

Then, each alignment unit performs a shift process on a mantissa part of the intermediate result based on the shift amount supplied from the shift amount arithmetic circuit 260.

Figure 18:
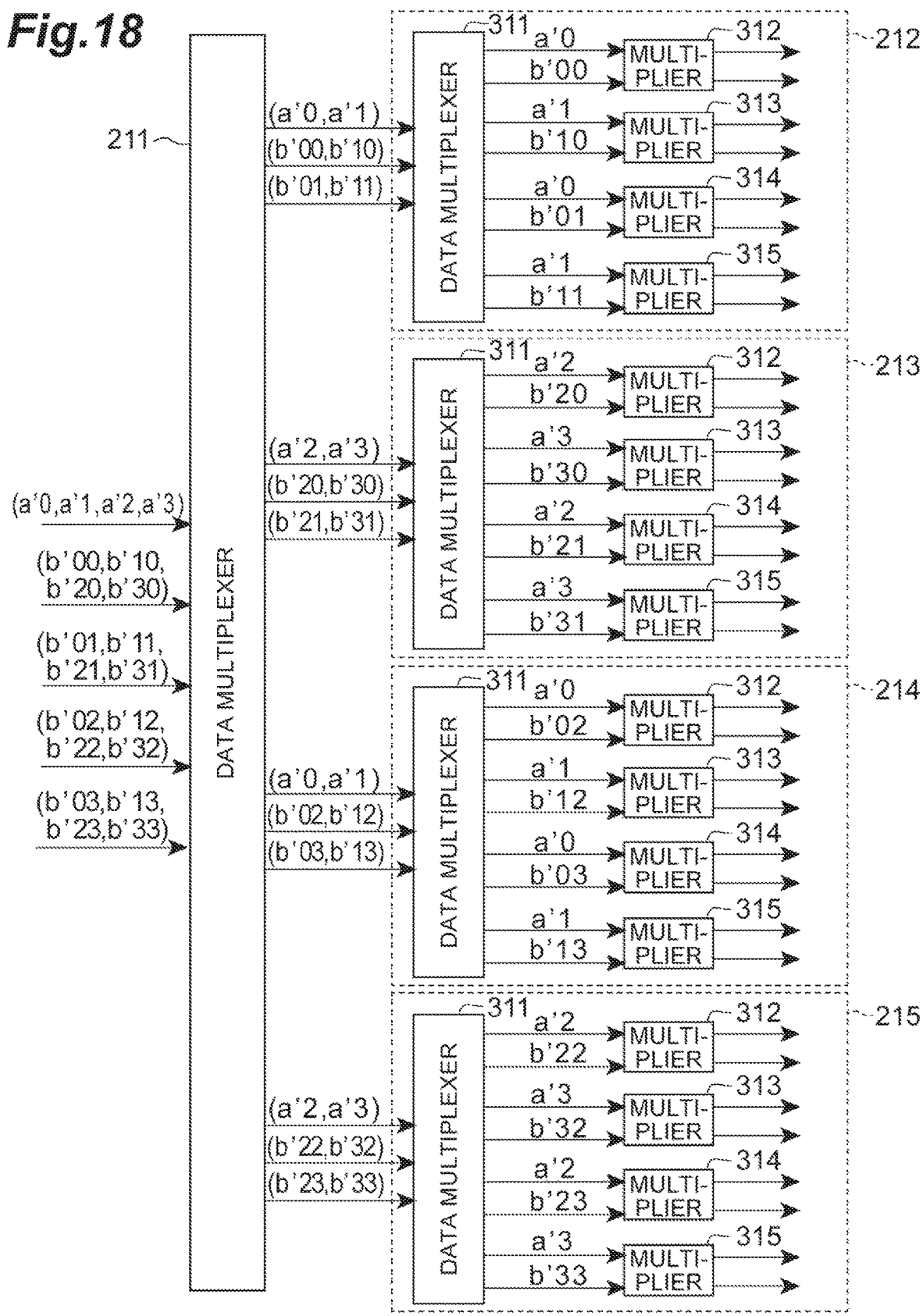
FIG. 18 is a diagram for describing an operation in a third computation mode of the computation device of FIG. 8.

Next, operations of the computation devices 1A to 1D in the third computation mode will be described using FIG. 18. FIG. 18 is a diagram for describing the operation in the third computation mode of the computation device of FIG. 8. Here, a description will be given regarding an example in which the half-precision computation mode is used as the third computation mode, and the arithmetic unit MAU performs a single-precision matrix operation shown in Formula (19).

[Formula 19]

$$(a'0 \ a'1 \ \cdots \ a'15) \times \begin{pmatrix} b'00 & b'01 & \cdots & b'0F \\ b'10 & b'11 & \cdots & b'1F \\ \vdots & \vdots & \ddots & \vdots \\ b'F0 & b'F1 & \cdots & b'FF \end{pmatrix} + (c'0 \ c'1 \ \cdots \ c'15) \quad (19)$$

The computation device 1A performs matrix operations shown in Formulas (20) to (23).

[Formula 20]

$$d'0 = (a'0, a'1, \ldots, a'15) \times (b'00, b'10, \ldots, b'F0) + c'0 \quad (20)$$

[Formula 21]

$$d'1 = (a'0, a'1, \ldots, a'15) \times (b'01, b'11, \ldots, b'F1) + c'1 \quad (21)$$

[Formula 22]

$$d'2 = (a'0, a'1, \ldots, a'15) \times (b'02, b'12, \ldots, b'F2) + c'2 \quad (22)$$

[Formula 23]

$$d'3 = (a'0, a'1, \ldots, a'15) \times (b'03, b'13, \ldots, b'F3) + c'3 \quad (23)$$

The same operation is performed in the computation devices 1A to 1D although data serving as a computation target is different, and thus, the computation device 1A will be described herein. The computation unit 210A of the computation device 1A computes a'0×b'00+a'1×b'10+a'2×b'20+a'3×b'30, computes a'0×b'01+a'1×b'11+a'2×b'21+a'3×b'31, computes a'0×b'02+a'1×b'12+a'1×b'22+a'3×b'32, and computes a'0×b'03+a'1×b'13+a'2×b'23+a'3×b'33. The computation unit 210B of the computation device 1A computes a'0×b'40+a'1×b'50+a'2×b'60+a'3×b'70, computes a'0×b'41+a'1×b'51+a'2×b'61+a'3×b'71, computes a'0×b'42+a'1×b'52+a'2×b'62+a'3×b'72, and computes a'0×b'43+a'1×b'53+a'2×b'63+a'3×b'73.

The computation unit 210C of the computation device 1A computes a'0×b'80+a'1×b'90+a'2×b'A0+a'3×b'B0, computes a'0×b'81+a'1×b'91+a'2×b'A1+a'3×b'B1, computes a'0×b'82+a'1×b'92+a'2×b'A2+a'3×b'B2, and computes a'0×b'83+a'1×b'93+a'2×b'A3+a'3×b'B3. The computation unit 210D of the computation device 1A computes a'0×b'C0+a'1×b'D0+a'2×b'E0+a'3×b'F0, computes a'0×b'C1+a'1×b'D1+a'2×b'E1+a'3×b'F1, computes a'0×b'C2+a'1×b'D2+a'2×b'E2+a'3×b'F2, and computes a'0×b'C3+a'1×b'D3+a'2×b'E3+a'3×b'F3. The same operation is performed in the respective computation units 10A to 10D although data serving as a computation target is different, and thus, the operation of the computation unit 10A will be mainly described.

This will be described in detail hereinafter. The register 41 stores half-precision data a'0, half-precision data a'1, half-precision data a'2, and half-precision data a'3 in order from a high-order bit. The half-precision data a'0 to a'3 are supplied from the register 41 to the data multiplexer 211 as the input data DIN1. The register 42 stores half-precision data b'00, half-precision data b'110, half-precision data b'20, and half-precision data b'30 in order from a high-order bit. The half-precision data b'00, b'10, b'20, and b'30 are supplied from the register 42 to the data multiplexer 211 as the input data DIN2.

The register 43 stores half-precision data b'01, half-precision data b'11, half-precision data b'21, and half-precision data b'31 in order from a high-order bit. The half-precision data b'01, b'11, b'21, and b'31 are supplied from the register 43 to the data multiplexer 211 as the input data DIN3. The register 44 stores half-precision data b'02, half-precision data b'12, half-precision data b'22, and half-precision data b'32 in order from a high-order bit. The half-precision data b'02, b'12, b'22, and b'32 are supplied from the register 44 to the data multiplexer 211 as input data DIN4. The register 45 stores half-precision data b'03, half-precision data b'13, half-precision data b'23, and half-precision data b'33 in order from a high-order bit. The half-precision data b'03, b'13, b'23, and b'33 are supplied from the register 45 to the data multiplexer 211 as input data DIN3.

The MODE signal indicating the half-precision computation mode is supplied to the data multiplexer 211. Thus, the data multiplexer 211 outputs the half-precision data ar0 and a'1, the half-precision data b'00 and b'110, and the half-precision data b'01 and b'11 to the multiplier 212. In addition, the data multiplexer 211 outputs the half-precision data a'2 and a'3, the half-precision data b'20 and b'30, and the half-precision data b'21 and b'31 to the multiplier 213. In addition, the data multiplexer 211 outputs the half-precision data a'0 and a'1, the half-precision data b'02 and b'112, and the half-precision data b'03 and b'13 to the multiplier 214. In addition, the data multiplexer 211 outputs the half-precision data a'2 and a'3, the half-precision data b'22 and b'32, and the half-precision data b'23 and b'33 to the multiplier 215.

In the multiplier 212, the MODE signal indicating the half-precision computation mode is supplied to the data multiplexer 311. Thus, the data multiplexer 311 outputs the half-precision data a'0 and the half-precision data b'00 to the multiplier 312, outputs the half-precision data a'1 and the half-precision data 13 '10 to the multiplier 313, outputs the half-precision data a'0 and the half-precision data b'01 to the multiplier 314, and outputs the half-precision data all and the half-precision data b'11 to the multiplier 315. Then, the multiplication is performed in each of the multipliers 312 to 315 and the intermediate results m'11, m'12, m'21 , m'22, m'31, m'32, m'41, and m'42 are output. Since the operations of the multipliers 213 to 215 are the same as the operation of the multiplier 212, the description thereof will be omitted.

Here, the operation of the shift amount arithmetic circuit 260 in the third computation mode will be described. In the computation unit 210A, computations shown in Formulas (20) to (23) are performed. Thus, it is necessary to align exponent parts of the respective terms in order for the adder 54 to ad the respective terms on the right side of Formula (20). Similarly, it is necessary to align exponent parts of the respective terms in order for the adder 55 to ad the respective terms on the right side of Formula (21). It is necessary to align exponent parts of the respective terms in order for the adder 56 to ad the respective terms on the right side of Formula (22). It is necessary to align exponent parts of the respective terms in order for the adder 57 to ad the respective terms on the right side of Formula (23). The shift amount arithmetic circuit 260 computes a shift amount of each term. This will be described in detail hereinafter.

The MODE signal indicating the half-precision computation mode is supplied to the exponent part extraction circuit 261. Thus, the exponent part extraction circuit 261 extracts an exponent part from each of the input data DIN1 to DIN5 from the computation units 210A to 210D and the input data DIN0. Specifically, the exponent part extraction circuit 261 extracts exponent parts of half-precision data a'0 to a'15, half-precision data b'00 to b'03, b'110 to b'13, . . . , b'F0 to F3 and half-precision data c'0 to c'3.

Then, the exponent part extraction circuit 261 calculates an exponent part of a'0×b'00 by computing the sum of the exponent part of the half-precision data a'0 and the exponent part of the half-precision data WOO. Similarly, the exponent part extraction circuit 261 calculates an exponent part of each multiplication result on the right side shown in Formula (20). Then, the exponent part extraction circuit 261 outputs the exponent part of each multiplication result and the exponent part of the half-precision data a to the maximum value arithmetic circuit 262A. In addition, the exponent part extraction circuit 261 outputs the exponent parts of the respective multiplication result to the subtraction circuits 263A different from each other.

In addition, the exponent part extraction circuit 261 calculates an exponent part of each multiplication result on the right side shown in Formula (21), and outputs the exponent part of each multiplication result and the exponent part of the half-precision data c'1 to the maximum value arithmetic circuit 262B. In addition, the exponent part extraction circuit 261 outputs the exponent parts of the respective multiplication results to the subtraction circuits 263B different from each other. Similarly, the exponent part extraction circuit 261 calculates an exponent part of each multiplication result on the right side shown in Formula (22), and outputs the exponent part of each multiplication result and the exponent part of the half-precision data c'2 to the maximum value arithmetic circuit 262C. In addition, the exponent part extraction circuit 261 outputs the exponent parts of the respective multiplication results to the subtraction circuits 263C different from each other. The exponent part extraction circuit 261 calculates an exponent part of each multiplication result on the right side shown in Formula (23), and outputs the exponent part of each multiplication result and the exponent part of the half-precision data ci3 to the maximum value arithmetic circuit 262D. In addition, the exponent part extraction circuit 261 outputs the exponent parts of the respective multiplication results to the subtraction circuits 263D different from each other.

The maximum value arithmetic circuit 262A calculates (identifies) a maximum exponent part out of the exponent parts of the respective multiplication results and the exponent part of the half-precision data a as a maximum exponent. Then, the maximum value arithmetic circuit 262A outputs the maximum exponent to each of the subtraction circuits 263A.

Then, each of the subtraction circuits 263A computes a difference between the maximum exponent and the exponent part of each multiplication result. Specifically, the subtraction circuit 263A to which the exponent part of a'0×b'00 is supplied subtracts the exponent part of a'0×b'00 from the maximum exponent and calculates a subtraction result thereof as a shift amount. Then, the subtraction circuit 263A outputs the calculated shift amount to the alignment units 321 and 322 of the multiplier 212 of the computation unit 210A. Similarly, the subtraction circuit 263A to which the exponent part of a'1×b'10 is supplied subtracts the exponent part of a'1×b'10 from the maximum exponent, and calculates a subtraction result thereof as a shift amount. Then, the subtraction circuit 263A outputs the calculated shift amount to the alignment units 323 and 324 of the multiplier 212 of the computation unit 210A.

In this manner, each of the subtraction circuits 263A outputs the calculated shift amount to the alignment unit that performs the shift process on the supplied multiplication result (intermediate result). Since operations of the maximum value arithmetic circuits 262B to 262D and the subtraction circuits 263B to 263D are the same, the description thereof will be omitted.

Then, the alignment units 321 to 328 perform shift processes on mantissa parts of the intermediate results m'11, m'12, m'21, m'22, m'31, m'32, m'41, and m'42 based on the shift amounts supplied from the shift amount arithmetic circuit 260, and output processing results of the alignment units 321 to 328 to the rounding units 331 to 338. Then, the rounding units 331 to 334 perform rounding processes on the intermediate results m'11, m'12, m'21, and m'22, on which have been performed the shift processes by the alignment units 321 to 324, and output the computation results r'11, r'12, r'21, and r'22 to the adder 54. Similarly, the rounding units 335 to 338 perform rounding processes on the intermediate results m'31, m'32, m'41, and m'42, on which have been performed the shift processes by the alignment units 325 to 328, and output the computation results r'31, r'32, r'41, and r'42 to the adder 55. Similar operations are performed even in the multipliers 213 to 215.

The same computation is performed even in the computation unit 210B, the computation unit 210C, and the computation unit 210D. The multipliers 212 and 213 of each of the computation units 210A to 210D output the computation results r'11, r'12, r'21, and r'22 to the adder 54, and output the computation results r'31, r'32, r'41, and r'42 to the adder 55. The multipliers 214 and 215 of each of the computation units 210A to 210D output the computation results r'11, r'12, r'21, and r'22 to the adder 56, and output the computation results r'31, r'32, r'41, and r'42 to the adder 57. In addition, the register 40 stores the half-precision data c'0, the half-precision data c'1, the half-precision data c'2, and the half-precision data c'3 in order from a high-order bit. Then, from the register 40, the half-precision data a is supplied to the adder 54, and the half-precision data c'1 is supplied to the adder 55, the half-precision data c'2 is supplied to the adder 56, and the half-precision data c'3 is supplied to the adder 57.

Then, the adder 54 ads the computation results r'11, r'12, r'21, and r'22 of the multipliers 212 and 213 of the computation units 210A to 210D, and the half-precision data c'0 to output an addition result of the adder 54 as the computation result d'0. The adder 55 ads the computation results r'31, r'32, r'41, 1 '42 of the multipliers 212 and 213 of the computation units 210A to 210D and the half-precision data c'1 to output an addition result of the adder 55 as the computation result d'1. Similarly, the adder 56 ads the computation results r'11, r'12, r'21, and r'22 of the multipliers 214 and 215 of the computation units 210A to 210D and the half-precision data c'2 to output an addition result of the adder 56 as the computation result d'2. In addition, the adder 57 ads the computation results r'31, r'32, r'41, and r'42 of the multipliers 214 and 215 of the computation units 210A to 210D and the half-precision data c'3 to output an addition result of the adder 57 as the computation result d'3.

Then, the computation result (d'0, d'1, d'2, d'3) is generated by combining the computation results d'0 to d'3 and is supplied to the multiplexer 259. At this time, the partial adder 316, the partial adder 16, the alignment units 17 and 18, the rounding units 19 and 20, the alignment units 21 to 28, the rounding units 31 to 38, and the adders 51 to 53 also perform computations, and the computation result D0 and the computation result (d0, d1) are output to the multiplexer 259. Since the MODE signal indicating the half-precision computation mode is supplied to the multiplexer 259, the multiplexer 259 outputs the computation result (d'0, d'1, d'2, d'3). In this manner, the four half-precision matrix operations are performed.

Even in the computation devices 1A to 1D according to the second embodiment and a computation system S including these computation devices 1A to 1D, the same effects as those of the computation system S and the computation devices 1A to 1D according to the first embodiment described above are achieved.

In the computation devices 1A to 1D according to the second embodiment, the adder 51 obtains one matrix operation result with data having the first bit number, the adder 52 and the adder 53 obtain two matrix operation results with data having the second bit number, and the adders 54 to 57 obtain four matrix operation results with data having the third bit number. Then, the multiplexer 259 outputs one matrix operation result with data having the first bit number when the MODE signal indicates the first computation mode, outputs two matrix operation results with data having the second bit number when the MODE signal indicates the second computation mode, and outputs four matrix operation results with data having the third bit number when the MODE signal indicates the third computation mode. In this manner, it is possible to perform the matrix operations in response to the three computation modes in the computation devices 1A to 1D.

A circuit scale of an operation unit used for one computation in the half-precision computation mode is 1/16 or less of that of an operation unit used for one computation in the double-precision computation mode. However, only four computations in the half-precision computation mode can be performed per circuit scale for performing one computation in the double-precision computation mode when one computation in the double-precision computation mode is switched to four computations in the half-precision computation mode similarly to the computation device according to the comparative example described above. Thus, when one computation in the double-precision computation mode is switched to four computations in the half-precision computation mode, only about one fourth of circuit elements, such as transistors, used for one computation in the double-precision computation mode are used. Meanwhile, the computation performance can be improved by twice to four times, and the power efficiency can also be improved even in the half-precision computation mode and the single-precision computation mode according to the computation devices 1A to 1D configured as described above.

Further, since the arithmetic unit MAU includes the four computation devices 1A to 1D in the computation system S, it is possible to perform the matrix operation (a 4×4 matrix vector product) of double-precision data as shown in Formula (1). The arithmetic unit MAU can perform an 8×8 matrix vector product as shown in Formula (7) in the single-precision computation mode, and perform a 16×16 matrix-vector product as shown in Formula (19) in the half-precision computation mode. According to this configuration, it is possible to realize the computation performance equivalent to a circuit having 16 parallel multipliers (circuits that perform one multiplication in one cycle) each of which performs a multiplication of a mantissa of 52 bits in the double-precision computation mode. In the single-precision computation mode, it is possible to realize the computation performance equivalent to a circuit having 64 parallel multipliers each of which performs a multiplication of a mantissa of 23 bits. In the half-precision computation mode, it is possible to realize the computation performance equivalent to a circuit having 256 parallel multipliers each of which performs a multiplication of a mantissa of 10 bits.

In the first computation mode, it is necessary to align the respective exponent parts in order for the adder 51 to ad the intermediate results P11 and P12 of the computation units 210A to 210D. In the second computation mode, it is necessary to align the respective exponent parts in order for the adder 52 to ad the intermediate results m11, m12, m21, and m22 of the computation units 210A to 210D, and it is necessary to align the respective exponent parts in order for the adder 53 to ad the intermediate results m31, m32, m41, and m42 of the computation units 210A to 210D. Similarly, in the third computation mode, it is necessary to align exponent parts of data serving as addition targets in order for the adders 54 to 57 to ad the intermediate results m'11, m'12, m'21, m'22, m'31, m'32, m'41, and m'42 of the multipliers 212 to 215 of the computation units 210A to 210D. Since the shift amount arithmetic circuit 260 computes a difference between the maximum exponent of the data serving as the addition target and each exponent part as a shift amount, it is possible to align the exponent parts of the data serving as the addition targets.

Since a plurality of comparison target data are compared in order from the MSB in the maximum value arithmetic circuit 262, the number of bits to be compared can be reduced, and the computation of the maximum exponent can be speeded up.

Although the embodiments of the present disclosure have been described as above, the present invention is not limited to the above embodiments.

For example, the computation devices 1A to 1D may be used as reconfigurable operation units that can map a data flow graph.

The computation devices 1A to 1D do not necessarily include the registers 40 to 45. The input data DIN0 to DIN3 may be directly supplied to the data multiplexer 11 from the outside of the computation devices 1A to 1D, and the input data DIN0 to DIN3 may be directly supplied to the data multiplexer 211 from the outside of the computation devices 1A to 1D.

In addition, the double-precision computation mode, the single-precision computation mode, and the half-precision computation mode have been listed as the computation modes of the computation devices 1A to 1D, but the computation modes are not limited thereto. A first bit number of data used in a computation in a first computation mode may be twice a second bit number of data used in a computation in a second computation mode. In addition, a third bit number of data used in a computation in a third computation mode may be half the second bit number of data used in the computation in the second computation mode. For example, a quadruple-precision computation mode, a quarter-precision computation mode, or the like may be adopted. For example, a quadruple-precision computation mode may be adopted as a first computation mode, a double-precision computation mode may be adopted as a second computation mode, and a single-precision computation mode may be adopted as a third computation mode. In addition, a single-precision computation mode may be adopted as a first computation mode, a half-precision computation mode may be adopted as a second computation mode, and a quarter-precision computation mode may be adopted as a third computation mode. It is possible to further improve the computation performance of the computation devices 1A to 1D by reducing the accuracy of a computation mode to be adopted.

Further, computation modes to be adopted in the computation devices 1A to 1D may be different from each other. For example, the computation devices 1A to IC may adopt a single-precision computation mode and a half-precision computation mode, and the computation device 1D may adopt a double-precision computation mode and the single-precision computation mode. In this case, the effective computation accuracy as the arithmetic unit MAU can be improved more than the computation accuracy of the computation devices 1A to 1C. In addition, it is possible to realize the high computation performance while maintaining the computation accuracy required in an application.

Further, the computation devices 1A to 1D may be capable of switching computation modes of the computation devices 1A to 1D to either a first computation mode or a third computation mode in response to a MODE signal. For example, a double-precision computation mode and a half-precision computation mode may be employed as the computation modes of the computation devices 1A to 1D. In this case, it is possible to omit circuits for the second computation mode (the alignment units 21 to 28, the rounding units 31 to 38, and the adders 52 and 53). As a result, the circuit scale can be reduced, and it is possible to improve the performance and save power. Further, the computation modes adopted in the computation devices 1A to 1D may be different from each other in this configuration. In this case, it is possible to achieve both the high performance and power saving in a wide application range.

Although each of the computation devices 1A to 1D includes four computation units in the above embodiments, the number of computation units can be appropriately changed depending on a computation purpose. Thus, each of the computation devices 1A to 1D may include at least one computation unit, and may include an arbitrary number of plural computation units. Each of the computation devices 1A to 1D may further include one or a plurality of double-precision multipliers in addition to the computation unit.

The computation devices 1A to 1D according to the first embodiment may include a shift amount arithmetic circuit 260.

The multipliers 312 to 315 may further include configurations of multipliers 212 to 215. In this case, the computation devices 1A to 1D can further perform a fourth computation mode using data of a fourth bit number that is half the third bit number. Further, the configurations of the multipliers 212 to 215 may be repeatedly applied to each multiplier. As a result, a computation with a desired accuracy is possible.

In the above embodiments and each modification, each of the computation units 10A to 10D may further include a register 44. The register 44 is a circuit that stores and holds input data DIN4 that is a bit string having the first bit number serving as a computation target. The input data DIN4 includes high-order data din4_$h$ and low-order data din4_1. The input data DIN4 is set in the register 44 from a device (element processor in the present embodiment) outside the computation devices 1A to 1D. The high-order data din4_$h$ and the low-order data din4_1 are bit strings having the second bit number. The register 44 outputs the held input data DIN4 to the data multiplexer 11. In this case, four data having the first bit number are supplied to the data multiplexer 11. When the MODE signal indicates the second computation mode, the data multiplexer 11 outputs the high-order data din1_$h$ as the output data dout1, and outputs the low-order data din1_1 as the output data dout3. In addition, when the MODE signal indicates the second computation mode, the data multiplexer 11 outputs the high-order data din2_$h$ as the output data dout2, and outputs the low-order data din2_1 as the output data dout4. In addition, when the MODE signal indicates the second computation mode, the data multiplexer 11 outputs the high-order data din3_$h$ as the output data dout5, and outputs the low-order data din3_1 as the output data dout7. In addition, when the MODE signal indicates the second computation mode, the data multiplexer 11 outputs the high-order data din4_$h$ as the output data dout6, and outputs the low-order data din4_1 as the output data dout8. According to this configuration, the respective computation units 10A to 10D function as four multipliers that perform multiplications of bit strings having the second bit number. Thus, the computation devices 1A to 1D can be used for operations other than the matrix operation. The computation units 210A to 210D can be also configured in the same manner.

REFERENCE SIGNS LIST 1A to 1D computation device
10A to 10D, 210A to 210D computation unit
11, 211, 311 data multiplexer (multiplexer)
12, 212, 312 multiplier (first multiplier)
13, 213, 313 multiplier (second multiplier)
14, 214, 314 multiplier (third multiplier)
15, 215, 315 multiplier (fourth multiplier)
16, 316 partial adder
50, 250 addition unit
51 adder (third adder)
52 adder (first adder)
53 adder (second adder)
59, 259 multiplexer (selector)

The invention claimed is:
1. A computation device comprising:
a multiplexer configured to receive first to third input data each having a first bit number and output first to eighth output data each having a second bit number that is half the first bit number in response to a mode signal indicating a computation mode;
a first multiplier configured to multiply the first output data and the second output data;
a second multiplier configured to multiply the third output data and the fourth output data;
a third multiplier configured to multiply the fifth output data and the sixth output data; and
a fourth multiplier configured to multiply the seventh output data and the eighth output data,
wherein the multiplexer outputs first high-order data, which is high-order data having the second bit number out of the first input data, as the first output data and the fifth output data, outputs first low-order data, which is low-order data having the second bit number out of the first input data, as the third output data and the seventh output data, outputs second high-order data, which is high-order data having the second bit number out of the second input data, as the second output data and the fourth output data, and outputs second low-order data, which is low-order data having the second bit number out of the second input data, as the sixth output data and the eighth output data when the mode signal indicates a first computation mode using data having the first bit number, and the multiplexer outputs the first high-order data as the first output data and the fifth output data, outputs the first low-order data as the third output data and the seventh output data, outputs the second high-order data as the second output data, outputs the second low-order data as the fourth output data, outputs third high-order data, which is high-order data having the second bit number out of the third input data, as the sixth output data, and outputs third low-order data, which is low- order data having the second bit number out of the third input data, as the eighth output data when the mode signal indicates a second computation mode using data having the second bit number.

2. The computation device according to claim 1, further comprising:

a first adder configured to add a first multiplication result that is a multiplication result of the first multiplier and a second multiplication result that is a multiplication result of the second multiplier;

a second adder configured to add a third multiplication result that is a multiplication result of the third multiplier and a fourth multiplication result that is a multiplication result of the fourth multiplier; and a partial adder configured to add the first multiplication result, the second multiplication result, the third multiplication result, and the fourth multiplication result.

3. The computation device according to claim 2, wherein the first multiplier outputs a first intermediate result and a second intermediate result, which are results obtained during the multiplication by the first multiplier, as the first multiplication result, the second multiplier outputs a third intermediate result and a fourth intermediate result, which are results obtained during the multiplication by the second multiplier, as the second multiplication result, the third multiplier outputs a fifth intermediate result and a sixth intermediate result, which are results obtained during the multiplication by the third multiplier, as the third multiplication result, and the fourth multiplier outputs a seventh intermediate result and an eighth intermediate result, which are results obtained during the multiplication by the fourth multiplier, as the fourth multiplication result.

4. The computation device according to claim 2, further comprising:

a plurality of computation units each including the multiplexer, the first multiplier, the second multiplier, the third multiplier, the fourth multiplier, and the partial adder;

a third adder configured to add addition results of the partial adders of the plurality of computation units; and a selector configured to output any of a first addition result that is an addition result of the first adder and a second addition result that is an addition result of the second adder, and a third addition result that is an addition result of the third adder, in response to the mode signal, wherein the first adder adds the first multiplication results and the second multiplication results of the plurality of computation units, the second adder adds the third multiplication results and the fourth multiplication results of the plurality of computation units, and the selector outputs the third addition result when the mode signal indicates the first computation mode and outputs the first addition result and the second addition result when the mode signal indicates the second computation mode.

5. The computation device according to claim 4, further comprising a shift amount arithmetic circuit configured to compute a first shift amount of the first multiplication result, a second shift amount of the second multiplication result, a third shift amount of the third multiplication result, and a fourth shift amount of the fourth multiplication result, wherein each of the plurality of computation units further includes: a first alignment unit configured to perform a shift process on the first multiplication result based on the first shift amount; a second alignment unit configured to perform a shift process on the second multiplication result based on the second shift amount; a third alignment unit configured to perform a shift process on the third multiplication result based on the third shift amount; and a fourth alignment unit configured to perform a shift process on the fourth multiplication result based on the fourth shift amount.

6. The computation device according to claim 5, wherein the shift amount arithmetic circuit includes: a maximum value arithmetic circuit configured to compute a maximum exponent, which is a maximum exponent part among exponent parts of a plurality of target data to be added; and a subtraction circuit configured to compute a difference between each of the plurality of target data and the maximum exponent as a shift amount.

7. The computation device according to claim 6, wherein the maximum value arithmetic circuit computes the maximum exponent by performing comparison in order from a most significant bit to a least significant bit of the plurality of target data.

8. The computation device according to claim 1, wherein the first computation mode is a double-precision computation mode, and the second computation mode is a single-precision computation mode.

9. The computation device according to claim 1, wherein the first computation mode is a single-precision computation mode, and the second computation mode is a half-precision computation mode.

10. A computation system comprising:

an arithmetic unit including a plurality of computation devices, the computation device according to claim 1; and a plurality of processors sharing the arithmetic unit.

11. The computation system according to claim 10, wherein the plurality of processors operate as a single processor when performing a matrix operation, and operate as individual processors when performing an operation other than the matrix operation.

12. The computation system according to claim 10, wherein the plurality of processors perform a SIMD operation that operates with one instruction.

13. The computation system according to claim 10, further comprising a memory space accessible by a memory address including a processor ID capable of uniquely identifying each of the plurality of processors, wherein each of the plurality of processors is capable of accessing a memory area indicated by the memory address including the processor ID of the processor.

14. The computation system according to claim 13, wherein the plurality of processors are ring-coupled, and each of the plurality of processors sequentially transfers data having been received from the arithmetic unit to the other processors via the ring coupling.

* * * * *